(12) United States Patent
Noser et al.

(10) Patent No.: US 8,489,490 B2
(45) Date of Patent: Jul. 16, 2013

(54) SYSTEMS AND METHODS FOR ANALYSIS OF PORTFOLIO RETURNS AND TRADE COST MEASUREMENT BASED ON FIDUCIARY ROLES

(75) Inventors: Eugene Noser, New York, NY (US); Bruce Stewart, New York, NY (US); John T. Thomas, East Stroudsburg, PA (US)

(73) Assignee: Abel Noser Solutions, Ltd., New York, NY (US)

( * ) Notice: Subject to any disclaimer, the term of this patent is extended or adjusted under 35 U.S.C. 154(b) by 452 days.

(21) Appl. No.: 12/608,669

(22) Filed: Oct. 29, 2009

(65) Prior Publication Data

US 2010/0121782 A1    May 13, 2010

Related U.S. Application Data

(62) Division of application No. 10/372,436, filed on Feb. 24, 2003, now Pat. No. 7,739,170.

(60) Provisional application No. 60/359,291, filed on Feb. 22, 2002.

(51) Int. Cl.
*G06Q 40/00* (2012.01)

(52) U.S. Cl.
USPC ............... 705/37; 705/36 R; 705/35; 235/379

(58) Field of Classification Search
CPC ...................................................... G06Q 40/00
USPC ........................... 705/35, 36 R, 37; 235/379
See application file for complete search history.

(56) References Cited

PUBLICATIONS

Office Action issued in Canadian Patent Application No. 2,477,041 dated Jul. 27, 2010.
Wagner, W.H. et al. "Best Execution", Financial Analysts Journal, pp. 65 to 71, Jan.-Feb. 1993.

*Primary Examiner* — Daniel Felten
(74) *Attorney, Agent, or Firm* — Morgan, Lewis & Bockius LLP

(57) ABSTRACT

Preferred embodiments of the present invention comprise, for example, a method for measuring trade costs, comprising (1) capturing trade data over a predetermined time period; (2) capturing time stamp data corresponding to said trade data, wherein said time stamp data comprises open events and close events, data regarding when an order is received by a buy-side trading desk from a portfolio manager; data regarding when execution of said order is completed, and data regarding when a manager decides to engage in trading regarding said order; and (3) performing an investment level analysis based on said trade data and said time stamp data. Further embodiments comprise systems and software for implementing the above method (and others) and utilizing information obtained therefrom.

13 Claims, 33 Drawing Sheets

| CLIENT FILL SUMMARY | | | |
|---|---|---|---|
| DAY 1 | FILL VOLUME | FILL PRICE | PRICE x VOL |
| FILL 1 | 3,700 | 79.5 | 294,150 |
| FILL 2 | 4,500 | 81.5 | 366,750 |
| FILL 3 | 1,600 | 84 | 134,400 |
| FILL 4 | 100 | 84.5 | 8,450 |
| FILL 5 | 100 | 85 | 8,500 |
|  |  |  |  |
| DAY 1 SUMMARY | 10,000 |  | 812,250 |
| EXEC VWAP (DAY 1) |  | 81.23 |  |
| DAY 2 | FILL VOLUME | FILL PRICE | PRICE x VOL |
| FILL 1 | 4,200 | 93 | 390,600 |
| FILL 2 | 4,500 | 95.5 | 429,750 |
| FILL 3 | 1,200 | 96 | 115,200 |
| FILL 4 | 100 | 97 | 9,700 |
|  |  |  |  |
| DAY 2 SUMMARY | 10,000 |  | 945,250 |
| EXEC VWAP (DAY 2) |  | 94.53 |  |
| ORDER | FILL VOLUME | FILL PRICE | PRICE x VOL |
| ORDER SUMMARY | 20,000 |  | 1,757,500 |
| EXEC VWAP (ORDER) |  | 87.88 |  |

FIG.3

| TIME OF SALES/MARKET EVENTS | | | | | |
|---|---|---|---|---|---|
| EVENT | DAY | TIME | TIMESEG | VOLUME | PRICE |
| OPEN | 1 | 9:30:00 | 1 | 1000 | 70 |
|  | 1 | 9:40:00 | 2 | 100 | 70.5 |
| DECISION | 1 | 9:50:00 | 3 | 4300 | 71 |
|  | 1 | 10:00:00 | 4 | 39000 | 71.5 |
|  | 1 | 10:10:00 | 5 | 3600 | 72 |
| ENTRY | 1 | 10:20:00 | 6 | 100 | 72.5 |
|  | 1 | 10:30:00 | 7 | 41000 | 73 |
|  | 1 | 10:40:00 | 8 | 100 | 73.5 |
|  | 1 | 10:50:00 | 9 | 900 | 74 |
|  | 1 | 11:00:00 | 10 | 100 | 74.5 |
|  | 1 | 11:10:00 | 11 | 3200 | 75 |
|  | 1 | 11:20:00 | 12 | 4300 | 75.5 |
|  | 1 | 11:30:00 | 13 | 100 | 76 |
|  | 1 | 11:40:00 | 14 | 4000 | 76.5 |
|  | 1 | 11:50:00 | 15 | 900 | 77 |
| PLACEMENT | 1 | 12:00:00 | 16 | 5800 | 77.5 |
|  | 1 | 12:10:00 | 17 | 100 | 78 |
|  | 1 | 12:20:00 | 18 | 5800 | 78.5 |
|  | 1 | 12:30:00 | 19 | 100 | 79 |
| FILL | 1 | 12:40:00 | 20 | 3700 | 79.5 |
|  | 1 | 12:50:00 | 21 | 100 | 80 |
|  | 1 | 13:00:00 | 22 | 100 | 80.5 |
|  | 1 | 13:10:00 | 23 | 100 | 81 |
| FILL | 1 | 13:20:00 | 24 | 4500 | 81.5 |
|  | 1 | 13:30:00 | 25 | 2100 | 82 |
|  | 1 | 13:40:00 | 26 | 3900 | 82.5 |
|  | 1 | 13:50:00 | 27 | 3500 | 83 |
|  | 1 | 14:00:00 | 28 | 500 | 83.5 |
| FILL | 1 | 14:10:00 | 29 | 1600 | 84 |
| FILL | 1 | 14:20:00 | 30 | 100 | 84.5 |
| FILL | 1 | 14:30:00 | 31 | 100 | 85 |
| EXEC COMPLETION | 1 | 14:40:00 | 32 | 2300 | 85.5 |
|  | 1 | 14:50:00 | 33 | 100 | 86 |
|  | 1 | 15:00:00 | 34 | 100 | 86.5 |
|  | 1 | 15:10:00 | 35 | 3400 | 87 |
|  | 1 | 15:20:00 | 36 | 100 | 87.5 |
|  | 1 | 15:30:00 | 37 | 100 | 88 |
|  | 1 | 15:40:00 | 38 | 100 | 88.5 |
|  | 1 | 15:50:00 | 39 | 2800 | 89 |
|  | 1 | 16:00:00 | 40 | 100 | 89.5 |
|  | 1 | 16:10:00 | 41 | 5000 | 90 |
| DAY 1 CLOSE | 1 | 16:20:00 | 42 | 100 | 90.5 |

FIG. 4A

| TIME OF SALES/MARKET EVENTS (CONTINUED) | | | | | |
|---|---|---|---|---|---|
| EVENT | DAY | TIME | TIMESEG | VOLUME | PRICE |
| OPN/DEC/ENT | 2 | 9:30:00 | 43 | 1000 | 91 |
|  | 2 | 9:40:00 | 44 | 4400 | 91.5 |
| PLACEMENT | 2 | 9:50:00 | 45 | 800 | 92 |
|  | 2 | 10:00:00 | 46 | 900 | 92.5 |
| FILL | 2 | 10:10:00 | 47 | 4200 | 93 |
|  | 2 | 10:20:00 | 48 | 300 | 93.5 |
|  | 2 | 10:30:00 | 49 | 1100 | 94 |
|  | 2 | 10:40:00 | 50 | 100 | 94.5 |
|  | 2 | 10:50:00 | 51 | 100 | 95 |
| FILL | 2 | 11:00:00 | 52 | 4500 | 95.5 |
| FILL | 2 | 11:10:00 | 53 | 1200 | 96 |
|  | 2 | 11:20:00 | 54 | 3400 | 96.5 |
| FILL | 2 | 11:30:00 | 55 | 100 | 97 |
| EXEC COMPLETION | 2 | 11:40:00 | 56 | 2100 | 97.5 |
|  | 2 | 11:50:00 | 57 | 100 | 91.5 |
|  | 2 | 12:00:00 | 58 | 100 | 91.5 |
|  | 2 | 12:10:00 | 59 | 100 | 91.5 |
|  | 2 | 12:20:00 | 60 | 100 | 91.5 |
|  | 2 | 12:30:00 | 61 | 100 | 91.5 |
|  | 2 | 12:40:00 | 62 | 100 | 91.5 |
|  | 2 | 12:50:00 | 63 | 100 | 91.5 |
|  | 2 | 13:00:00 | 64 | 100 | 91.5 |
|  | 2 | 13:10:00 | 65 | 100 | 91.5 |
|  | 2 | 13:20:00 | 66 | 100 | 91.5 |
|  | 2 | 13:30:00 | 67 | 100 | 91.5 |
|  | 2 | 13:40:00 | 68 | 100 | 91.5 |
|  | 2 | 13:50:00 | 69 | 100 | 91.5 |
|  | 2 | 14:00:00 | 70 | 100 | 91.5 |
|  | 2 | 14:10:00 | 71 | 100 | 91.5 |
|  | 2 | 14:20:00 | 72 | 100 | 91.5 |
|  | 2 | 14:30:00 | 73 | 100 | 91.5 |
|  | 2 | 14:40:00 | 74 | 100 | 91.5 |
|  | 2 | 14:50:00 | 75 | 100 | 91.5 |
|  | 2 | 15:00:00 | 76 | 100 | 91.5 |
|  | 2 | 15:10:00 | 77 | 100 | 91.5 |
|  | 2 | 15:20:00 | 78 | 100 | 91.5 |
|  | 2 | 15:30:00 | 79 | 100 | 91.5 |
|  | 2 | 15:40:00 | 80 | 100 | 91.5 |
|  | 2 | 15:50:00 | 81 | 100 | 91.5 |
|  | 2 | 16:00:00 | 82 | 100 | 91.5 |
|  | 2 | 16:10:00 | 83 | 100 | 91.5 |
| DAY 2 CLOSE | 2 | 16:20:00 | 84 | 100 | 111.5 |

FIG. 4B

| TIME OF SALES/MARKET EVENTS (CONTINUED) | | | | | |
|---|---|---|---|---|---|
| EVENT | DAY | TIME | TIMESEG | VOLUME | PRICE |
| DAY 3 OPEN | 3 | 9:30:00 | 85 | 1000 | 112 |
| | 3 | 9:40:00 | 86 | 1300 | 112.5 |
| | 3 | 9:50:00 | 87 | 3600 | 113 |
| | 3 | 10:00:00 | 88 | 100 | 113.5 |
| | 3 | 10:10:00 | 89 | 100 | 114 |
| | 3 | 10:20:00 | 90 | 4700 | 114.5 |
| | 3 | 10:30:00 | 91 | 5700 | 115 |
| | 3 | 10:40:00 | 92 | 100 | 115.5 |
| | 3 | 10:50:00 | 93 | 5300 | 116 |
| | 3 | 11:00:00 | 94 | 400 | 116.5 |
| | 3 | 11:10:00 | 95 | 100 | 117 |
| | 3 | 11:20:00 | 96 | 100 | 117.5 |
| | 3 | 11:30:00 | 97 | 1200 | 118 |
| | 3 | 11:40:00 | 98 | 5800 | 118.5 |
| | 3 | 11:50:00 | 99 | 100 | 119 |
| | 3 | 12:00:00 | 100 | 100 | 119.5 |
| | 3 | 12:10:00 | 101 | 100 | 120 |
| | 3 | 12:20:00 | 102 | 100 | 120.5 |
| | 3 | 12:30:00 | 103 | 700 | 121 |
| | 3 | 12:40:00 | 104 | 100 | 121.5 |
| | 3 | 12:50:00 | 105 | 2100 | 122 |
| | 3 | 13:00:00 | 106 | 100 | 122.5 |
| | 3 | 13:10:00 | 107 | 100 | 123 |
| | 3 | 13:20:00 | 108 | 600 | 123.5 |
| | 3 | 13:30:00 | 109 | 100 | 124 |
| | 3 | 13:40:00 | 110 | 3600 | 124.5 |
| | 3 | 13:50:00 | 111 | 5700 | 125 |
| | 3 | 14:00:00 | 112 | 100 | 125.5 |
| | 3 | 14:10:00 | 113 | 100 | 126 |
| | 3 | 14:20:00 | 114 | 2100 | 126.5 |
| | 3 | 14:30:00 | 115 | 3400 | 127 |
| | 3 | 14:40:00 | 116 | 1400 | 127.5 |
| | 3 | 14:50:00 | 117 | 100 | 128 |
| | 3 | 15:00:00 | 118 | 100 | 128.5 |
| | 3 | 15:10:00 | 119 | 600 | 129 |
| | 3 | 15:20:00 | 120 | 2700 | 129.5 |
| | 3 | 15:30:00 | 121 | 2600 | 130 |
| | 3 | 15:40:00 | 122 | 100 | 130.5 |
| | 3 | 15:50:00 | 123 | 4500 | 131 |
| | 3 | 16:00:00 | 124 | 2000 | 131.5 |
| | 3 | 16:10:00 | 125 | 3000 | 132 |
| DAY 3 CLOSE (PERIOD CLOSE) | 3 | 16:20:00 | 126 | 300 | 132.5 |

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| | | | | | | | | | | Q2 | | | | | | | | |
| Instrument | Account | | Beg Inv | Buy(1)/ Sell(-1)/ Add(0) | Trans Amount (Inflow) | End Inv | Dividend | Actual Price | Expected Price | Ideal Price | BOQ Price | EOQ Price | Com & Tax | Actual Amount | Expected Amount | Ideal Amount | BOQ Position | EOQ Position |
| Cash | Cash | | $5,200 | 0 | $22,000 | $3,700 | | | | | | | | $3,700 | $5,600 | $7,500 | $5,200 | $3,700 |
| Cash | Payout | | | | | | | | | | | | | $4,680 | | | | $4,680 |
| Stock | A | | 100 | -1 | 90 | 10 | $3 | $30 | $31 | $32 | $30 | $35 | $5 | -$2,700 | -$2,790 | -$2,880 | $3,000 | $350 |
| Stock | B | | 200 | -1 | 180 | 20 | $5 | $35 | $36 | $37 | $35 | $40 | $9 | -$6,300 | -$6,480 | -$6,660 | $7,000 | $800 |
| Stock | C | | 300 | -1 | 270 | 30 | $8 | $40 | $41 | $42 | $40 | $45 | $14 | -$10,800 | -$11,070 | -$11,340 | $12,000 | $1,350 |
| Stock | D | | 400 | -1 | 360 | 40 | $10 | $45 | $46 | $47 | $45 | $50 | $18 | -$16,200 | -$16,560 | -$16,920 | $18,000 | $2,000 |
| Stock | E | | 0 | 1 | 100 | 100 | $25 | $45 | $44 | $43 | $40 | $50 | $5 | $4,500 | $4,400 | $4,300 | $0 | $5,000 |
| Stock | F | | 0 | 1 | 200 | 200 | $50 | $50 | $49 | $48 | $45 | $55 | $10 | $10,000 | $9,800 | $9,600 | $0 | $11,000 |
| Stock | G | | 0 | 1 | 300 | 300 | $75 | $55 | $54 | $53 | $50 | $60 | $15 | $16,500 | $16,200 | $15,900 | $0 | $18,000 |
| Stock | H | | 0 | 1 | 400 | 400 | $100 | $60 | $59 | $58 | $55 | $65 | $20 | $24,000 | $23,600 | $23,200 | $0 | $26,000 |
| Stock Sum | | | | | | | $275 | | | | | | $95 | $19,000 | $17,100 | $15,200 | $40,000 | $64,500 |

CASH
EOQ: $3,700
BOQ: $5,200
$22,000 →
Stk: $19000
Com: $95
PO: $4680
Div: $275

STOCKS
EOQ: $64500
BOQ: $40000
CapG: $5500
Stk: $19000

Q2—Returns
| Act | Exp | Ideal |
|---|---|---|
| 8.45% | 11.28% | 14.11% |

FIG. 22

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| | | | | | | | | | | | | Q3 | | | | | | |
| Instrument | Account | Beg Inv | Buy(1)/Sell(-1)/Add(0) | Trans Amount (Inflow) | End Inv | Dividend | Actual Price | Expected Price | Ideal Price | BOQ Price | EOQ Price | Com. & Tax | Actual Amount | Expected Amount | Ideal Amount | BOQ Position | EOQ Position |
| Cash | Cash | $3,700 | 0 | $20,000 | $3,598 | | | | | | | | $3,598 | $5,588 | $7,578 | $3,700 | $3,598 |
| Cash | Payout | | | | | | | | | | | | $3,330 | | | | $3,330 |
| Stock | A | 10 | -1 | 9 | 1 | $0 | $35 | $36 | $37 | $35 | $40 | $0 | -$315 | -$324 | -$333 | $350 | $40 |
| Stock | B | 20 | -1 | 18 | 2 | $1 | $40 | $41 | $42 | $40 | $45 | $1 | -$720 | -$738 | -$756 | $800 | $90 |
| Stock | C | 30 | -1 | 27 | 3 | $1 | $45 | $46 | $47 | $45 | $50 | $1 | -$1,215 | -$1,242 | -$1,269 | $1,350 | $150 |
| Stock | D | 40 | -1 | 36 | 4 | $1 | $50 | $51 | $52 | $50 | $55 | $2 | -$1,800 | -$1,836 | -$1,872 | $2,000 | $220 |
| Stock | E | 100 | -1 | 90 | 10 | $3 | $50 | $51 | $52 | $50 | $60 | $5 | -$4,500 | -$4,590 | -$4,680 | $5,000 | $600 |
| Stock | F | 200 | -1 | 180 | 20 | $5 | $55 | $56 | $57 | $55 | $65 | $9 | -$9,900 | -$10,080 | -$10,260 | $11,000 | $1,300 |
| Stock | G | 300 | -1 | 270 | 30 | $8 | $60 | $61 | $62 | $60 | $70 | $14 | -$16,200 | -$16,470 | -$16,740 | $18,000 | $2,100 |

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| | | | | | | | | | Q4 | | | | | | | | |
| Instrument | Account | Beg Inv | Buy(1)/ Sell(-1)/ Add(0) | Trans Amount (Inflow) | End Inv | Dividend | Actual Price | Expected Price | Ideal Price | BOQ Price | EOQ Price | Com & Tax | Actual Amount | Expected Amount | Ideal Amount | BOQ Position | EOQ Position |
| Cash | Cash | $3,598 | 0 | $20,000 | $3,887 | | | | | | | | $3,887 | $5,887 | $7,887 | $3,598 | $3,887 |
| Cash | Payout | | | | | | | | | | | | $3,238 | | | | $3,238 |
| Stock | A | 1 | -1 | 1 | 0 | $0 | $40 | $41 | $42 | $40 | $45 | $0 | -$40 | -$41 | -$42 | $40 | $0 |
| Stock | B | 2 | -1 | 2 | 0 | $0 | $45 | $46 | $47 | $45 | $50 | $0 | -$90 | -$92 | -$94 | $90 | $0 |
| Stock | C | 3 | -1 | 3 | 0 | $0 | $50 | $51 | $52 | $50 | $55 | $0 | -$150 | -$153 | -$156 | $150 | $0 |
| Stock | D | 4 | -1 | 4 | 0 | $0 | $55 | $56 | $57 | $55 | $60 | $0 | -$220 | -$224 | -$228 | $220 | $0 |
| Stock | E | 10 | -1 | 9 | 1 | $0 | $55 | $56 | $57 | $60 | $60 | $0 | -$495 | -$504 | -$513 | $600 | $60 |
| Stock | F | 20 | -1 | 18 | 2 | $1 | $60 | $61 | $62 | $65 | $65 | $1 | -$1,080 | -$1,098 | -$1,116 | $1,300 | $130 |
| Stock | G | 30 | -1 | 27 | 3 | $1 | $65 | $66 | $67 | $70 | $70 | $1 | -$1,755 | -$1,782 | -$1,809 | $2,100 | $210 |
| Stock | H | 40 | -1 | 36 | 4 | $1 | $70 | $71 | $72 | $75 | $75 | $2 | -$2,520 | -$2,556 | -$2,592 | $3,000 | $300 |

CONT'D ON FIG.24-1

FIG. 24

SYSTEMS AND METHODS FOR ANALYSIS OF PORTFOLIO RETURNS AND TRADE COST MEASUREMENT BASED ON FIDUCIARY ROLES

CROSS-REFERENCE TO RELATED APPLICATIONS

This application claims priority to U.S. provisional patent application No. 60/359,291, filed Feb. 22, 2002, entitled "Method for Analysis of Portfolio Returns and Trade Cost Measurement Based On Fiduciary Roles," the contents of which are incorporated herein in their entirety by reference.

BACKGROUND

The trading of any financial instrument involves multiple agents. At a minimum it involves the buyer and the seller, and in the case of institutional trading, it may involve more than half a dozen agents on each side. Each trading agent either adds or deducts value from the overall trading objective. From a management perspective, questions to be considered include:

(1) How best to measure the individual contributions of each agent?

(2) How best to measure the synergistic contribution of multiple agents along various segments of the overall trading chain?

(3) How best to measure the trading impact of various agents on the overall portfolio return?

To address the above questions, among others, a preferred embodiment of the subject invention provides a trade cost measurement framework and methods based on the principle that trading agents are vested with specific fiduciary roles demarcated by hand-over instruction sets as well as the accompanying time-stamps.

SUMMARY

Preferred embodiments of the present invention comprise, for example, a method for measuring trade costs, comprising (1) capturing trade data over a predetermined time period; (2) capturing time stamp data corresponding to said trade data, wherein said time stamp data comprises open events and close events, data regarding when an order is received by a buy-side trading desk from a portfolio manager; data regarding when execution of said order is completed, and data regarding when a manager decides to engage in trading regarding said order; and (3) performing an investment level analysis based on said trade data and said time stamp data. Further embodiments comprise systems and software for implementing the above method (and others) and utilizing information obtained therefrom.

BRIEF DESCRIPTION OF THE DRAWINGS

FIG. 3 depicts sample sets of client fills available in a typical securities market.

FIG. 4 depicts available times of sale and market events of a typical securities market.

FIG. 21 illustrates an exemplary return analysis for quarter 1.

FIG. 22 illustrates an exemplary return analysis for quarter 2.

DETAILED DESCRIPTION OF PREFERRED EMBODIMENTS

I. Fiduciary Roles

Figure 1:
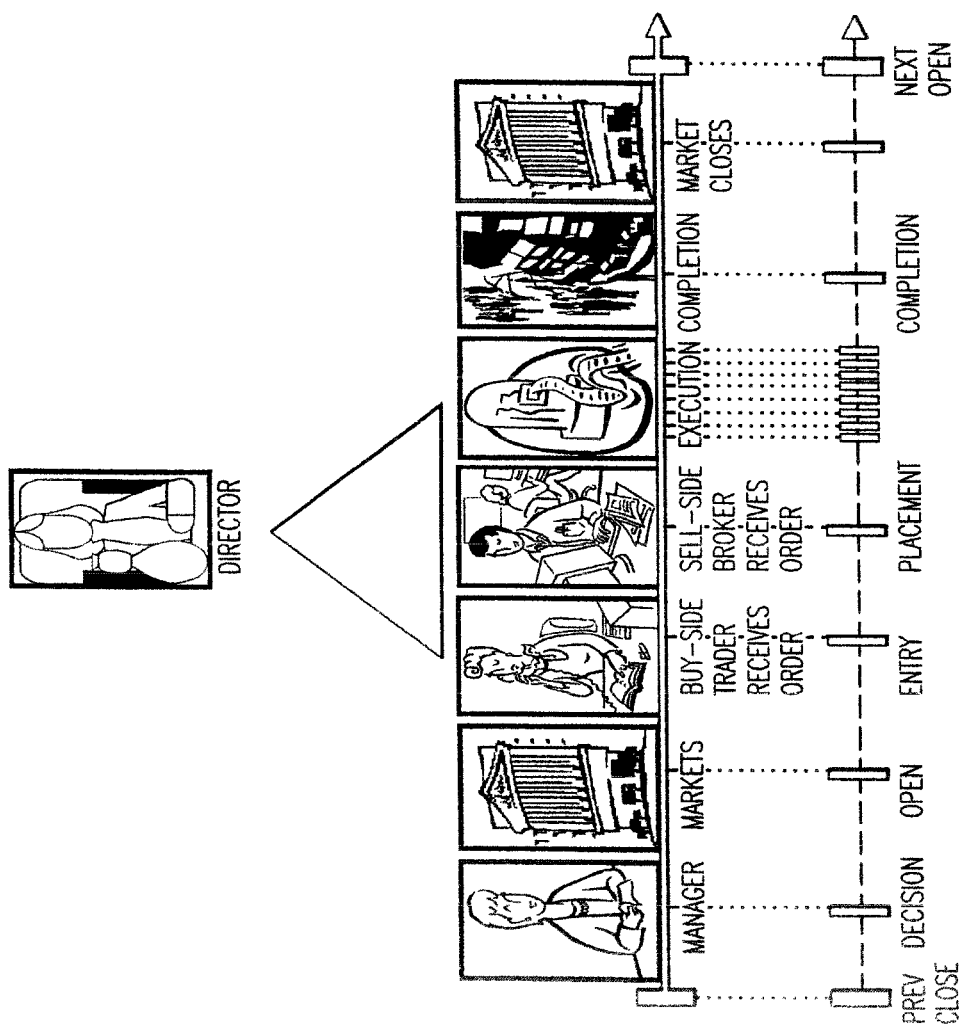
FIG. 1 illustrates fiduciary roles contemplated by a preferred embodiment of the invention.

One may expect to encounter certain fiduciary roles in the course of every-day trading. Consider, for example, the trading of stock instruments at the institutional level (see FIG. 1). An institutional buy-side manager in charge of a stock portfolio derives his trading mandate from the fiduciary responsibility vested in him by the various fund directors/sponsors in the fund he manages. Nevertheless note that even though there is a fiduciary handover from the director to the manager, the director is not relieved of his oversight responsibility. For example, Department of Labor Release 86-1 makes this abundantly clear for pension sponsors:

The fiduciary who appoints the investment manager is not relieved of his ongoing duty to monitor the investment manager to assure that the manager has secured best execution of the plan's transactions and to assure that the commissions paid on such transactions are reasonable in relation to the value of the brokerage and research services provided to the plan.

The director is thus responsible for the overall performance of the plan.

The time-horizon for the director may be in quarters or years, whereas the time-horizon for the manager's fiduciary responsibility may be in days, weeks, months, quarters, or years. Given the advertised risk profile for the fund, the manager is asked to optimize the market value of his portfolio by picking the right stocks in the right amounts and at the right times. The strategic selection of stocks out of the totality of all available stocks is the core function of the manager. In contrast, the strategic selection of funds and fund managers is the core function of the director.

In executing a trading decision, a manager engages the network resources of a buy-side trader, handing over the execution of the trade (either in total or piece-meal) along with execution instructions. For example, if the trade is triggered from an information-rich perspective, instructions to the buy-side trader may include explicit mandates for a speedy execution before the market insight is diffused and diluted via normal market mechanisms. The resources at the command of the buy-side trader are tactically engaged when the fiduciary responsibility is handed over to the trader. Nevertheless, such a handover may be conditional in the sense that it may include the constant re-adjustment of the order, based on the manager's overall strategic objective as well as the tactical feedback both from the trader and other trading information sources. Thus the hand-over could be a conditional hand-over to be fully determined by the play of unfolding events. Each trading organization has established the vocabulary as well as the expectations involved in these conditional handovers. The internal trading vocabulary as well as the accompanying instruction set is often unique within each trading organization in the sense that it captures the underlying trading philosophy of the organization. Within each trading organization, if the trade-specific instruction sets and trading updates are captured in an explicit sense, they provide the basis for a detailed and comprehensive analysis. However, various organizations capture the fine granularity of trading at various levels of detail. As the industry evolves, it is expected that trade capture will be obtainable at a sufficiently fine level of granularity to afford a correspondingly fine-grained analysis. In any event, the trade-cost measurement framework comprised in a preferred embodiment may be successfully applied at various levels of available granularity.

Having obtained the trading mandate from the manager, the buy-side trader puts into play the tactical advantages of the stock-specific trading network at his command. This may include aggregations received from other managers engaged in the trading of the target stock, the broker-dealer network, the execution modalities, the available instruction set within a given modality, as well as the price/volume/time profile he wishes to pursue based on stock-specific trading insights available to him and which he constantly updates cognizant of the market feedback he continuously receives. In allocating the fills he receives for a given stock (amongst the various competing accounts he manages), the buy-side trader needs to conform to allocation rules that provide for fair allocation amongst multiple fund managers. Also as mentioned, the buy-side trader needs to respond to the changes he receives from the manager upstream. Thus in a network sense, the buy-side trader is a dynamic information processing node (engaged in trading decisions) with many more nodes downstream to him (i.e., the sell-side) than are upstream (i.e., the manager-side). The time-horizon for the trader may be in days, weeks, or perhaps even months (for large orders). Mutual funds and pension funds show clear preferences on this dimension reflecting their respective trading philosophies. The time-horizon for traders at mutual funds is often at a day level, whereas for pension funds it is considerably longer.

By the time the buy-side trader engages the down-stream sell-side broker, it is highly likely that the time horizon has shrunk to less than a day; or at most a whole trading day. Also, the accompanying instruction set would likely be highly specific and standardized with respect to the degrees of freedom it allows the sell-side broker in executing the order. This is on account of the fact that with the buy-side to sell-side fiduciary handshake, the order now has crossed organizational boundaries; it therefore has specific contractual and other legal obligations. Furthermore, the buy-side desk needs to restrict the level of information it reveals in the open market in order to minimize the option value of the intent to trade. In executing large trades, buy-side firms pay a premium to maintain both name anonymity as well as the intent of the total trade.

As per the buy-side instruction-set, the sell-side broker executes the order using all available execution modalities during the course of the available time. For example, in a continuous auction market (such as the New York Stock Exchange), the purchase of a listed stock by the sell-side broker may first be handled by an exchange floor-broker who may either auction the trade amongst other floor-brokers, or place it with a market-making specialist to take advantage of the continuous market he provides for the given stock. By virtue of experiencing and directly participating in the real-time information-rich open market of the exchange floor, the floor-broker is capable of satisfying the unique fiduciary responsibility of finding the other side at the opportune time, price and volume. Similarly, the specialist who makes the market for the given stock has the central fiduciary responsibility to judiciously reveal the information accumulating at his information node including his limit book (about the buy/sell-side pressures) without inadvertently triggering unnecessary market jumps. Also the specialist has the added responsibility of providing market continuity by participating on the other side when (and only when) the other market participants are unavailable. As the order is filled, the sell-side broker reports back to the buy-side desk. At the completion of the order, allocations are made into the various participating buy-side portfolios. And over the course of subsequent days, the trade is cleared and settled between the trading firms through the offices of institutional clearing agents.

II. Underlying Data Structures

Throughout the life cycle of a given trade, as the trade moves from agent to agent, there are ten distinct information-sets that may be tracked:

1. The fiduciary organizational footprint (who/at which firm/for which accounts/in which group/and in what capacity).

2. The financial instrument description (instrument identifier, deal structure, etc.).

3. The instruction-set flow from the buy-side towards the market center (including volume to trade, trade-side, acceptable price-ranges, execution modalities, settlement instructions, constraints on intent revelation, change orders, etc.).

4. The trading rationale justifying the trade (for an internal audit) both by the manager as well as the trader before the trade goes live (including the investment/order horizon as well as the rationale for all the changes that affect the trade during the course of its investment/order-length life cycle).

5. The market feedback flow from the market center towards the buy-side, recording: (a) the before-trade market context capturing the opportunity to execute the trading intent; (b) the dynamic market context as the order is being filled; and (c) the post-trade market context.

6. The time-stamps as and when the above transactions/activities occur.

7. The trade/order linkages that connect individual trades by the buy-side trader to the totality of the order (i.e., the trader-order) that he worked on behalf of all the fund-managers he traded for.

8. The allocation-linkages that connect allocation-fills within each individual trade back to the totality of individual requests by the various fund-managers.

9. The management/order linkages that connect the above allocation linkages back to the totality of the order (the manager-order) as the individual fund manager had placed it.

10. The investment-linkages that connect individual management/order linkages back to the totality of all the manager-orders falling within a common investment-length time horizon.

Each of these information sets may be codified and recorded for the purposes of on-going as well as after-the-trade analysis. However, not every information item in the above data set is of the highest priority. Depending upon the resources at hand as well as the underlying trading philosophy at the firm, some of the informational items are more significant than others. Also, while significant, some of the informational items may be gleaned from independent data resources, such as historic market data from independent market data vendors. In such cases, all that is required is the ability to cross-tag the in-house and the vendor provided data sets. Thus in the case of market data, the problem reduces to that of capturing accurate time-stamps (item 6 above) as well as cross-reference symbol tags (item 2 above) to match the trade instrument. Thus an organization may either adopt a minimalist approach to capture the above trade related data sets, or it may go the extra mile and attempt a comprehensive all-encompassing data-capture. While the costs incurred (both organizational as well as technological) in the latter approach are substantial, it has the advantage of capturing the view available to the trading agent as and when it occurs, free from any down-stream after-the-fact corrections by third party market data vendors as well as any cross-tagging issues.

In practice, each trading organization, true to its trading philosophy, records and tracks its trades in ways that are unique to it. One of the key problems facing the trading industry is the issue of systematizing and standardizing the variety of trade related data sets. The measurement framework of a preferred embodiment of the present invention provides a logical architecture for capturing the diversity of trade related data sets by abstracting and standardizing that which is common between the data sets while at the same time allowing client-specific data extensions for customized analysis.

Depending on the sophistication of the firm's order-management system, many of the above data-capture tasks may be automated to avoid burdening the trading agent. For example, the event-specific market-context may be automatically captured as and when the given trading event occurs. Also, in order to allow seamless information flow between diverse systems within and across firms, it is advisable to standardize that piece of information that is being transferred. The more frequent and widespread the information transfer, the greater the incentive to standardize on the underlying information set. And vice-versa, the less frequent and widespread the information transfer, the lesser the incentive to standardize on the information set. And the greater the security and proprietary concerns about a given data set, the lesser the incentives to standardize across the user base. The trade-cost measurement framework of a preferred embodiment affords sufficient flexibility and generality to embrace diverse needs and concerns without compromising the ability to measure the cost of trading against a common benchmark (i.e., the market).

III. Framework of Time-Stamps

Depending on the data-capture resources at hand, there are four sets of decision/hand-over/market event time-stamps that a trading desk may fruitfully use:

OC (Open-Close). This is the most rudimentary time-stamp setup that a trading desk could capture. It consists of two standard market events: a) the open and b) the close events. Since both these time-stamps may be calculated from the independently available market-data, the main event that is captured in the OC model is simply the date-stamp of the trading day.

OEXcC (Open-Entry-eXecution completion-Close). Over and above the time-stamps in the OC model, the OEXcC model includes two other time-stamps: a) the time-stamp when the order enters (or reaches) the buy-side trading desk from the portfolio manager and b) the time-stamp when the execution is completed. Inclusion of the entry time-stamp allows the tracking of the fiduciary hand-over from the manager to the buy-side trader. And the inclusion of the execution completion time-stamp allows analysis of the timing decision for completion. Depending upon the arrangement with the sell-side, the execution completion event could be reported (in decreasing order of precision) either at each fill, or at the end of the total execution, or at the close of the day.

DOEXcC (Decision-Open-Entry-eXecution completion-Close). The DOEXcC model includes every time-stamp in the OEXcC model; it also includes the time-stamp when the manager decides to engage in trading. Instead of being a hand-over time-stamp between two agents, the decision time-stamp marks an introspective event at the discretion of the manager. It marks the genesis of a given trade order; and the regularity with which it occurs may reflect the afore-mentioned trading philosophy within a given firm. But to the extent that the time-stamp boundary points for the decision event may be effectively bracketed and captured within the organizational data-capture, it adds to the tracking and therefore the analysis of the latency between the decision and the entry events.

DOEPXcC (Decision-Open-Entry-Placement-eXecution completion-Close). The DOEPXcC model adds the placement event to the DOEXcC model. The placement event is a critical legal/fiduciary handover event that spans organizational boundaries between buy and sell-side firms. The DOEPXcC time set is also referred to herein and in the figures as the ODEPXcC time set.

While the above set contains some of the basic decision/hand-over/market-event time-stamps in the realm of equity trading, it is by no means comprehensive nor exhaustive for all trading instruments/events. Consider for example that one may easily drop the decision event from the DOEPXcC model to arrive at a new OEPXcC model. In other words, the system may be easily extended, from the most basic capture (namely the trade-date), to the most detailed (including all market, decision as well as hand-over events). The underlying approach of time stamping the various decision/hand-over/market events is sufficiently generic and may be applied across the board for the analysis of trading decisions by diverse fiduciary agents. Furthermore, as the markets evolve, finer granularity in time stamping will allow a closer mapping of the fiduciary linkages across agents/agencies. Once again, the underlying methodology is sufficiently generic.

IV. Levels Of Analysis

Once the trade data as well as the appropriate time-stamps have been reliably captured, the trading value chain may be analyzed at the following nine levels (see FIG. 2) of interest:

Level I: The Investment Level Analysis, which tracks the trading activity from Order Open to Period Close. Note that Period Close here indicates the closing of regular calendar periods (such as end-of-month, end-of-quarter, end-of-year, etc.) when portfolio returns are usually evaluated and judged for performance. This analysis could also be done from Investment Open to Period Close or Order Decision to Period Close if the time-stamps are available.

Level II: The Order Level Analysis, which tracks the trading activity from Order Open or Order Entry to Order Close.

Level III: The Investment/Order Reconciliation Level Analysis, which reconciles and closes the gap between the Order Level and the Investment Level outlook.

Level IV: The Day Level Analysis, which tracks the trading activity from the Day Open (or the Day Entry, if the time-stamp is available) to the Day Close.

Level V: The Order/Day Reconciliation Level Analysis, which reconciles and closes the gap between the Order Level and the Day Level outlook.

Level VI: The Working Level Analysis, which tracks the trading activity from the Day Entry (or the Day Placement, if the time-stamp is available) to the Execution Close.

Level VII: The Available Level Analysis, which tracks the trading activity from the Day Placement to the Day Close.

Level VIII: The Day/Working Reconciliation Level Analysis, which reconciles and closes the gap between the Day Level and Working Level outlook. And if the Placement Time-Stamp were available, then the Level-VIII Analysis would be the Available/Working Reconciliation Level Analysis, which reconciles and closes the gap between the Available Level and the Working Level outlook.

Level IX: The Day/Available Reconciliation Level Analysis, which reconciles and closes the gap between the Day Level and the Available Level outlook.

Obviously, if the relevant time-stamps were not being captured, the level of analysis that could be done would be limited. But at the very minimum, analysis levels I-V would be available to all clients who at least captured the date of the trade. Sections VI to IX below go case-by-case through the available levels of analysis for each of the four time-sets described in Section III. Section X expands the framework to include portfolio return analysis.

Figure 2:
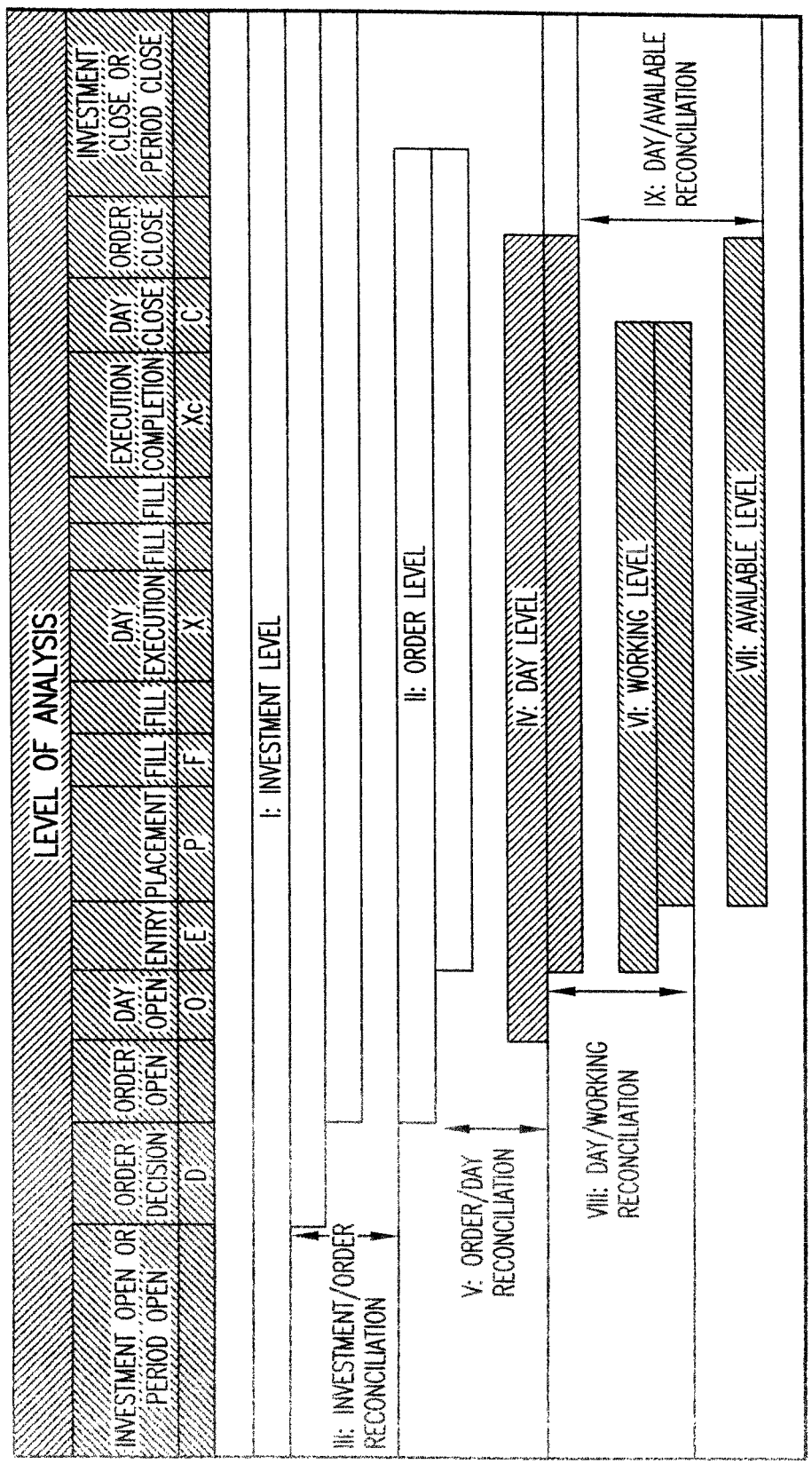
FIG. 2 illustrates levels of analysis contemplated by a preferred embodiment of the invention.

Note that in FIG. 2 the relevant time-stamps (along with the respective symbolic representations) are as shown at the top rows. The execution time-stamp (X) is an unreported hypothetical time-stamp between placement (P) and execution completion (Xc).

V. Client Execution And Market Clearing Prices From Sample Data Sets

FIGS. 3 and 4, respectively, depict sample sets of Client Fills and the corresponding Time Of Sales available in the market.

As shown in FIG. 3 (Client Fill Summary), the (trader) order spanned two consecutive days. On each of the two days, the client traded 10,000 shares with five fills for Day 1 and four fills for Day 2. On Day 1 the sum of the [Price×Volume] product totals $812,250 traded dollars. Thus, on Day 1, the Execution Volume Weighted Average Price (VWAP) the client gets is:

$$ExecVWAP(Day1) = \frac{\sum FillPrice \times FillVolume}{\sum FillVolume} \quad (1)$$
$$= \frac{812,250}{10,000}$$
$$= \$81.23$$

Similarly, on Day 2 the sum of the [Price×Volume] product totals 945,250 traded dollars. Thus on Day 2, the Execution Volume Weighted Average Price (VWAP) the client gets is:

$$ExecVWAP(Day2) = \frac{\sum FillPrice \times FillVolume}{\sum FillVolume} \quad (2)$$
$$= \frac{945,250}{10,000}$$
$$= \$94.53$$

At the Order Level, the sum of the [Price×Volume] product totals 1,757,500 traded dollars. And the Execution Volume Weighted Average Price (VWAP) the client gets is:

$$ExecVWAP(Order) = \frac{\sum FillPrice \times FillVolume}{\sum FillVolume} \quad (3)$$
$$= \frac{1,757,500}{20,000}$$
$$= \$87.88$$

Similarly, from the Time of Sales data set (see FIG. 4) one may calculate the Market Clearing Prices (MCP) between any pair of time points (which is the Volume Weighted Average Price or VWAP between the two time points). For example, the Market Clearing Price between Entry (time segment 6) and Day Close (time segment 42) for Day 1 is:

$$MCP\_ec(Day1) = \frac{\sum_{Seg6}^{Seg42} \text{Price} \times \text{Volume}}{\sum_{Seg6}^{Seg42} \text{Volume}} \quad (4)$$

$$= \frac{7,865,600}{101,000}$$

$$= \$77.88$$

Similar calculations may be made for other time periods.

Here we have used the Volume Weighted Average Price (VWAP) as the representative market price. The VWAP measure uses all of the traded volume to arrive at representative number. If we assume instead that a given client trading a given volume could at best achieve say 20% (or an alternate-stock-specific normal rate of trading) of the total traded volume in each time segment, we may then calculate what is termed the Twenty Percent Test Measure (TPTM). To illustrate: the 10,000 share client volume for Day-1 may be executed in a 20% sense between the entry segment (Segment 6) and Segment 14. And the volume weighted average price of these 20% segment volumes would be the Twenty Percent Test Measure starting at Entry:

$$TPTM\_e(Day1) = \frac{\sum_{Seg6}^{Seg14} \text{Price} \times 20\% \text{ Volume}}{\sum_{Seg6}^{Seg14} 20\% \text{ Volume}} \quad (4a)$$

$$= \frac{733,840}{10,000}$$

$$= \$73.384$$

And in the equations that follow, instead of using the market VWAP as the benchmark for comparison, we may as well use the Twenty Percent Test Measure as shown above.

VI. Analysis of the OC Time-Set

Consider now the example of a client who has the very minimum of all possible time-stamps, namely the OC (the Open-Close; see FIG. 5) set. As mentioned above, at a minimum each client is recording the date the trade occurred.

Figure 5:
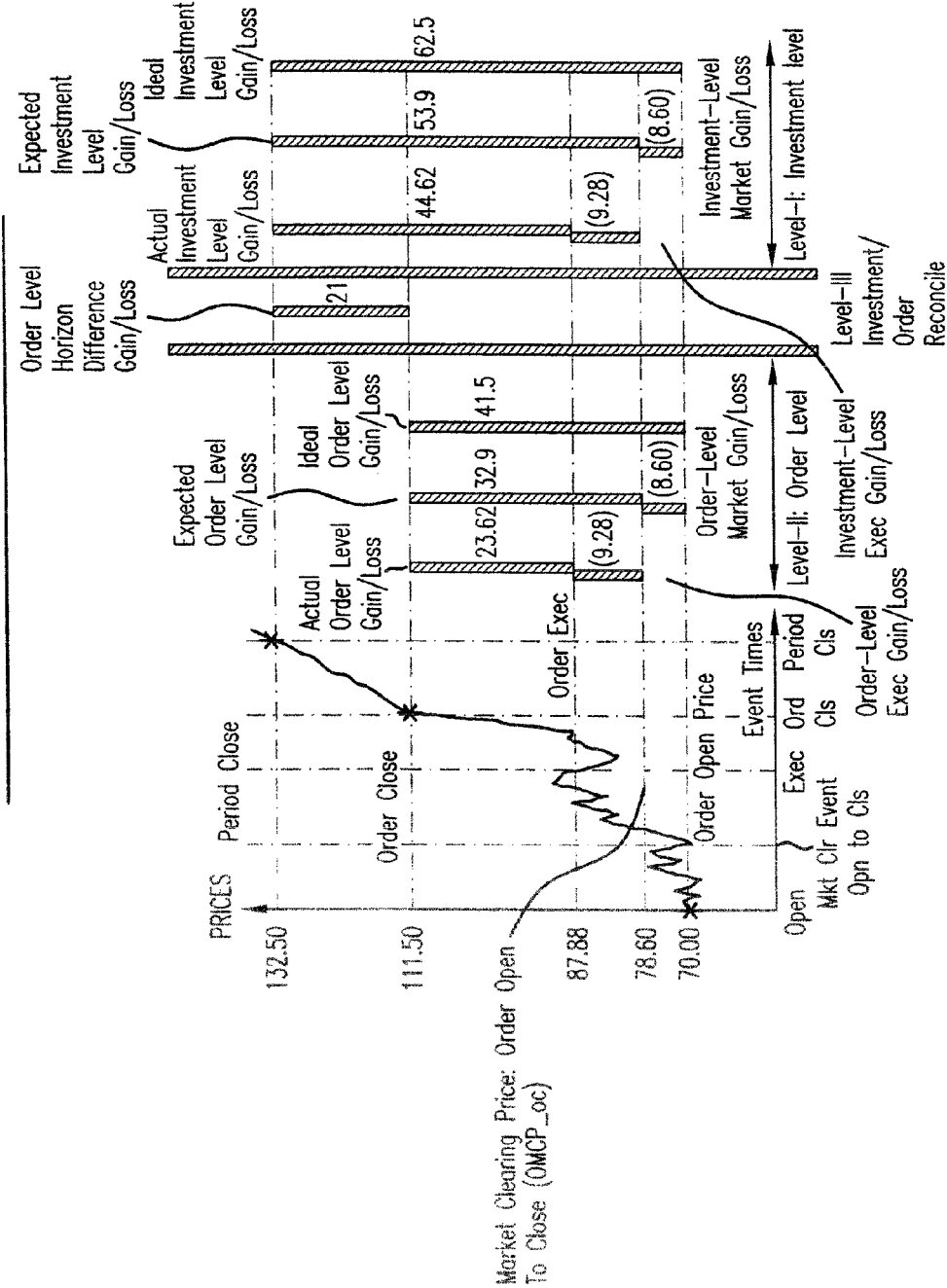
FIG. 5 illustrates a preferred investment/order level cost analysis for an exemplary open-close time set.

In the sample OC set (depicted in FIG. 5), the day the order opened, the stock opened at $70.00 (the Order Open price: Order-Open). During the length of the total order, the order executed at $87.88 (the Order-Exec). On the day the order closed, the stock closed at $111.50 (Order_Close). And at the end of the investment period, the stock closed at $132.50 (Period_Close). Also, during the time the order was in the market, the order-length market-clearing price (OMCP_oc), which is the volume weighted average price from order open to order close, is at $78.60. Given these investment/order level price-points, one could construct Levels I, II, & III of the cost/performance analysis as shown in FIG. 5.

Level I: The Investment Level Analysis. A preferred Level I Analysis for the OC-set involves five separate cost numbers as follows:

Ideal Investment Level Gain/Loss: The difference between Period_Close ($132.50) and Order_Open ($70.00), which amounts to $62.50, spans the full range of investment level gain (or loss) that may be achieved in an ideal frictionless market. And the corresponding gain/loss factor preferably is obtained by dividing by the order length Order_Exec. Note that these factors may also be obtained by dividing by the appropriate Market Clearing Prices (for example, here OMCP_oc). And when dealing with Reconciliation Levels (Levels III, V, VIII, & IX), the Market Clearing Price associated with the longer time span ought to be used. Using the Market Clearing Price instead of the Execution Price helps make the various factors comparable. Thus:

Ideal Investment Level Gain/Loss=(Period_Close−Order_Open) (5)

Ideal Investment Level Gain/Loss Factor= (Period_Close−Order_Open)/Order_Exec (6)

Expected Investment Level Gain/Loss: The difference between Period_Close ($132.50) and the order-length market-clearing price (OMCP_oc) ($78.60), which amounts to $53.90, spans the expected investment level gain (or loss) that may be achieved in a frictional market. And the corresponding gain/loss factor may be obtained by dividing by the order length Order_Exec. Thus:

Expected Investment Level Gain/Loss= (Period_Close−OMCP_oc) (7)

Expected Investment Level Gain/Loss Factor= (Period_Close−OMCP_oc)/Order_Exec (8)

Actual Investment Level Gain/Loss: The difference between Period_Close ($132.50) and the order-length execution price (Order_Exec) ($87.88), which amounts to $44.62, spans the actual investment level gain (or loss) that was achieved by the client in a frictional market. And the corresponding gain/loss factor may be obtained by dividing by the order length Order_Exec. Thus:

Actual Investment Level Gain/Loss=(Period_Close−Order_Exec) (9)

Actual Investment Level Gain/Loss Factor= (Period_Close−Order_Exec)/Order_Exec (10)

Market Investment Level Gain/Loss: The difference between Order_Open ($70.00) and order-length market-clearing price (OMCP_oc=$78.60), which amounts to −$8.60, is a measure of market impact and captures the average cost of trading during the length of the order. The corresponding gain/loss factor may be obtained by dividing by the order length Order_Exec. Thus:

Market Investment Level Gain/Loss=(Order_Open−OMCP_oc) (11)

Market Investment Level Gain/Loss Factor=(Order_Open−OMCP_oc)/Order_Exec (12)

Execution Investment Level Gain/Loss: The difference between order-length market-clearing price (OMCP_oc=$78.60) and the order-length execution price (Order_Exec) ($87.88), which amounts to −$9.28, is a measure of the excess cost paid out by the client as measured against the market average. The corresponding gain/loss factor may be obtained by dividing by the order length Order_Exec. Thus:

Execution Investment Level Gain/Loss=(OMCP_oc−Order_Exec) (13)

Execution Investment Level Gain/Loss Factor= (OMCP_oc−Order_Exec)/Order_Exec (14)

Level II: The Order Level Analysis. A preferred Level II Analysis for the OC-set involves five separate cost numbers as follows:

Ideal Order Level Gain/Loss: The difference between Order_Close ($111.50) and Order_Open ($70.00), which amounts to $41.50, spans the full range of order level gain (or loss) that may be achieved in an ideal frictionless market. And the corresponding gain/loss factor may be obtained by dividing by the order length Order_Exec. Thus:

$$\text{Ideal Order Level Gain/Loss} = (\text{Order\_Close} - \text{Order\_Open}) \quad (15)$$

$$\text{Ideal Order Level Gain/Loss Factor} = (\text{Order\_Close} - \text{Order\_Open})/\text{Order\_Exec} \quad (16)$$

Expected Order Level Gain/Loss: The difference between Order_Close ($111.50) and the order-length market-clearing price (OMCP_oc) ($78.60), which amounts to $32.90, spans the expected order level gain (or loss) that may be achieved in a frictional market. And the corresponding gain/loss factor may be obtained by dividing by the order length Order_Exec. Thus:

$$\text{Expected Order Level Gain/Loss} = (\text{Order\_Close} - \text{OMCP\_oc}) \quad (17)$$

$$\text{Expected Order Level Gain/Loss Factor} = (\text{Order\_Close} - \text{OMCP\_oc})/\text{Order\_Exec} \quad (18)$$

Actual Order Level Gain/Loss: The difference between Order_Close ($111.50) and the order-length execution price (Order_Exec) ($87.88), which amounts to $23.62, spans the actual order level gain (or loss) that was achieved by the client in a frictional market. And the corresponding gain/loss factor may be obtained by dividing by the order length Order_Exec. Thus:

$$\text{Actual Order Level Gain/Loss} = (\text{Order\_Close} - \text{Order\_Exec}) \quad (19)$$

$$\text{Actual Order Level Gain/Loss Factor} = (\text{Order\_Close} - \text{Order\_Exec})/\text{Order\_Exec} \quad (20)$$

Market Order Level Gain/Loss: The difference between Order_Open ($70.00) and order-length market clearing price (OMCP_oc=$78.60), which amounts to −$8.60, is a measure of market impact and captures the average cost of trading during the length of the order. The corresponding gain/loss factor may be obtained by dividing by the order length Order_Exec. Thus:

$$\text{Market Order Level Gain/Loss} = (\text{Order\_Open} - \text{OMCP\_oc}) \quad (21)$$

$$\text{Market Order Level Gain/Loss Factor} = (\text{Order\_Open} - \text{OMCP\_oc})/\text{Order\_Exec} \quad (22)$$

Execution Order Level Gain/Loss: The difference between order-length market-clearing price (OMCP_oc=$78.60) and the order-length execution price (Order_Exec) ($87.88), which amounts to −$9.28, is a measure of the excess cost paid out by the client as measured against the market average. The corresponding gain/loss factor may be obtained by dividing by the order length Order_Exec. Thus:

$$\text{Execution Order Level Gain/Loss} = (\text{OMCP\_oc} - \text{Order\_Exec}) \quad (23)$$

$$\text{Execution Order Level Gain/Loss Factor} = (\text{OMCP\_oc} - \text{Order\_Exec})/\text{Order\_Exec} \quad (24)$$

Level III: The Investment/Order Reconciliation Level Analysis. A preferred Level III Analysis for the OC-set involves a single set of reconciliation cost numbers as follows:

Order Level Horizon Difference Gain/Loss: The difference between Period_Close ($132.50) and Order_Close ($111.50), which amounts to $21, accounts for the market gain (or loss) that occurred between order close and period close. And the corresponding gain/loss factor may be obtained by dividing by the order length Order_Exec. Thus:

$$\text{Order Level Horizon Difference Gain/Loss} = (\text{Period\_Close} - \text{Order\_Close}) \quad (25)$$

$$\text{Order Level Horizon Difference Gain/Loss Factor} = (\text{Period\_Close Order\_Close})/\text{Order\_Exec} \quad (26)$$

Figure 6:
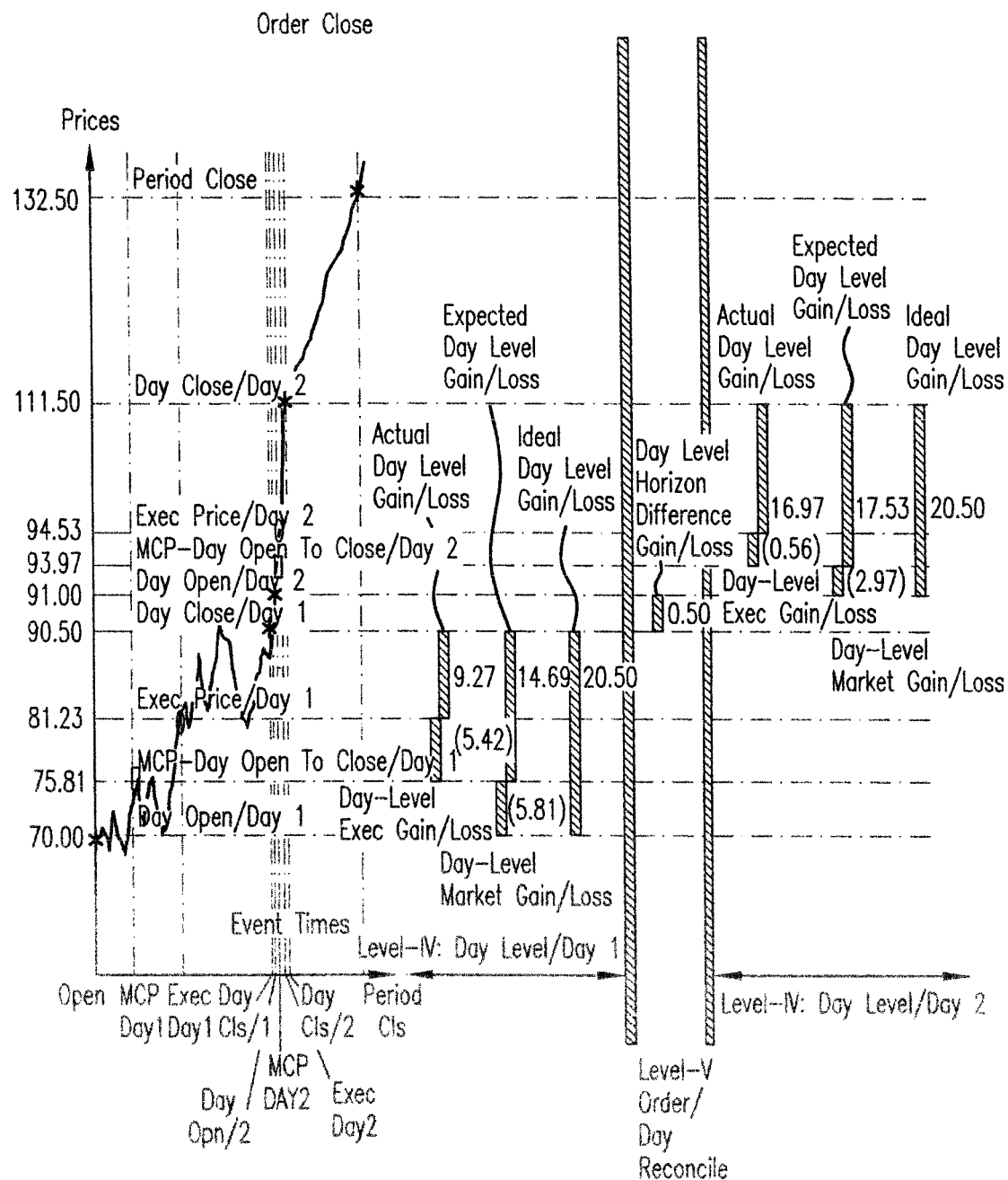
FIG. 6 illustrates a preferred order/day level cost analysis for an exemplary open-close time set.

Consider now the day level analysis with the OC set (FIG. 6). On Day-1, the stock opened at $70.00 (the Day_Open). During the length of the day, the client executed at $81.23 (the Day_Exec). And the stock closed at $90.50 (Day_Close). During the time the client was in the market, the day-length market-clearing price (DMCP_oc), which is the volume weighted average price from day open to day close, is at $75.81. On Day-2, the stock opened at $91.00 (the Day_Open). During the length of the day, the client executed at $94.53 (the Day_Exec). And the stock closed at $111.50 (Day_Close). During the time the client was in the market, the day-length market-clearing price (DMCP_oc) is at $93.97. Given these day level price-points, in a preferred embodiment Levels IV & V of the cost/performance analysis are constructed as shown in FIG. 6.

Level IV: The Day Level Analysis. A preferred Level VI Analysis for the OC-set involves five separate cost numbers as follows:

Ideal Day Level Gain/Loss: The difference between Day_Close ($90.50 for Day 1 and $111.50 for Day 2) and Day_Open ($70.00 for Day 1 and $91.00 for Day 2); which amounts to $20.50 (for each day); spans the full range of day level gain (or loss) that may be achieved in an ideal frictionless market. And the corresponding gain/loss factor may be obtained by dividing by the day length Day_Exec. Thus:

$$\text{Ideal Day Level Gain/Loss} = (\text{Day\_Close} - \text{Day\_Open}) \quad (27)$$

$$\text{Ideal Day Level Gain/Loss Factor} = (\text{Day\_Close} - \text{Day\_Open})/\text{Day\_Exec} \quad (28)$$

Expected Day Level Gain/Loss: The difference between Day_Close ($90.50 for Day 1 and $111.50 for Day 2) and the day-length market-clearing price (DMCP_oc) ($75.81 for Day 1 and $93.97 for Day 2); which amounts to $14.69 for Day 1 and $17.53 for Day 2, spans the expected day level gain (or loss) that may be achieved in a frictional market. And the corresponding gain/loss factor may be obtained by dividing by the day length Day_Exec. Thus:

$$\text{Expected Day Level Gain/Loss} = (\text{Day\_Close} - \text{DMCP\_oc}) \quad (29)$$

$$\text{Expected Day Level Gain/Loss Factor} = (\text{Day\_Close} - \text{DMCP\_oc})/\text{Day\_Exec} \quad (30)$$

Actual Day Level Gain/Loss: The difference between Day_Close ($90.50 for Day 1 and $111.50 for Day 2) and the day-length execution price (Day_Exec) ($81.23 for Day 1 and $94.53 for Day 2), which amounts to $9.27 for Day 1 and $16.97 for Day 2, spans the actual day level gain (or loss) that was achieved by the client in a frictional market. And the corresponding gain/loss factor may be obtained by dividing by the day length Day_Exec. Thus:

$$\text{Actual Day Level Gain/Loss} = (\text{Day\_Close} - \text{Day\_Exec}) \quad (31)$$

$$\text{Actual Day Level Gain/Loss Factor} = \text{Day\_Close} - \text{Day\_Exec})/\text{Day\_Exec} \quad (32)$$

Market Day Level Gain/Loss: The difference between Day_Open ($70.00 for Day 1 and $91.00 for Day 2) and day-length market-clearing price (DMCP_oc) ($75.81 for Day 1 and $93.97 for Day 2, which amounts to −$5.81 for Day 1 and −$2.97 for Day 2, is a measure of market impact and captures the average cost of trading during the length of the day. The corresponding gain/loss factor may be obtained by dividing by the day length Day_Exec. Thus:

$$\text{Market Day Level Gain/Loss} = (\text{Day\_Open} - \text{DMCP\_oc}) \quad (33)$$

$$\text{Market Day Level Gain/Loss Factor} = (\text{Day\_Open} - \text{DMCP\_oc})/\text{Day\_Exec} \quad (34)$$

Execution Day Level Gain/Loss: The difference between day-length market-clearing price (DMCP_oc) ($75.81 for Day 1 and $93.97 for Day 2) and the day-length execution price (Day_Exec) ($81.23 for Day 1 and $94.53 for Day 2), which amounts to −$5.42 for Day 1 and −$0.56 for Day 2, is a measure of the excess cost paid out by the client as measured against the market average. The corresponding gain/loss factor may be obtained by dividing by the day length Day_Exec. Thus:

$$\text{Execution Day Level Gain/Loss} = (\text{DMCP\_oc} - \text{Day\_Exec}) \quad (35)$$

$$\text{Execution Day Level Gain/Loss Factor} = (\text{DMCP\_oc} - \text{Day\_Exec})/\text{Day\_Exec} \quad (36)$$

Level V: The Order/Day Reconciliation Level Analysis. A preferred Level V Analysis for the OC-set involves a single set of reconciliation cost numbers as follows:

Day Level Horizon Difference Gain/Loss: The difference between Day_Open ($91.00) for Day 2 and Last_Day_Close ($90.50) for Day 1, which amounts to $0.50, accounts for the market gain (or loss) that occurred between the close and open on consecutive days. And the corresponding gain/loss factor may be obtained by dividing by the order length Order_Exec. Thus:

$$\text{Day Level Horizon Difference Gain/Loss} = (\text{Day\_Open} - \text{Last\_Day\_Close}) \quad (37)$$

$$\text{Day Level Horizon Difference Gain/Loss Factor} = (\text{Day\_Open} - \text{Last\_Day\_Close})/\text{Order\_Exec} \quad (38)$$

VII. Analysis of the OEXcC Time-Set

Figure 7:
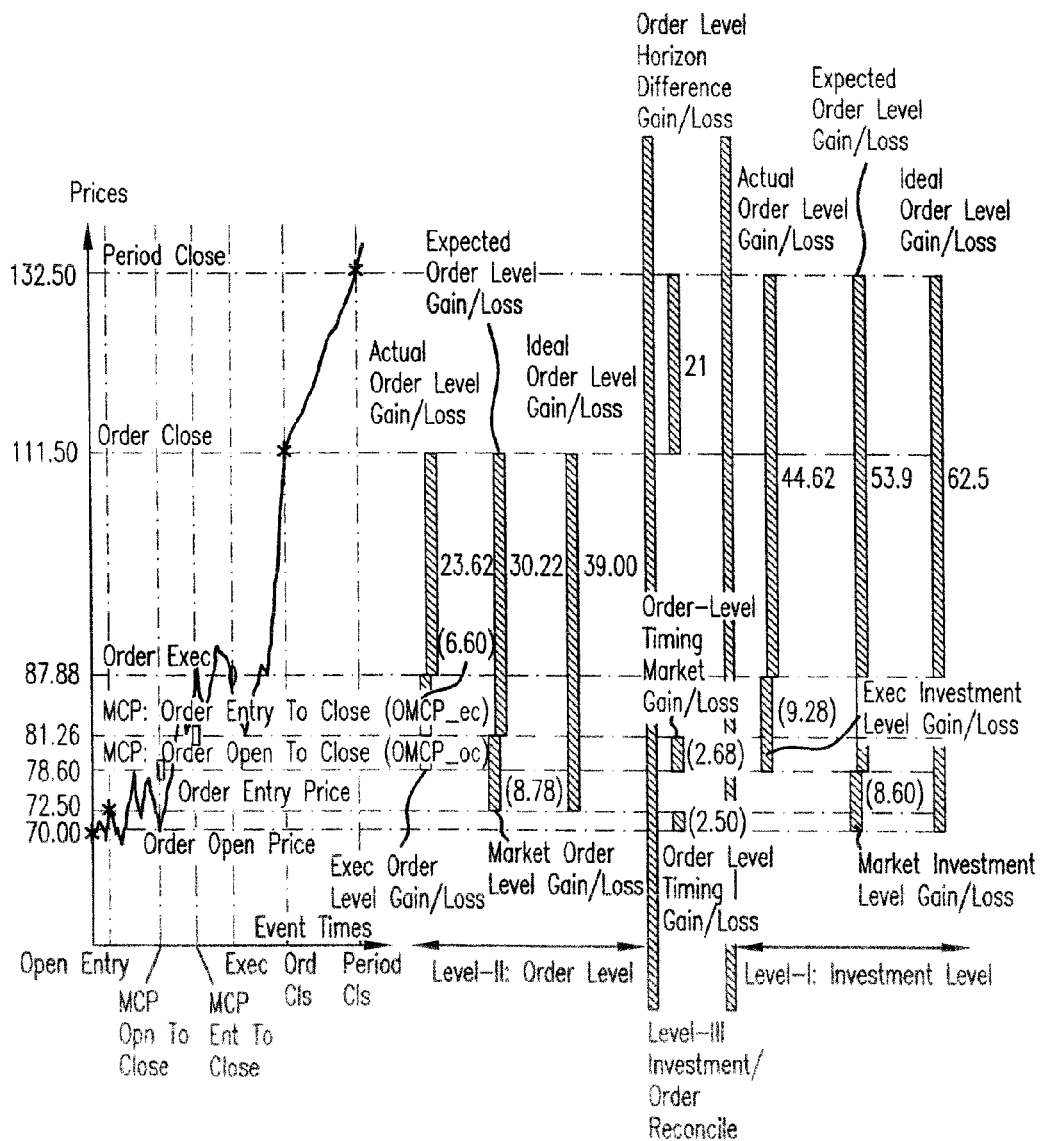
FIG. 7 illustrates a preferred investment/order level cost analysis for an exemplary open-entry-execution completion-close time set.

Consider now the example of a client who has over and above the OC set, also the Entry timestamps (i.e., the OEXcC set) as shown in FIG. 7. In the sample OEXcC set, the day the order opened, the stock opened at $70.00 (the Order_Open). The Portfolio Manager handed over the order for trading when the stock was at $72.50 (the Order_Entry). During the length of the total order, the order executed at $87.88 (the Order_Exec). On the day the order closed, the stock closed at $111.50 (Order_Close). At the end of the investment period the stock closed at $132.50 (Period_Close). The order-length market-clearing price from order-open to order-close (OMCP_oc) is at $78.60. Also the order-length market-clearing price from order-entry to order-close (OMCP_ec) is at $81.28. Given these investment/order level price-points, in a preferred embodiment, Levels I, II & III of the cost/performance analysis are constructed as shown in FIG. 7.

Level I: The Investment Level Analysis. A preferred Level I Analysis for the OEXC-set involves five separate cost numbers as follows:

Ideal Investment Level Gain/Loss: The difference between Period_Close ($132.50) and Order_Open ($70.00), which amounts to $62.5, spans the full range of investment level gain (or loss) that may be achieved in an ideal frictionless market. And the corresponding gain/loss factor may be obtained by dividing by the order length Order_Exec. Thus:

$$\text{Ideal Investment Level Gain/Loss} = (\text{Period\_Close} - \text{Order\_Open}) \quad (39)$$

$$\text{Ideal Investment Level Gain/Loss Factor} = (\text{Period\_Close} - \text{Order\_Open})/\text{Order\_Exec} \quad (40)$$

Expected Investment Level Gain/Loss: The difference between Period_Close ($132.50) and the order-length market-clearing price (OMCP_oc) ($78.60), which amounts to $53.9, spans the expected investment level gain (or loss) that may be achieved in a frictional market. And the corresponding gain/loss factor may be obtained by dividing by the order length Order_Exec. Thus:

$$\text{Expected Investment Level Gain/Loss} = (\text{Period\_Close} - \text{OMCP\_oc}) \quad (41)$$

$$\text{Expected Investment Level Gain/Loss Factor} = (\text{Period\_Close} - \text{OMCP\_oc})/\text{Order\_Exec} \quad (42)$$

Actual Investment Level Gain/Loss: The difference between Period_Close ($132.50) and the order-length execution price (Order_Exec) ($87.88), which amounts to $44.62, spans the actual investment level gain (or loss) that was achieved by the client in a frictional market. And the corresponding gain/loss factor may be obtained by dividing by the order length Order_Exec. Thus:

$$\text{Actual Investment Level Gain/Loss} = (\text{Period\_Close} - \text{Order\_Exec}) \quad (43)$$

$$\text{Actual Investment Level Gain/Loss Factor} = (\text{Period\_Close} - \text{Order\_Exec})/\text{Order\_Exec} \quad (44)$$

Market Investment Level Gain/Loss: The difference between Order_Open ($70.00) and order-length market-clearing price (OMCP_oc=$78.60), which amounts to −$8.60, is a measure of market impact and captures the average cost of trading during the length of the order. The corresponding gain/loss factor may be obtained by dividing by the order length Order_Exec. Thus:

$$\text{Market Investment Level Gain/Loss} = (\text{Order\_Open} - \text{OMCP\_oc}) \quad (45)$$

$$\text{Market Investment Level Gain/Loss Factor} = (\text{Order\_Open} - \text{OMCP\_oc})/\text{Order\_Exec} \quad (46)$$

Execution Investment Level Gain/Loss: The difference between order-length market-clearing price (OMCP_oc=$78.60) and the order-length execution price (Order_Exec) ($87.88), which amounts to −$9.28, is a measure of the excess cost paid out by the client as measured against the market average. The corresponding gain/loss factor may be obtained by dividing by the order length Order_Exec. Thus:

$$\text{Execution Investment Level Gain/Loss} = (\text{OMCP\_oc} - \text{Order\_Exec}) \quad (47)$$

$$\text{Execution Investment Level Gain/Loss Factor} = (\text{OMCP\_oc} - \text{Order\_Exec})/\text{Order\_Exec} \quad (48)$$

Level II: The Order Level Analysis. A preferred Level II Analysis for the OEXcC-set involves five separate cost numbers as follows:

Ideal Order Level Gain/Loss: The difference between Order_Close ($111.50) and Order_Entry ($72.50), which amounts to $39.0, spans the full range of order level gain (or loss) that may be achieved in an ideal frictionless market by the trader. And the corresponding gain/loss factor may be obtained by dividing by the order length Order_Exec. Thus:

Ideal Order Level Gain/Loss=(Order_Close−Order_Entry) (49)

Ideal Order Level Gain/Loss Factor=(Order_Close−Order_Entry)/Order_Exec (50)

Expected Order Level Gain/Loss: The difference between Order_Close ($111.50) and the order-length market-clearing price from entry to close (OMCP_oc) ($81.28), which amounts to $30.22, spans the expected order level gain (or loss) that may be achieved in a frictional market. And the corresponding gain/loss factor may be obtained by dividing by the order length Order_Exec. Thus:

Expected Order Level Gain/Loss=(Order_Close−OMCP_ec) (51)

Expected Order Level Gain/Loss Factor=(Order_Close−OMCP_ec)/Order_Exec (52)

Actual Order Level Gain/Loss: The difference between Order_Close ($111.50) and the order-length execution price (Order_Exec) ($87.88), which amounts to $23.62, spans the actual order level gain (or loss) that was achieved by the client in a frictional market. And the corresponding gain/loss factor may be obtained by dividing by the order length Order_Exec. Thus:

Actual Order Level Gain/Loss=(Order_Close−Order_Exec) (53)

Actual Order Level Gain/Loss Factor=(Order_Close−Order_Exec)/Order_Exec (54)

Market Order Level Gain/Loss: The difference between Order_Entry ($72.50) and order-length market clearing price from entry to close (OMCP_ec=$81.28), which amounts to −$8.78, is a measure of market impact and captures the average cost of trading during the length of the order. The corresponding gain/loss factor may be obtained by dividing by the order length Order_Exec. Thus:

Market Order Level Gain/Loss=(Order_Open−OMCP_ec) (55)

Market Order Level Gain/Loss Factor=(Order_Open−OMCP_ec)/Order_Exec (56)

Execution Order Level Gain/Loss: The difference between order-length market-clearing price from entry to close (OMCP_ec=$81.28) and the order-length execution price (Order_Exec) ($87.88), which amounts to −$6.60, is a measure of the excess cost paid out by the client as measured against the market average. The corresponding gain/loss factor may be obtained by dividing by the order length Order_Exec. Thus:

Execution Order Level Gain/Loss=(OMCP_ec−Order_Exec) (57)

Execution Order Level Gain/Loss Factor=(OMCP_ec−Order_Exec)/Order_Exec (58)

Level III: The Investment/Order Reconciliation Level Analysis. A preferred Level III Analysis for the OEXcC-set involves three reconciliation cost numbers as follows:

Order Level Horizon Difference Gain/Loss: The difference between Period_Close ($132.50) and Order_Close ($111.50), which amounts to $21, accounts for the market gain (or loss) that occurred between order close and period close. And the corresponding gain/loss factor may be obtained by dividing by the order length Order_Exec. Thus:

Order Level Horizon Difference Gain/Loss=(Period_Close−Order_Close) (59)

Order Level Horizon Difference Gain/Loss Factor=(Period_Close Order_Close)/Order_Exec (60)

Order Level Timing Market Gain/Loss: The difference between order-length market-clearing price from open to close (OMCP_oc=$78.60) and order-length market-clearing price from entry to close (OMCP_ec=$81.28), which amounts to −$2.68, accounts for the market impact of delaying the hand-over of the order to the desk between market open and entry. And the corresponding gain/loss factor may be obtained by dividing by the order length Order_Exec. Thus:

Order Level Timing Market Gain/Loss=(OMCP_oc−OMCP_ec) (61)

Order Level Timing Market Gain/Loss Factor=(OMCP_oc−OMCP_ec)/Order_Exec (62)

Order Level Timing Gain/Loss: The difference between Order_Open ($70.00) and Order_Entry ($72.50), which amounts to −$2.50, accounts for the timing factor, i.e., the gain (or loss) that occurred while waiting to enter the market. Note that over and above the timing gain/loss, the market impact of the timing issue is captured in equations 61 & 62. And the corresponding gain/loss factor may be obtained by dividing by the order length Order_Exec. Thus:

Order Level Timing Market Gain/Loss=(Order_Open−Order_Entry) (63)

Order Level Timing Market Gain/Loss Factor=(Order_Open−Order_Entry)/Order_Exec (64)

Figure 8:
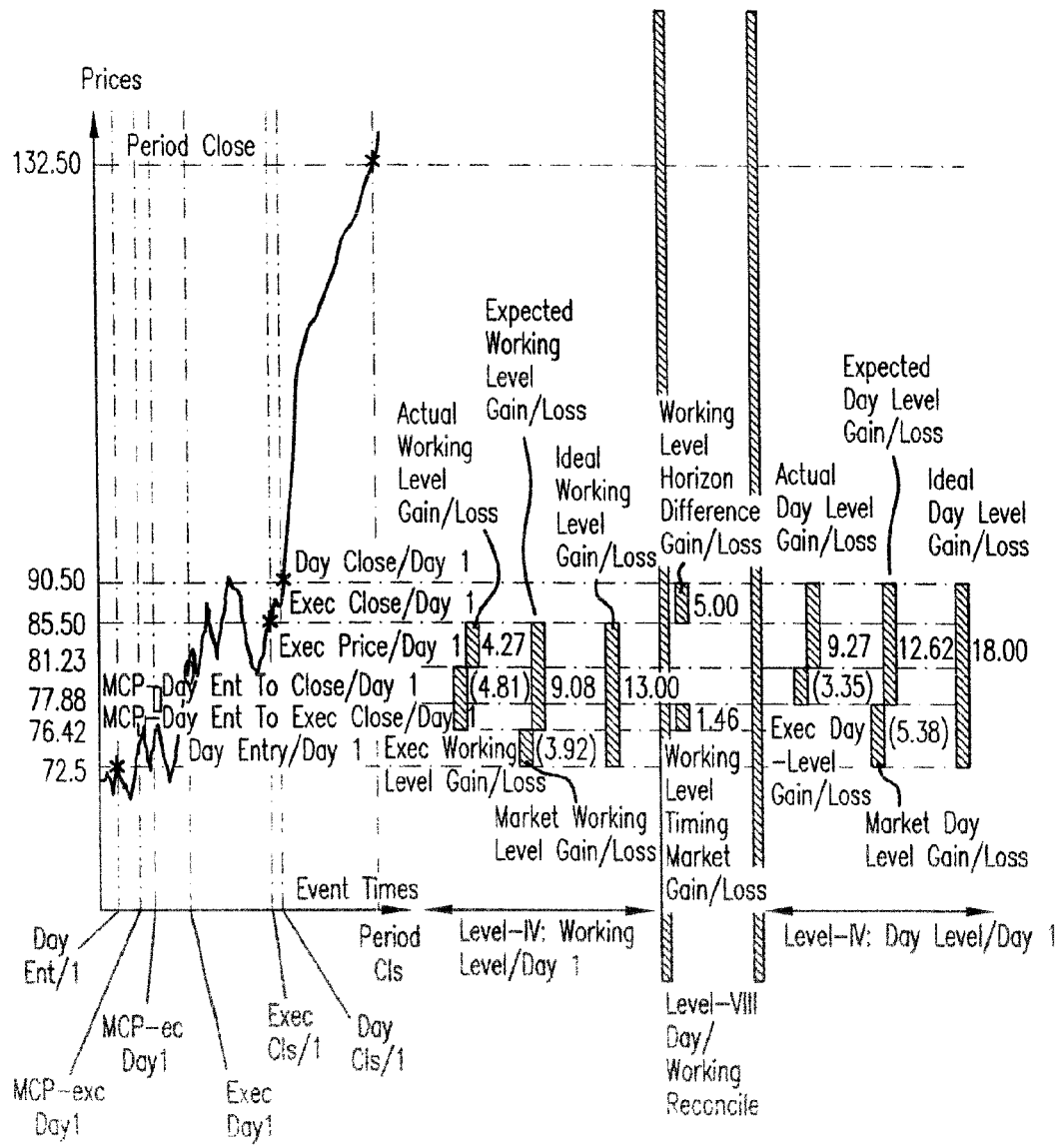
FIG. 8 illustrates a preferred day/working level cost analysis for an exemplary open-entry-execution completion-close time set (day 1).
Figure 9:
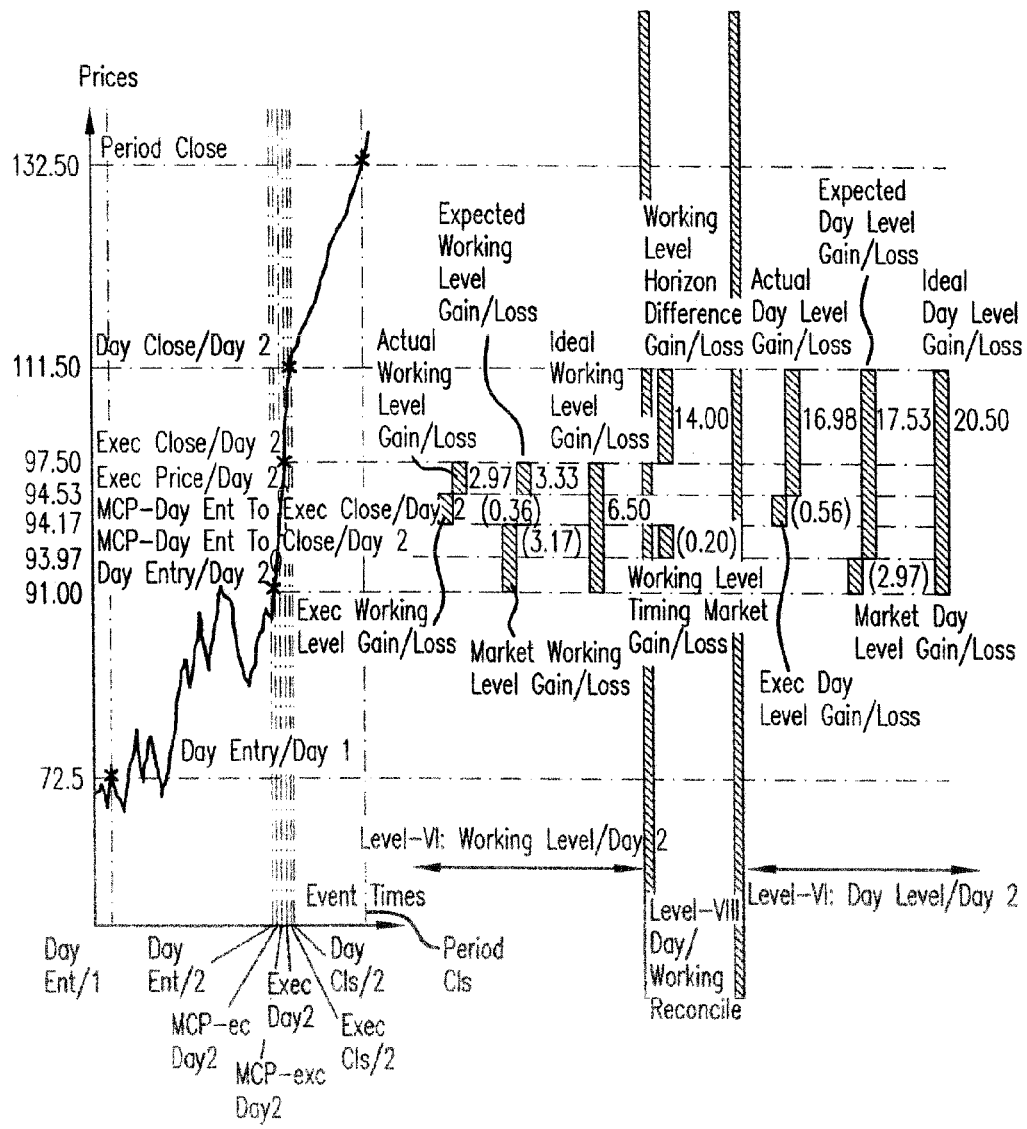
FIG. 9 illustrates a preferred day/working level cost analysis for an exemplary open-entry-execution completion-close time set (day 2).

Consider now the day level analysis with the OEXcC set (FIG. 8 for Day-1 & FIG. 9 for Day-2). On Day-1, the entry was at $72.50 (the Day_Entry). During the length of the day, the client executed at $81.23 (the Day_Exec). When all the fills were returned and the execution was complete (i.e., the day-execution-close event), the corresponding strike at that time was (the Day_Exec_Close) at $85.50. And the stock closed at $90.50 (Day_Close). During the time the client was in the market, the day-level market-clearing price from day-entry to day-execution-close (DMCP_exc), was at $76.42. And the day-level market-clearing price from day-entry to day-close (DMCP_ec), was at $77.88. On Day-2, the entry was at $91.00 (the Day_Entry). During the length of the day, the client executed at $94.53 (the Day_Exec). When all the fills were returned and the execution was complete (i.e., the day-execution-close event), the corresponding strike at that time was (the Day_Exec_Close) at $97.50. And the stock closed at $111.50 (Day_Close). During the time the client was in the market, the day-level market-clearing price from day-entry to day-execution-close (DMCP_exc), was at $94.17. And the day-level market-clearing price from day-entry to day-close (DMCP_ec), was at $93.97. Given these clay level price-points, in a preferred embodiment Levels IV, VI & VIII of the cost/performance analysis are constructed as shown in FIG. 8 (Day-1) & FIG. 9 (Day-2).

Level IV: The Day Level Analysis. A preferred Level IV Analysis for the OEXcC-set involves five separate cost numbers as follows:

Ideal Day Level Gain/Loss: The difference between Day_Close ($90.50 for Day-1 and $111.50 for Day-2) and Day_Entry ($72.50 for Day-1 and $91.00 for Day-2), which amounts to $18.00 for Day-1 and $20.50 for Day-2, spans the full range of day level gain (or loss) that may be achieved in an ideal frictionless market. And the corresponding gain/loss factor may be obtained by dividing by the respective day length Day_Exec. Thus:

Ideal Day Level Gain/Loss=(Day_Close−Day_Entry) (65)

$$\text{Ideal Day Level Gain/Loss Factor} = (\text{Day\_Close} - \text{Day\_Entry})/\text{Day\_Exec} \qquad (66)$$

Expected Day Level Gain/Loss: The difference between Day_Close ($90.50 for Day-1 and $111.50 for Day-2) and the day-length market-clearing price from day-entry to day-close (DMCP_ec) ($77.88 for Day-1 and $93.97 for Day-2), which amounts to $12.62 for Day-1 and $17.53 for Day-2, spans the expected day level gain (or loss) that may be achieved in a frictional market. And the corresponding gain/loss factor may be obtained by dividing by the day level Day_Exec. Thus:

$$\text{Expected Day Level Gain/Loss} = (\text{Day\_Close} - \text{DMCP\_ec}) \qquad (67)$$

$$\text{Expected Day Level Gain/Loss Factor} = (\text{Day\_Close} - \text{DMCP\_ec})/\text{Day\_Exec} \qquad (68)$$

Actual Day Level Gain/Loss: The difference between Day_Close ($90.50 for Day-1 and $111.50 for Day-2) and the day-level execution price (Day_Exec) ($81.23 for Day-1 and $94.53 for Day-2), which amounts to $9.27 for Day-1 and $16.98 for Day-2, spans the actual day level gain (or loss) that was achieved by the client in a frictional market. And the corresponding gain/loss factor may be obtained by dividing by the day level Day_Exec. Thus:

$$\text{Actual Day Level Gain/Loss} = (\text{Day\_Close} - \text{Day\_Exec}) \qquad (69)$$

$$\text{Actual Day Level Gain/Loss Factor} = (\text{Day\_Close} - \text{Day\_Exec})/\text{Day\_Exec} \qquad (70)$$

Market Day Level Gain/Loss: The difference between Day_Entry ($72.50 for Day-1 and $91.00 for Day-2) and day-length market-clearing price from day-entry to day-close (DMCP_ec) ($77.88 for Day-1 and $93.97 for Day-2), which amounts to −$5.38 for Day-1 and −$2.97 for Day-2, is a measure of market impact and captures the average cost of trading during the length of the day order. The corresponding gain/loss factor may be obtained by dividing by the day level Day_Exec. Thus:

$$\text{Market Day Level Gain/Loss} = (\text{Day\_Entry} - \text{DMCP\_ec}) \qquad (71)$$

$$\text{Market Day Level Gain/Loss Factor} = (\text{Day\_Entry} - \text{DMCP\_ec})/\text{Day\_Exec} \qquad (72)$$

Execution Day Level Gain/Loss: The difference between day-length market-clearing price from day-entry to day-close (DMCP_ec) ($77.88 for Day-1 and $93.97 for Day-2) and the day-level execution price (Day_Exec) ($81.23 for Day-1 and $94.53 for Day-2), which amounts to −$3.35 for Day-1 and −$0.56 for Day-2, is a measure of the excess cost paid out by the client as measured against the market average. The corresponding gain/loss factor may be obtained by dividing by the day level Day_Exec. Thus:

$$\text{Execution Day Level Gain/Loss} = (\text{DMCP\_ec} - \text{Day\_Exec}) \qquad (73)$$

$$\text{Execution Day Level Gain/Loss Factor} = (\text{DMCP\_ec} - \text{Day\_Exec})/\text{Day\_Exec} \qquad (74)$$

Level VI: The Working Level Analysis. A preferred Level VI Analysis for the OEXcC-set involves five separate cost numbers as follows:

Ideal Working Level Gain/Loss: The difference between Day_Exec_Close ($85.50 for Day-1 and $97.50 for Day-2) and Day_Entry ($72.50 for Day-1 and $91.00 for Day-2), which amounts to $13.00 for Day-1 and $6.50 for Day-2, spans the full range of working level gain (or loss) that may be achieved in an ideal frictionless market. And the corresponding gain/loss factor may be obtained by dividing by the respective day level Day_Exec. Thus:

$$\text{Ideal Working Level Gain/Loss} = (\text{Day\_Exec\_Close} - \text{Day\_Entry}) \qquad (75)$$

$$\text{Ideal Working Level Gain/Loss Factor} = (\text{Day\_Exec\_Close} - \text{Day\_Entry})/\text{Day\_Exec} \qquad (76)$$

Expected Working Level Gain/Loss: The difference between Day_Exec_Close ($85.50 for Day-1 and $97.50 for Day-2) and the day-length market-clearing price from day-entry to day-exec-close (DMCP_exc) ($76.42 for Day-1 and $94.17 for Day-2), which amounts to $9.08 for Day-1 and $3.33 for Day-2, spans the expected working level gain (or loss) that may be achieved in a frictional market. And the corresponding gain/loss factor may be obtained by dividing by the day level Day_Exec. Thus:

$$\text{Expected Working Level Gain/Loss} = (\text{Day\_Exec\_Close} - \text{DMCP\_exc}) \qquad (77)$$

$$\text{Expected Working Level Gain/Loss Factor} = (\text{Day\_Exec\_Close} - \text{DMCP\_exc})/\text{Day\_Exec} \qquad (78)$$

Actual Working Level Gain/Loss: The difference between Day_Exec_Close ($85.50 for Day-1 and $97.50 for Day-2) and the day-level execution price (Day_Exec) ($81.23 for Day-1 and $94.53 for Day-2), which amounts to $4.27 for Day-1 and $2.97 for Day-2, spans the actual working level gain (or loss) that was achieved by the client in a frictional market. And the corresponding gain/loss factor may be obtained by dividing by the day level Day_Exec. Thus:

$$\text{Actual Working Level Gain/Loss} = (\text{Day\_Exec\_Close} - \text{Day\_Exec}) \qquad (79)$$

$$\text{Actual Working Level Gain/Loss Factor} = (\text{Day\_Exec\_Close} - \text{Day\_Exec})/\text{Day\_Exec} \qquad (80)$$

Market Working Level Gain/Loss: The difference between Day_Entry ($72.50 for Day-1 and $91.00 for Day-2) and day-length market-clearing price from day-entry to day-exec-close (DMCP_exc) ($76.42 for Day-1 and $94.17 for Day-2), which amounts to −$3.92 for Day-1 and −$3.17 for Day-2, is a measure of market impact and captures the average cost of trading during the length of working the day order. The corresponding gain/loss factor may be obtained by dividing by the day level Day_Exec. Thus:

$$\text{Market Working Level Gain/Loss} = (\text{Day\_Entry} - \text{DMCP\_exc}) \qquad (81)$$

$$\text{Market Working Level Gain/Loss Factor} = (\text{Day\_Entry} - \text{DMCP\_exc})/\text{Day\_Exec} \qquad (82)$$

Execution Working Level Gain/Loss: The difference between day-length market-clearing price from day-entry to day-exec-close (DMCP_exc) ($76.42 for Day-1 and $94.17 for Day-2) and the day-level execution price (Day_Exec) ($81.23 for Day-1 and $94.53 for Day-2), which amounts to −$4.81 for Day-1 and −$0.36 for Day-2, is a measure of the excess cost paid out by the client as measured against the market average. The corresponding gain/loss factor may be obtained by dividing by the day level Day_Exec. Thus:

$$\text{Execution Working Level Gain/Loss} = (\text{DMCP\_exc} - \text{Day\_Exec}) \qquad (83)$$

$$\text{Execution Working Level Gain/Loss Factor} = (\text{DMCP\_exc} - \text{Day\_Exec})/\text{Day\_Exec} \qquad (84)$$

Level VIII: The Day/Working Reconciliation Level Analysis. A preferred Level VIII Analysis for the OEXcC-set involves two reconciliation cost numbers as follows:

Working Level Horizon Difference Gain/Loss: The difference between Day_Close ($90.50 for Day-1 and $111.50 for Day-2) and Day_Exec_Close ($85.50 for Day-1 and $97.50 for Day-2), which amounts to $5.00 for Day-1 and $14.00 for Day-2, accounts for the market gain (or loss) that occurred between Day_Exec_Close and Day_Close. And the corresponding gain/loss factor may be obtained by dividing by the day level Day_Exec. Thus:

$$\text{Working Level Horizon Difference Gain/Loss} = (\text{Day\_Close}-\text{Day\_Exec\_Close}) \quad (85)$$

$$\text{Working Level Horizon Difference Gain/Loss Factor} = (\text{Day\_Close Day\_Exec\_Close})/\text{Day\_Exec} \quad (86)$$

Working Level Timing Market Gain/Loss: The difference between day-level market-clearing price from day-entry to day-close (DMCP_ec) ($77.88 for Day-1 and $93.97 for Day-2) and day-level market-clearing price from day-entry to day-exec-close (DMCP_exc) ($76.42 for Day-1 and $94.17 for Day-2), which amounts to $1.46 for Day-1 and −$0.20 for Day-2, accounts for the market impact of completing the day order before the market close. And the corresponding gain/loss factor may be obtained by dividing by the day level Day_Exec. Thus:

$$\text{Working Level Timing Market Gain/Loss} = (\text{DMCP\_ec}-\text{DMCP\_exc}) \quad (87)$$

$$\text{Working Level Timing Market Gain/Loss Factor} = (\text{DMCP\_ec}-\text{DMCP\_exc})/\text{Day\_Exec} \quad (88)$$

Level V: The Order/Day Reconciliation Level Analysis. A preferred Level V

Figure 10:
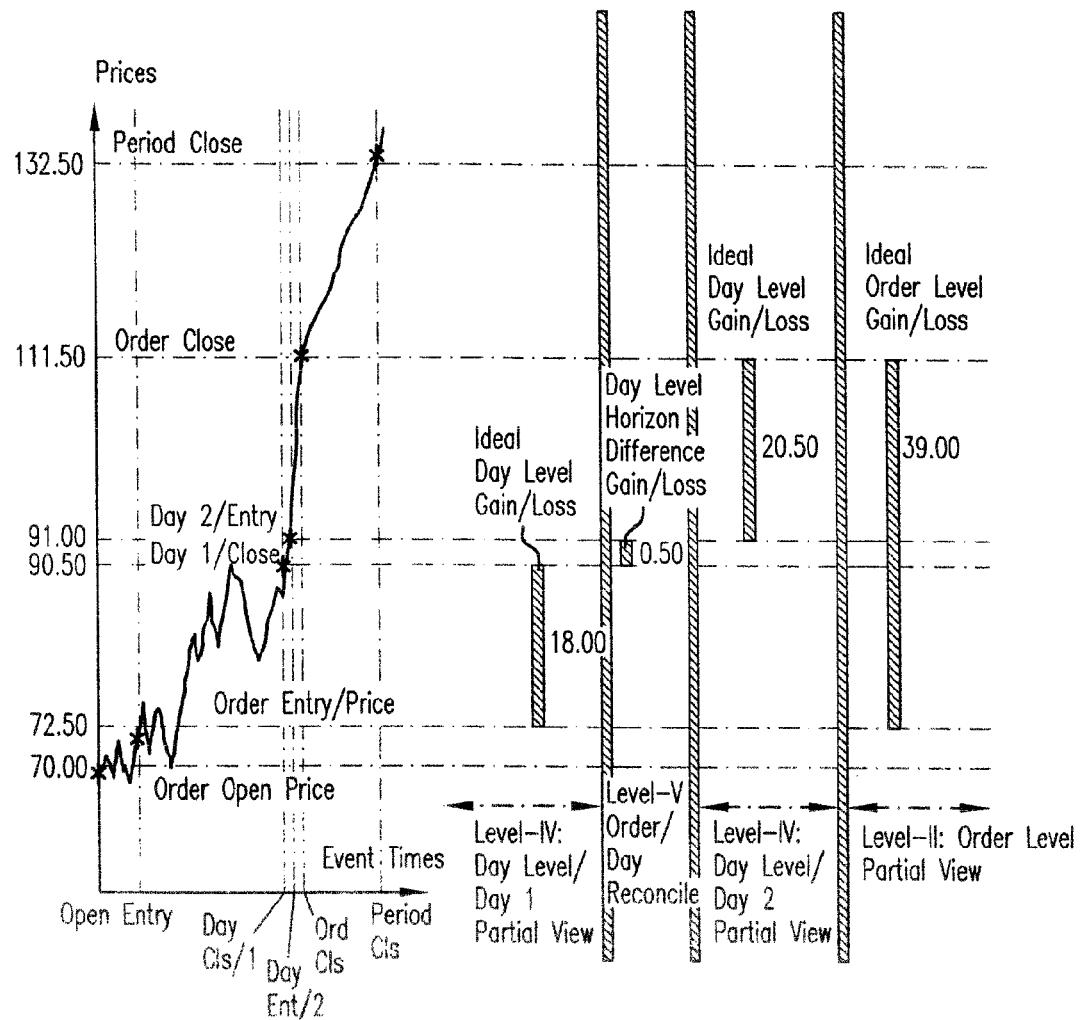
FIG. 10 illustrates a preferred order/day reconciliation level cost analysis for an exemplary open-entry-execution completion-close time set.

Analysis (see FIG. 10) for the OEXcC-set involves a single reconciliation cost number as follows:

Day Level Horizon Difference Gain/Loss: The difference between Day_Open ($91.00) for Day 2 and Last_Day_Close ($90.50) for Day 1, which amounts to $0.50, accounts for the market gain (or loss) that occurs between the close and open on consecutive days. And the corresponding gain/loss factor may be obtained by dividing by the order length Order_Exec. Thus:

$$\text{Day Level Horizon Difference Gain/Loss} = (\text{Day\_Open}-\text{Last\_Day\_Close}) \quad (89)$$

$$\text{Day Level Horizon Difference Gain/Loss Factor} = (\text{Day\_Open}-\text{Last\_Day\_Close})/\text{Order\_Exec} \quad (90)$$

VIII. Analysis of the DOEXcC Time-Set

Figure 11:
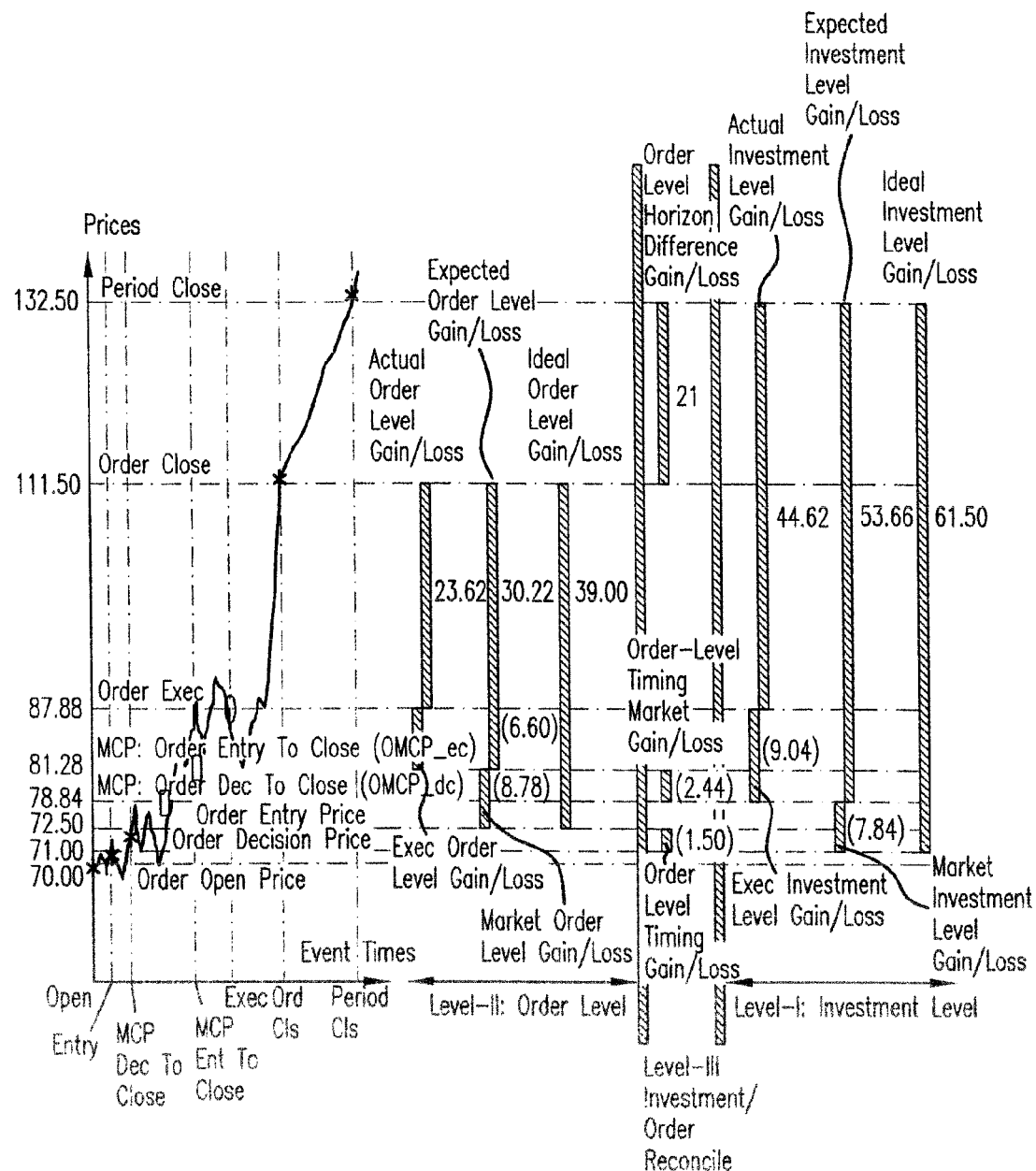
FIG. 11 illustrates a preferred investment/order level cost analysis for an exemplary decision-open-entry-execution completion-close time set.

Consider now the example of a client who has over and above the OEXcC set, also the Decision timestamps (i.e., the DOEXcC set, also referred to herein and in the figures as the ODEXeC time set), shown in FIG. 11. In the sample DOEXcC set, the day the order opened, the stock opened at $70.00 (the Order Open Price, or Order_Open). The Portfolio Manager decided to trade when the stock was at $71.00 (the Order_Decision). The Portfolio Manager then handed over the order for trading when the stock was at $72.50 (the Order_Entry). During the length of the total order, the order executed at $87.88 (the Order_Exec). On the day the order closed, the stock closed at $111.50 (Order_Close). At the end of the investment period the stock closed at $132.50 (Period_Close). The order-length market-clearing price from order-decision to order-close (OMCP_dc) was at $78.84. Also the order-length market-clearing price from order-entry to order-close (OMCP_ec) is at $81.28. Given these investment/order level price-points, in a preferred embodiment Levels I, II & III of the cost/performance analysis are constructed as shown in FIG. 11.

Level I: The Investment Level Analysis. A preferred Level I Analysis for the DOEXcC-set involves five separate cost numbers as follows:

Ideal Investment Level Gain/Loss: The difference between Period_Close ($132.50) and Order_Decision ($71.00), which amounts to $61.5, spans the full range of investment level gain (or loss) that may be achieved in an ideal frictionless market. And the corresponding gain/loss factor may be obtained by dividing by the order length Order_Exec. Thus:

$$\text{Ideal Investment Level Gain/Loss} = (\text{Period\_Close}-\text{Order\_Decision}) \quad (91)$$

$$\text{Ideal Investment Level Gain/Loss Factor} = (\text{Period\_Close}-\text{Order\_Decision})/\text{Order\_Exec} \quad (92)$$

Expected Investment Level Gain/Loss: The difference between Period_Close ($132.50) and the order-length market-clearing price from decision-to-close (OMCP_dc=$78.84), which amounts to $53.66, spans the expected investment level gain (or loss) that may be achieved in a frictional market. And the corresponding gain/loss factor may be obtained by dividing by the order level Order_Exec. Thus:

$$\text{Expected Investment Level Gain/Loss} = (\text{Period\_Close}-\text{OMCP\_dc}) \quad (93)$$

$$\text{Expected Investment Level Gain/Loss Factor} = (\text{Period\_Close}-\text{OMCP\_dc})/\text{Order\_Exec} \quad (94)$$

Actual Investment Level Gain/Loss: The difference between Period_Close ($132.50) and the order-length execution price (Order_Exec) ($87.88), which amounts to $44.62, spans the actual investment level gain (or loss) that was achieved by the client in a frictional market. And the corresponding gain/loss factor may be obtained by dividing by the order length Order_Exec. Thus:

$$\text{Actual Investment Level Gain/Loss} = (\text{Period\_Close}-\text{Order\_Exec}) \quad (95)$$

$$\text{Actual Investment Level Gain/Loss Factor} = (\text{Period\_Close}-\text{Order\_Exec})/\text{Order\_Exec} \quad (96)$$

Market Investment Level Gain/Loss: The difference between Order_Decision ($71.00) and order-length market-clearing price (OMCP_dc=$78.84), which amounts to −$7.84, is a measure of market impact and captures the average cost of trading during the length of the order. The corresponding gain/loss factor may be obtained by dividing by the order length Order_Exec. Thus:

$$\text{Market Investment Level Gain/Loss} = (\text{Order\_Decision}-\text{OMCP\_dc}) \quad (97)$$

$$\text{Market Investment Level Gain/Loss Factor} = (\text{Order\_Decision}-\text{OMCP\_dc})/\text{Order\_Exec} \quad (98)$$

Execution Investment Level Gain/Loss: The difference between order-length market-clearing price (OMCP_dc=$78.84) and the order-length execution price (Order_Exec) ($87.88), which amounts to −$9.04, is a measure of the excess cost paid out by the client as measured against the market average. The corresponding gain/loss factor may be obtained by dividing by the order length Order_Exec. Thus:

$$\text{Execution Investment Level Gain/Loss} = (\text{OMCP\_dc}-\text{Order\_Exec}) \quad (99)$$

Execution Investment Level Gain/Loss Factor=
(OMCP_dc−Order_Exec)/Order_Exec (100)

Level II: The Order Level Analysis. A preferred Level II Analysis for the DOEXcC-set involves five separate cost numbers as follows:

Ideal Order Level Gain/Loss: The difference between Order_Close ($111.50) and Order_Entry ($72.50), which amounts to $39.0, spans the full range of order level gain (or loss) that may be achieved in an ideal frictionless market by the trader. And the corresponding gain/loss factor may be obtained by dividing by the order length Order_Exec. Thus:

Ideal Order Level Gain/Loss=(Order_Close−
Order_Entry) (101)

Ideal Order Level Gain/Loss Factor=(Order_Close−
Order_Entry)/Order_Exec (102)

Expected Order Level Gain/Loss: The difference between Order_Close ($111.50) and the order-length market-clearing price from entry to close (OMCP_ec) ($81.28), which amounts to $30.22, spans the expected order level gain (or loss) that may be achieved in a frictional market. And the corresponding gain/loss factor may be obtained by dividing by the order length Order_Exec. Thus:

Expected Order Level Gain/Loss=(Order_Close−
OMCP_ec) (103)

Expected Order Level Gain/Loss Factor=
(Order_Close−OMCP_ec)/Order_Exec (104)

Actual Order Level Gain/Loss: The difference between Order_Close ($111.50) and the order-length execution price (Order_Exec) ($87.88), which amounts to $23.62, spans the actual order level gain (or loss) that was achieved by the client in a frictional market. And the corresponding gain/loss factor may be obtained by dividing by the order length Order_Exec. Thus:

Actual Order Level Gain/Loss=(Order_Close−
Order_Exec) (105)

Actual Order Level Gain/Loss Factor=(Order_Close−
Order_Exec)/Order_Exec (106)

Market Order Level Gain/Loss: The difference between Order_Entry ($72.50) and order-length market clearing price from entry to close (OMCP_ec=$81.28), which amounts to −$8.78, is a measure of market impact and captures the average cost of trading during the length of the order. The corresponding gain/loss factor may be obtained by dividing by the order length Order_Exec. Thus:

Market Order Level Gain/Loss=(Order_Entry−
OMCP_ec) (107)

Market Order Level Gain/Loss Factor=(Order_Entry−
OMCP_ec)/Order_Exec (108)

Execution Order Level Gain/Loss: The difference between order-length market-clearing price from entry to close (OMCP_ec=$81.28) and the order-length execution price (Order_Exec) ($87.88), which amounts to −$6.60, is a measure of the excess cost paid out by the client as measured against the market average. The corresponding gain/loss factor may be obtained by dividing by the order length Order_Exec. Thus:

Execution Order Level Gain/Loss=(OMCP_ec−
Order_Exec) (109)

Execution Order Level Gain/Loss Factor=
(OMCP_ec−Order_Exec)/Order_Exec (110)

Level III: The Investment/Order Reconciliation Level Analysis. A preferred Level III Analysis for the DOEXcC-set involves three reconciliation cost numbers as follows:

Order Level Horizon Difference Gain/Loss: The difference between Period_Close ($132.50) and Order_Close ($111.50), which amounts to $21, accounts for the market gain (or loss) that occurred between order close and period close. And the corresponding gain/loss factor may be obtained by dividing by the order length Order_Exec. Thus:

Order Level Horizon Difference Gain/Loss=
(Period_Close−Order_Close) (111)

Order Level Horizon Difference Gain/Loss Factor=
(Period_Close Order_Close)/Order_Exec (112)

Order Level Timing Market Gain/Loss: The difference between order-length market-clearing price from decision to close (OMCP_dc=$78.84) and order-length market-clearing price from entry to close (OMCP_ec=$81.28), which amounts to −$2.44, accounts for the market impact of delaying the hand-over of the order to the desk between market open and entry. And the corresponding gain/loss factor may be obtained by dividing by the order length Order_Exec. Thus:

Order Level Timing Market Gain/Loss=(OMCP_dc−
OMCP_ec) (113)

Order Level Timing Market Gain/Loss Factor=
(OMCP_dc−OMCP_ec)/Order_Exec (114)

Order Level Timing Gain/Loss: The difference between Order_Decision ($71.00) and Order_Entry ($72.50), which amounts to −$1.50, accounts for the timing factor, i.e., the gain (or loss) that occurred while waiting to enter the market. Note that over and above the timing gain/loss, the market impact of the timing issue is captured in equations 115 & 116. And the corresponding gain/loss factor may be obtained by dividing by the order length Order_Exec. Thus:

Order Level Timing Gain/Loss=(Order_Decision−
Order_Entry) (115)

Order Level Timing Gain/Loss Factor=(Order_Decision−Order_Entry)/Order_Exec (116)

Figure 12:
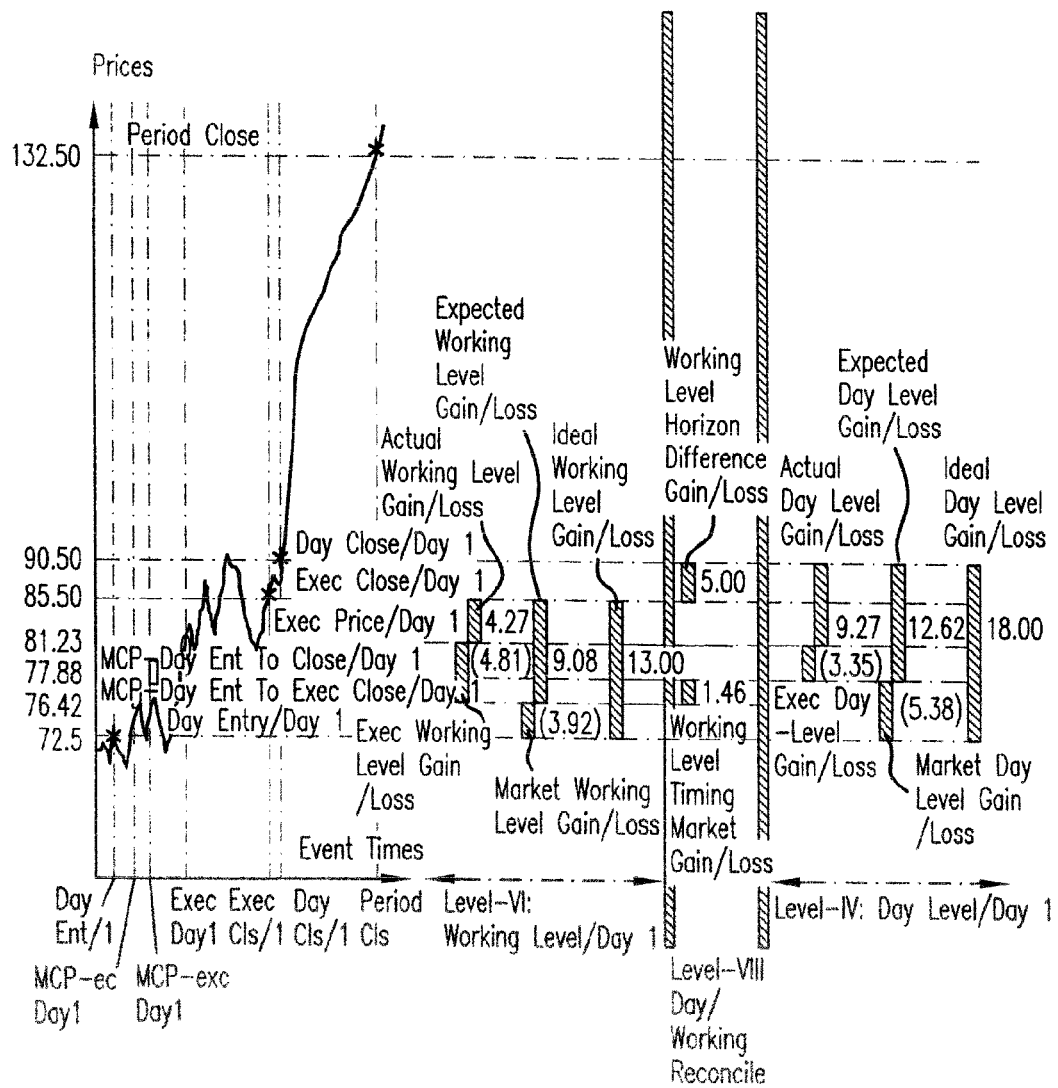
FIG. 12 illustrates a preferred day/working level cost analysis for an exemplary decision-open-entry-execution completion-close time set (day 1).
Figure 13:
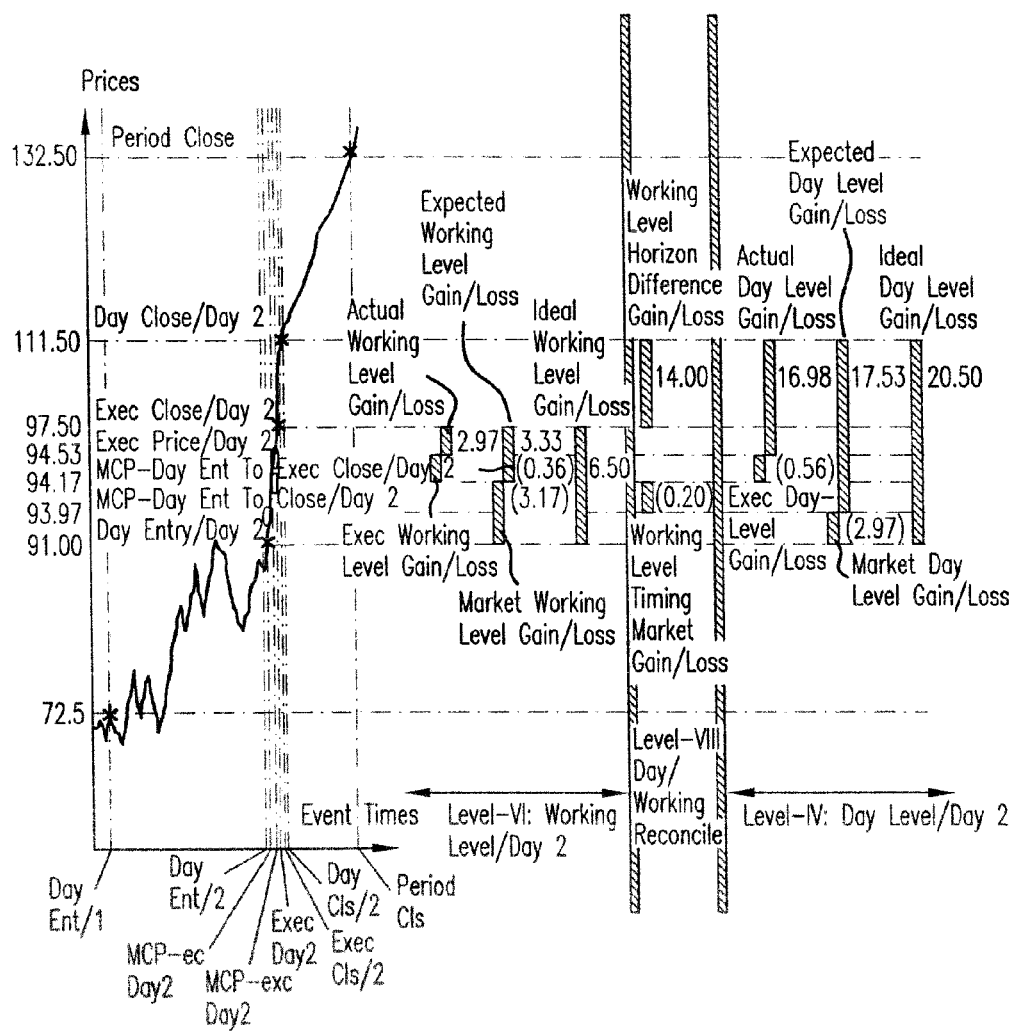
FIG. 13 illustrates a preferred day/working level cost analysis for an exemplary decision-open-entry-execution completion-close time set (day 2).

Consider now the day level analysis with the DOEXcC set (FIG. 12 for Day-1 & FIG. 13 for Day-2). On Day-1, the entry was at $72.50 (the Day_Entry). During the length of the day, the client executed at $81.23 (the Day_Exec). When all the fills were returned and the execution was complete (i.e., the day-execution-close event), the corresponding strike at that time was (the Day_Exec_Close) at $85.50. And the stock closed at $90.50 (Day_Close). During the time the client was in the market, the day-level market-clearing price from day-entry to day-execution-close (DMCP_exc), was at $76.42. And the day-level market-clearing price from day-entry to day-close (DMCP_ec), was at $77.88. On Day-2, the entry was at $91.00 (the Day_Entry). During the length of the day, the client executed at $94.53 (the Day_Exec). When all the fills were returned and the execution was complete (i.e., the day-execution-close event), the corresponding strike at that time was (the Day_Exec_Close) at $97.50. And the stock closed at $111.50 (Day_Close). During the time the client was in the market, the day-level market-clearing price from day-entry to day-execution-close (DMCP_exc), was at $94.17. And the day-level market-clearing price from day-entry to day-close (DMCP_ec), was at $93.97. Given these day level price-points, in a preferred embodiment Levels IV, VI & VIII of the cost/performance analysis are constructed as shown in FIG. 12 (Day-1) & FIG. 13 (Day-2).

Level VI: The Day Level Analysis. A preferred Level VI Analysis for the DOEXcC-set involves five separate cost numbers as follows:

Ideal Day Level Gain/Loss: The difference between Day_Close ($90.50 for Day-1 and $111.50 for Day-2) and Day_Entry ($72.50 for Day-1 and $91.00 for Day-2), which amounts to $18.00 for Day-1 and $20.50 for Day-2, spans the full range of day level gain (or loss) that may be achieved in an ideal frictionless market. And the corresponding gain/loss factor may be obtained by dividing by the respective day length Day_Exec. Thus:

$$\text{Ideal Day Level Gain/Loss} = (\text{Day\_Close} - \text{Day\_Entry}) \quad (117)$$

$$\text{Ideal Day Level Gain/Loss Factor} = (\text{Day\_Close} - \text{Day\_Entry})/\text{Day\_Exec} \quad (118)$$

Expected Day Level Gain/Loss: The difference between Day_Close ($90.50 for Day-1 and $111.50 for Day-2) and the day-length market-clearing price from day-entry to day-close (DMCP_ec) ($77.88 for Day-1 and $93.97 for Day-2), which amounts to $12.62 for Day-1 and $17.53 for Day-2, spans the expected day level gain (or loss) that may be achieved in a frictional market. And the corresponding gain/loss factor may be obtained by dividing by the day level Day_Exec. Thus:

$$\text{Expected Day Level Gain/Loss} = (\text{Day\_Close} - \text{DMCP\_ec}) \quad (119)$$

$$\text{Expected Day Level Gain/Loss Factor} = (\text{Day\_Close} - \text{DMCP\_ec})/\text{Day\_Exec} \quad (120)$$

Actual Day Level Gain/Loss: The difference between Day_Close ($90.50 for Day-1 and $111.50 for Day-2) and the day-level execution price (Day_Exec) ($81.23 for Day-1 and $94.53 for Day-2), which amounts to $9.27 for Day-1 and $16.98 for Day-2, spans the actual day level gain (or loss) that was achieved by the client in a frictional market. And the corresponding gain/loss factor may be obtained by dividing by the day level Day_Exec. Thus:

$$\text{Actual Day Level Gain/Loss} = (\text{Day\_Close} - \text{Day\_Exec}) \quad (121)$$

$$\text{Actual Day Level Gain/Loss Factor} = (\text{Day\_Close} - \text{Day\_Exec})/\text{Day\_Exec} \quad (122)$$

Market Day Level Gain/Loss: The difference between Day_Entry ($72.50 for Day-1 and $91.00 for Day-2) and day-length market-clearing price from day-entry to day-close (DMCP_ec) ($77.88 for Day-1 and $93.97 for Day-2), which amounts to -$5.38 for Day-1 and -$2.97 for Day-2, is a measure of market impact and captures the average cost of trading during the length of the day order. The corresponding gain/loss factor may be obtained by dividing by the day level Day_Exec: Thus:

$$\text{Market Day Level Gain/Loss} = (\text{Day\_Entry} - \text{DMCP\_ec}) \quad (123)$$

$$\text{Market Day Level Gain/Loss Factor} = (\text{Day\_Entry} - \text{DMCP\_ec})/\text{Day\_Exec} \quad (124)$$

Execution Day Level Gain/Loss: The difference between day-length market-clearing price from day-entry to day-close (DMCP_ec) ($77.88 for Day-1 and $93.97 for Day-2) and the day-level execution price (Day_Exec) ($81.23 for Day-1 and $94.53 for Day-2), which amounts to -$3.35 for Day-1 and -$0.56 for Day-2, is a measure of the excess cost paid out by the client as measured against the market average. The corresponding gain/loss factor may be obtained by dividing by the day level Day_Exec. Thus:

$$\text{Execution Day Level Gain/Loss} = (\text{DMCP\_ec} - \text{Day\_Exec}) \quad (125)$$

$$\text{Execution Day Level Gain/Loss Factor} = (\text{DMCP\_ec} - \text{Day\_Exec})/\text{Day\_Exec} \quad (126)$$

Level VI: The Working Level Analysis. A preferred Level VI Analysis for the DOEXcC-set involves five separate cost numbers as follows:

Ideal Working Level Gain/Loss: The difference between Day_Exec_Close ($85.50 for Day-1 and $97.50 for Day-2) and Day_Entry ($72.50 for Day-1 and $91.00 for Day-2), which amounts to $13.00 for Day-1 and $6.50 for Day-2, spans the full range of working level gain (or loss) that may be achieved in an ideal frictionless market. And the corresponding gain/loss factor may be obtained by dividing by the respective day level Day_Exec. Thus:

$$\text{Ideal Working Level Gain/Loss} = (\text{Day\_Exec\_Close} - \text{Day\_Entry}) \quad (127)$$

$$\text{Ideal Working Level Gain/Loss Factor} = (\text{Day\_Exec\_Close} - \text{Day\_Entry})/\text{Day\_Exec} \quad (128)$$

Expected Working Level Gain/Loss: The difference between Day_Exec_Close ($85.50 for Day-1 and $97.50 for Day-2) and the day-length market-clearing price from day-entry to day-exec-close (DMCP_exc) ($76.42 for Day-1 and $94.17 for Day-2), which amounts to $9.08 for Day-1 and $3.33 for Day-2, spans the expected working level gain (or loss) that may be achieved in a frictional market. And the corresponding gain/loss factor may be obtained by dividing by the day level Day_Exec. Thus:

$$\text{Expected Working Level Gain/Loss} = (\text{Day\_Exec\_Close} - \text{DMCP\_exc}) \quad (129)$$

$$\text{Expected Working Level Gain/Loss Factor} = (\text{Day\_Exec\_Close} - \text{DMCP\_exc})/\text{Day\_Exec} \quad (130)$$

Actual Working Level Gain/Loss: The difference between Day_Exec_Close ($85.50 for Day-1 and $97.50 for Day-2) and the day-level execution price (Day_Exec) ($81.23 for Day-1 and $94.53 for Day-2), which amounts to $4.27 for Day-1 and $2.97 for Day-2, spans the actual working level gain (or loss) that was achieved by the client in a frictional market. And the corresponding gain/loss factor may be obtained by dividing by the day level Day_Exec. Thus:

$$\text{Actual Working Level Gain/Loss} = (\text{Day\_Exec\_Close} - \text{Day\_Exec}) \quad (131)$$

$$\text{Actual Working Level Gain/Loss Factor} = (\text{Day\_Exec\_Close} - \text{Day\_Exec})/\text{Day\_Exec} \quad (132)$$

Market Working Level Gain/Loss: The difference between Day_Entry ($72.50 for Day-1 and $91.00 for Day-2) and day-length market-clearing price from day-entry to day-exec-close (DMCP_exc) ($76.42 for Day-1 and $94.17 for Day-2), which amounts to -$3.92 for Day-1 and -$3.17 for Day-2, is a measure of market impact and captures the average cost of trading during the length of working the day order. The corresponding gain/loss factor may be obtained by dividing by the day level Day_Exec. Thus:

$$\text{Market Working Level Gain/Loss} = (\text{Day\_Entry} - \text{DMCP\_exc}) \quad (133)$$

$$\text{Market Working Level Gain/Loss Factor} = (\text{Day\_Entry} - \text{DMCP\_exc})/\text{Day\_Exec} \quad (134)$$

Execution Working Level Gain/Loss: The difference between day-length market-clearing price from day-entry to day-exec-close (DMCP_exc) ($76.42 for Day-1 and $94.17 for Day-2) and the day-level execution price (Day_Exec) ($81.23 for Day-1 and $94.53 for Day-2), which amounts to -$4.81 for Day-1 and -$0.36 for Day-2, is a measure of the excess cost paid out by the client as measured against the market average. The corresponding gain/loss factor may be obtained by dividing by the day level Day_Exec. Thus:

$$\text{Execution Working Level Gain/Loss} = (DMCP\_exc - Day\_Exec) \quad (135)$$

$$\text{Execution Working Level Gain/Loss Factor} = (DMCP\_exc - Day\_Exec)/Day\_Exec \quad (136)$$

Level VIII: The Day/Working Reconciliation Level Analysis. A preferred Level VIII Analysis for the DOEXcC-set involves two reconciliation cost numbers as follows:

Working Level Horizon Difference Gain/Loss: The difference between Day_Close ($90.50 for Day-1 and $111.50 for Day-2) and Day_Exec_Close ($85.50 for Day-1 and $97.50 for Day-2), which amounts to $5.00 for Day-1 and $14.00 for Day-2, accounts for the market gain (or loss) that occurred between Day_Exec_Close and Day_Close. And the corresponding gain/loss factor may be obtained by dividing by the day level Day_Exec. Thus:

$$\text{Working Level Horizon Difference Gain/Loss} = (Day\_Close - Day\_Exec\_Close) \quad (137)$$

$$\text{Working Level Horizon Difference Gain/Loss Factor} = (Day\_Close\ Day\_Exec\_Close)/Day\_Exec \quad (138)$$

Working Level Timing Market Gain/Loss: The difference between day-level market-clearing price from day-entry to day-close (DMCP_ec) ($77.88 for Day-1 and $93.97 for Day-2) and day-level market-clearing price from day-entry to day-exec-close (DMCP_exc) ($76.42 for Day-1 and $94.17 for Day-2), which amounts to $1.46 for Day-1 and −$0.20 for Day-2, accounts for the market impact of completing the day order before the market close. And the corresponding gain/loss factor may be obtained by dividing by the day level Day_Exec. Thus:

$$\text{Working Level Timing Market Gain/Loss} = (DMCP\_ec - DMCP\_exc) \quad (139)$$

$$\text{Working Level Timing Market Gain/Loss Factor} = (DMCP\_ec - DMCP\_exc)/Day\_Exec \quad (140)$$

Figure 14:
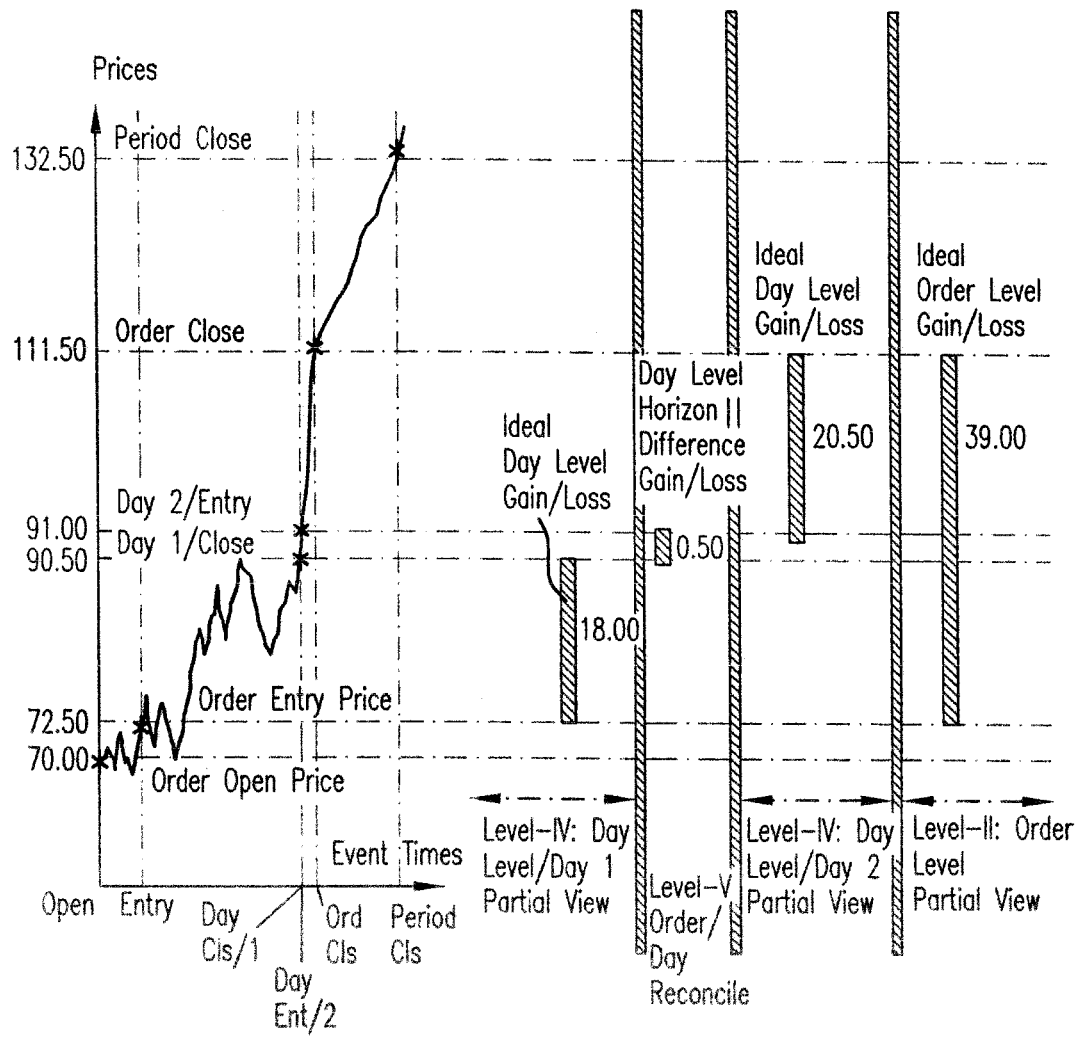
FIG. 14 illustrates a preferred order/day level cost analysis for an exemplary decision-open-entry-execution completion-close time set.

Level V: The Order/Day Reconciliation Level Analysis. A preferred Level V Analysis (see FIG. 14) for the DOEXcC-set involves a single reconciliation cost number as follows:

Day Level Horizon Difference Gain/Loss: The difference between Day_Open ($91.00) for Day 2 and Last_Day_Close ($90.50) for Day 1, which amounts to $0.50 accounts for the market gain (or loss) that occurs between the close and open on consecutive days. And the corresponding gain/loss factor may be obtained by dividing by the order length Order_Exec. Thus:

$$\text{Day Level Horizon Difference Gain/Loss Day\_Open} - Last\_Day\_Close) \quad (141)$$

$$\text{Day Level Horizon Difference Gain/Loss Factor} = (Day\_Open - Last\_Day\_Close)/Order\_Exec \quad (142)$$

IX. Analysis of the DOEPXcC Time-Set

Figure 15:
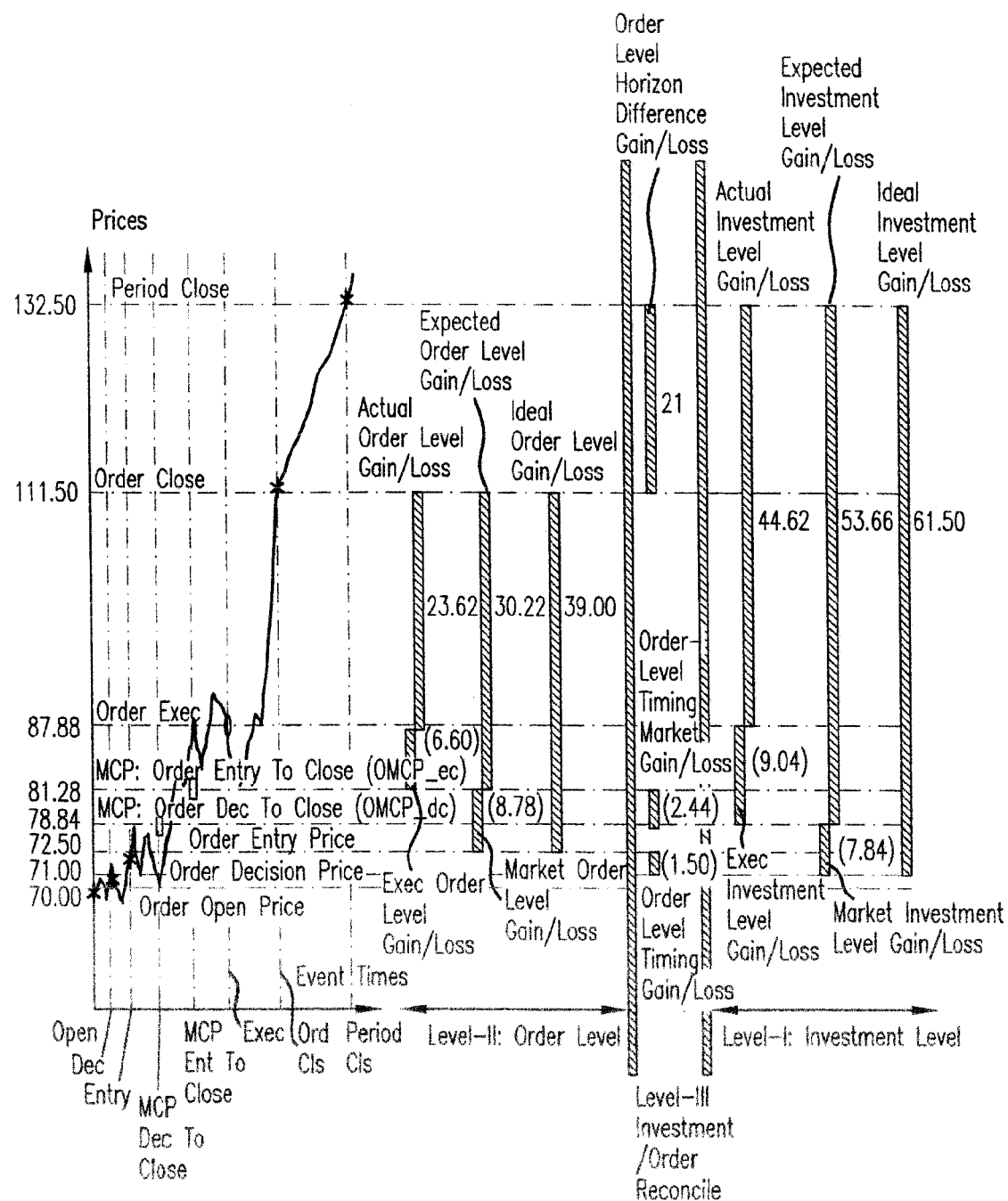
FIG. 15 illustrates a preferred investment/order level cost analysis for an exemplary decision-open-entry-placement-execution completion-close time set.

Consider now the example of a client who has over and above the DOEXcC set, also the Placement timestamps (i.e., the DOEPXcC set) as shown in FIGS. 13-19. In the sample DOEPXcC set, the day the order opened, the stock opened at $70.00 (the Order_Open). The Portfolio Manager decided to trade when the stock was at $71.00 (the Order_Decision). The Portfolio Manager then handed over the order for trading when the stock was at $72.50 (the Order_Entry). On Day-1 the buy-side trader placed the order with the sell-side desk (FIGS. 16 & 18) when the stock was at $77.50 (the Day_Placement). On Day-2, the buy-side trader placed the order with the sell-side desk (FIGS. 17 & 19) when the stock was at $92.00 (the Day_Placement). During the length of the total order, the order executed at $87.88 (the Order_Exec). On the day the order closed, the stock closed at $111.50 (Order_Close). At the end of the investment period the stock closed at $132.50 (Period_Close). The order-length market-clearing price from order-decision to order-close (OMCP_dc) was at $78.84. Also the order-length market-clearing price from order-entry to order-close (OMCP_ec) was at $81.28. Given these investment/order level price-points, in a preferred embodiment Levels I, II & III of the cost/performance analysis are constructed as shown in FIG. 15.

Level I: The Investment Level Analysis. A preferred Level I Analysis for the DOEPXcC-set involves five separate cost numbers as follows:

Ideal Investment Level Gain/Loss: The difference between Period_Close ($132.50) and Order_Decision ($71.00), which amounts to $61.5, spans the full range of investment level gain (or loss) that may be achieved in an ideal frictionless market. And the corresponding gain/loss factor may be obtained by dividing by the order length Order_Exec. Thus:

$$\text{Ideal Investment Level Gain/Loss} = (Period\_Close - Order\_Decision) \quad (143)$$

$$\text{Ideal Investment Level Gain/Loss Factor} = (Period\_Close - Order\_Decision)/Order\_Exec \quad (144)$$

Expected Investment Level Gain/Loss: The difference between Period_Close ($132.50) and the order-length market-clearing price from decision-to-close (OMCP_dc=$78.84), which amounts to $53.66, spans the expected investment level gain (or loss) that may be achieved in a frictional market. And the corresponding gain/loss factor may be obtained by dividing by the order level Order_Exec. Thus:

$$\text{Expected Investment Level Gain/Loss} = (Period\_Close - OMCP\_dc) \quad (145)$$

$$\text{Expected Investment Level Gain/Loss Factor} = (Period\_Close - OMCP\_dc)/Order\_Exec \quad (146)$$

Actual Investment Level Gain/Loss: The difference between Period_Close ($132.50) and the order-length execution price (Order_Exec) ($87.88), which amounts to $44.62, spans the actual investment level gain (or loss) that was achieved by the client in a frictional market, And the corresponding gain/loss factor may be obtained by dividing by the order length Order_Exec. Thus:

$$\text{Actual Investment Level Gain/Loss} = (Period\_Close - Order\_Exec) \quad (147)$$

$$\text{Actual Investment Level Gain/Loss Factor} = (Period\_Close - Order\_Exec)/Order\_Exec \quad (148)$$

Market Investment Level Gain/Loss: The difference between Order_Decision ($71.00) and order-length market-clearing price (OMCP_dc=$78.84), which amounts to −$7.84, is a measure of market impact and captures the average cost of trading during the length of the order. The corresponding gain/loss factor may be obtained by dividing by the order length Order_Exec. Thus:

$$\text{Market Investment Level Gain/Loss} = (Order\_Decision - OMCP\_dc) \quad (149)$$

$$\text{Market Investment Level Gain/Loss Factor} = (Order\_Decision - OMCP\_dc)/Order\_Exec \quad (150)$$

Execution Investment Level Gain/Loss: The difference between order-length market-clearing price (OM- CP_dc=$78.84) and the order-length execution price (Order_Exec) ($87.88), which amounts to −$9.04, is a measure of the excess cost paid out by the client as measured against the market average. The corresponding gain/loss factor may be obtained by dividing by the order length Order_Exec. Thus:

$$\text{Execution Investment Level Gain/Loss} = (\text{OMCP\_dc} - \text{Order\_Exec}) \quad (151)$$

$$\text{Execution Investment Level Gain/Loss Factor} = (\text{OMCP\_dc} - \text{Order\_Exec})/\text{Order\_Exec} \quad (152)$$

Level II: The Order Level Analysis. A preferred Level II Analysis for the DOEPXcC-set involves five separate cost numbers as follows:

Ideal Order Level Gain/Loss: The difference between Order_Close ($111.50) and Order_Entry ($72.50), which amounts to $39.0, spans the full range of order level gain (or loss) that may be achieved in an ideal frictionless market by the trader. And the corresponding gain/loss factor may be obtained by dividing by the order length Order_Exec. Thus:

$$\text{Ideal Order Level Gain/Loss} = (\text{Order\_Close} - \text{Order\_Entry}) \quad (153)$$

$$\text{Ideal Order Level Gain/Loss Factor} = (\text{Order\_Close} - \text{Order\_Entry})/\text{Order\_Exec} \quad (154)$$

Expected Order Level Gain/Loss: The difference between Order_Close ($111.50) and the order-length market-clearing price from entry to close (OMCP_ec) ($81.28), which amounts to $30.22, spans the expected order level gain (or loss) that may be achieved in a frictional market. And the corresponding gain/loss factor may be obtained by dividing by the order length Order_Exec. Thus:

$$\text{Expected Order Level Gain/Loss} = (\text{Order\_Close} - \text{OMCP\_ec}) \quad (155)$$

$$\text{Expected Order Level Gain/Loss Factor} = (\text{Order\_Close} - \text{OMCP\_ec})/\text{Order\_Exec} \quad (156)$$

Actual Order Level Gain/Loss: The difference between Order_Close ($111.50) and the order-length execution price (Order_Exec) ($87.88), which amounts to $23.62, spans the actual order level gain (or loss) that was achieved by the client in a frictional market. And the corresponding gain/loss factor may be obtained by dividing by the order length Order_Exec. Thus:

$$\text{Actual Order Level Gain/Loss} = (\text{Order\_Close} - \text{Order\_Exec}) \quad (157)$$

$$\text{Actual Order Level Gain/Loss Factor} = (\text{Order\_Close} - \text{Order\_Exec})/\text{Order\_Exec} \quad (158)$$

Market Order Level Gain/Loss: The difference between Order_Entry ($72.50) and order-length market clearing price from entry to close (OMCP_ec=$81.28), which amounts to −$8.78, is a measure of market impact and captures the average cost of trading during the length of the order. The corresponding gain/loss factor may be obtained by dividing by the order length Order_Exec. Thus:

$$\text{Market Order Level Gain/Loss} = (\text{Order\_Entry} - \text{OMCP\_ec}) \quad (159)$$

$$\text{Market Order Level Gain/Loss Factor} = (\text{Order\_Entry} - \text{OMCP\_ec})/\text{Order\_Exec} \quad (160)$$

Execution Order Level Gain/Loss: The difference between order-length market-clearing price from entry to close (OMCP_ec=$81.28) and the order-length execution price (Order_Exec) ($87.88), which amounts to −$6.60, is a measure of the excess cost paid out by the client as measured against the market average. The corresponding gain/loss factor may be obtained by dividing by the order length Order_Exec. Thus:

$$\text{Execution Order Level Gain/Loss} = (\text{OMCP\_ec} - \text{Order\_Exec}) \quad (161)$$

$$\text{Execution Order Level Gain/Loss Factor} = (\text{OMCP\_ec} - \text{Order\_Exec})/\text{Order\_Exec} \quad (162)$$

Level III: The Investment/Order Reconciliation Level Analysis. A preferred Level III Analysis for the DOEPXcC-set involves three reconciliation cost numbers as follows:

Order Level Horizon Difference Gain/Loss: The difference between Period_Close ($132.50) and Order_Close ($111.50), which amounts to $21, accounts for the market gain (or loss) that occurred between order close and period close. And the corresponding gain/loss factor may be obtained by dividing by the order length Order_Exec. Thus:

$$\text{Order Level Horizon Difference Gain/Loss} = (\text{Period\_Close} - \text{Order\_Close}) \quad (163)$$

$$\text{Order Level Horizon Difference Gain/Loss Factor} = (\text{Period\_Close} - \text{Order\_Close})/\text{Order\_Exec} \quad (164)$$

Order Level Timing Market Gain/Loss: The difference between order-length market-clearing price from decision to close (OMCP_dc=$78.84) and order-length market-clearing price from entry to close (OMCP_ec=$81.28), which amounts to −$2.44, accounts for the market impact of delaying the hand-over of the order to the desk between market open and entry. And the corresponding gain/loss factor may be obtained by dividing by the order length Order_Exec. Thus:

$$\text{Order Level Timing Market Gain/Loss} = (\text{OMCP\_dc} - \text{OMCP\_ec}) \quad (165)$$

$$\text{Order Level Timing Market Gain/Loss Factor} = (\text{OMCP\_dc} - \text{OMCP\_ec})/\text{Order\_Exec} \quad (166)$$

Order Level Timing Gain/Loss: The difference between Order_Decision ($71.00) and Order_Entry ($72.50), which amounts to −$1.50, accounts for the timing factor, i.e., the gain (or loss) that occurred while waiting to enter the market. Note that over and above the timing gain/loss, the market impact of the timing issue is captured in equations 165 & 166. And the corresponding gain/loss factor may be obtained by dividing by the order length Order_Exec. Thus:

$$\text{Order Level Timing Gain/Loss} = (\text{Order\_Decision} - \text{Order\_Entry}) \quad (167)$$

$$\text{Order Level Timing Gain/Loss Factor} = (\text{Order\_Decision} - \text{Order\_Entry})/\text{Order\_Exec} \quad (168)$$

Figure 16:
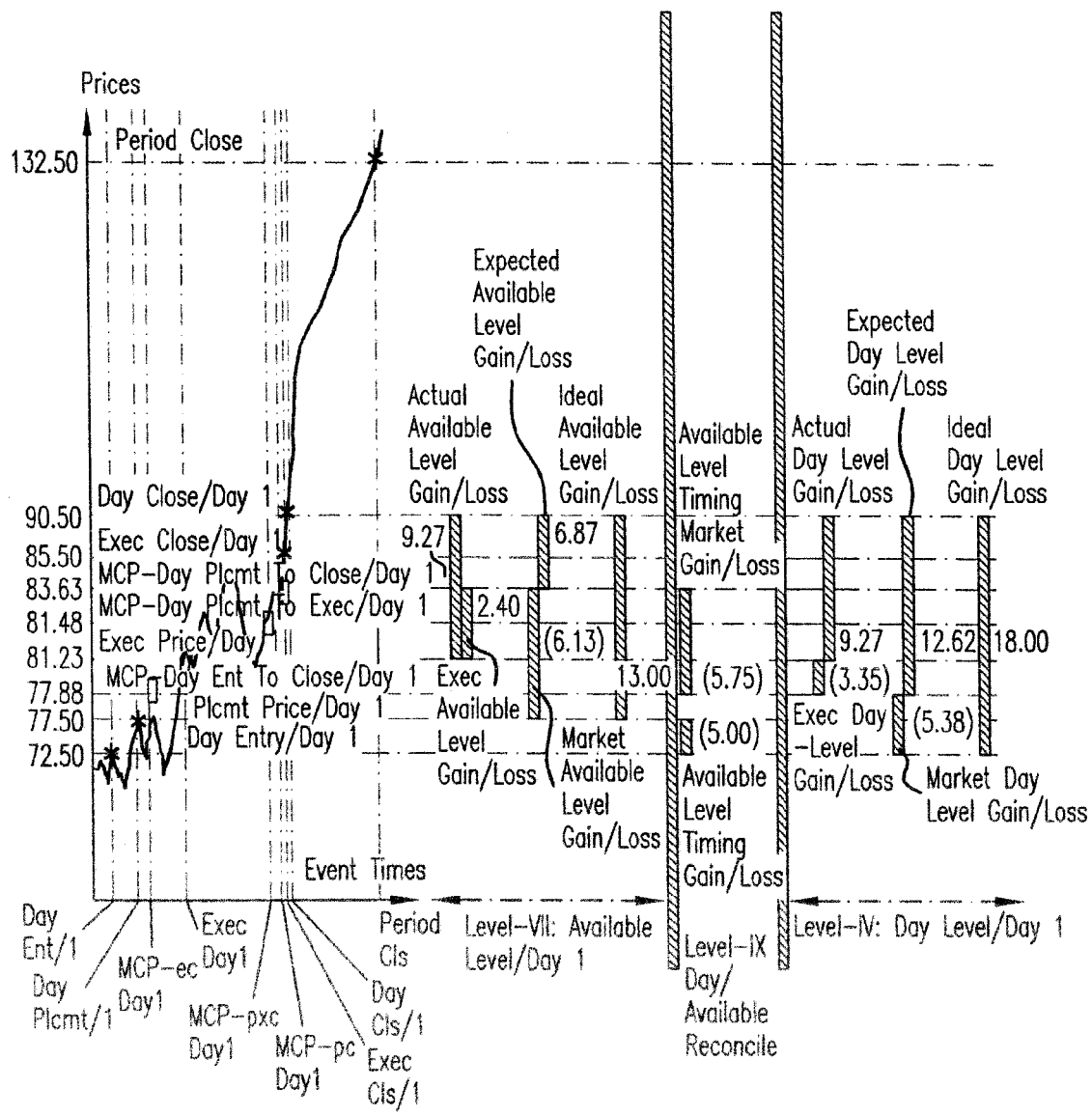
FIG. 16 illustrates a preferred day/available level cost analysis for an exemplary decision-open-entry-placement-execution completion-close time set (day 1).
Figure 17:
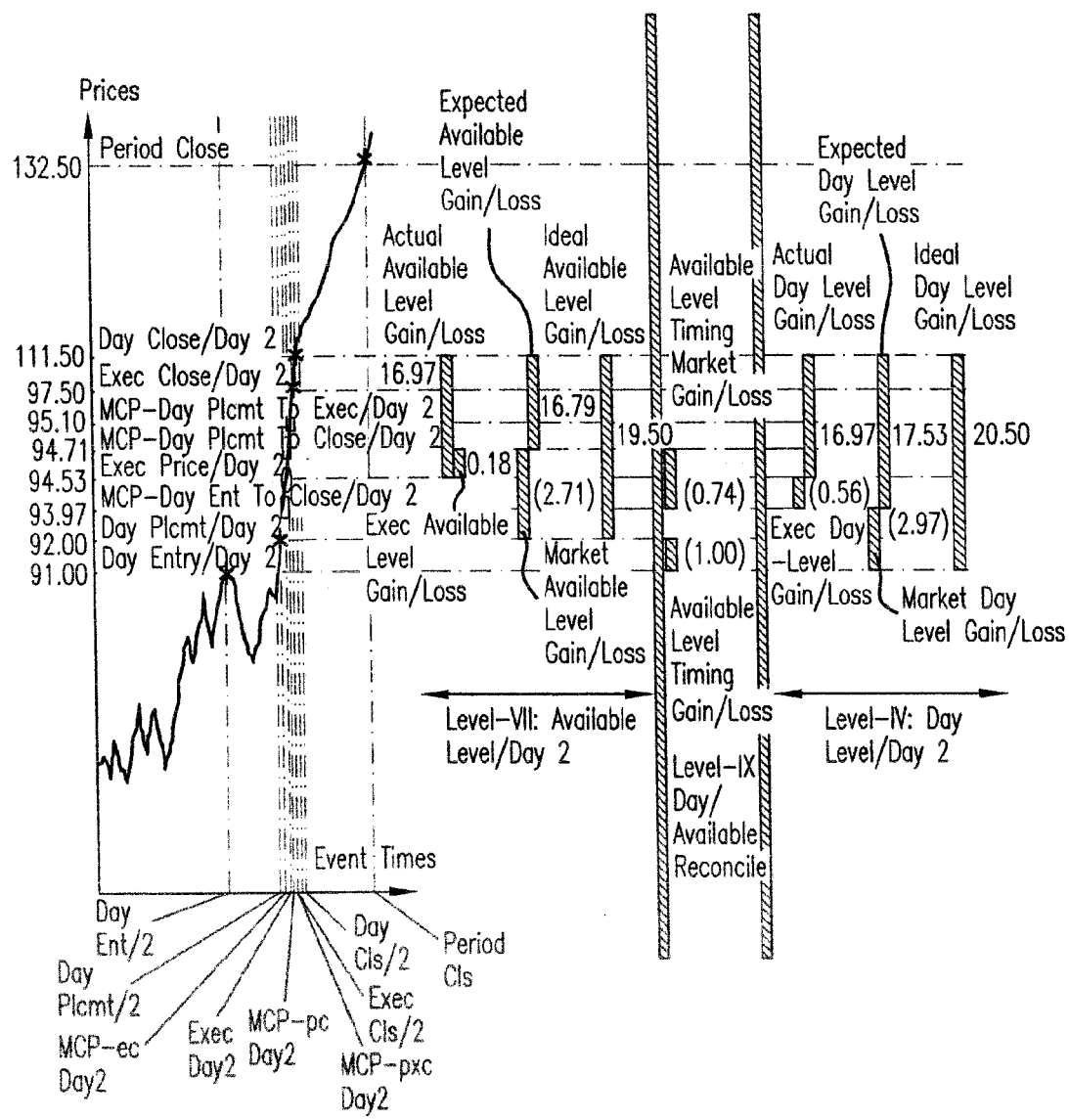
FIG. 17 illustrates a preferred day/available level cost analysis for an exemplary decision-open-entry-placement-execution completion-close time set (day 2).
Figure 18:
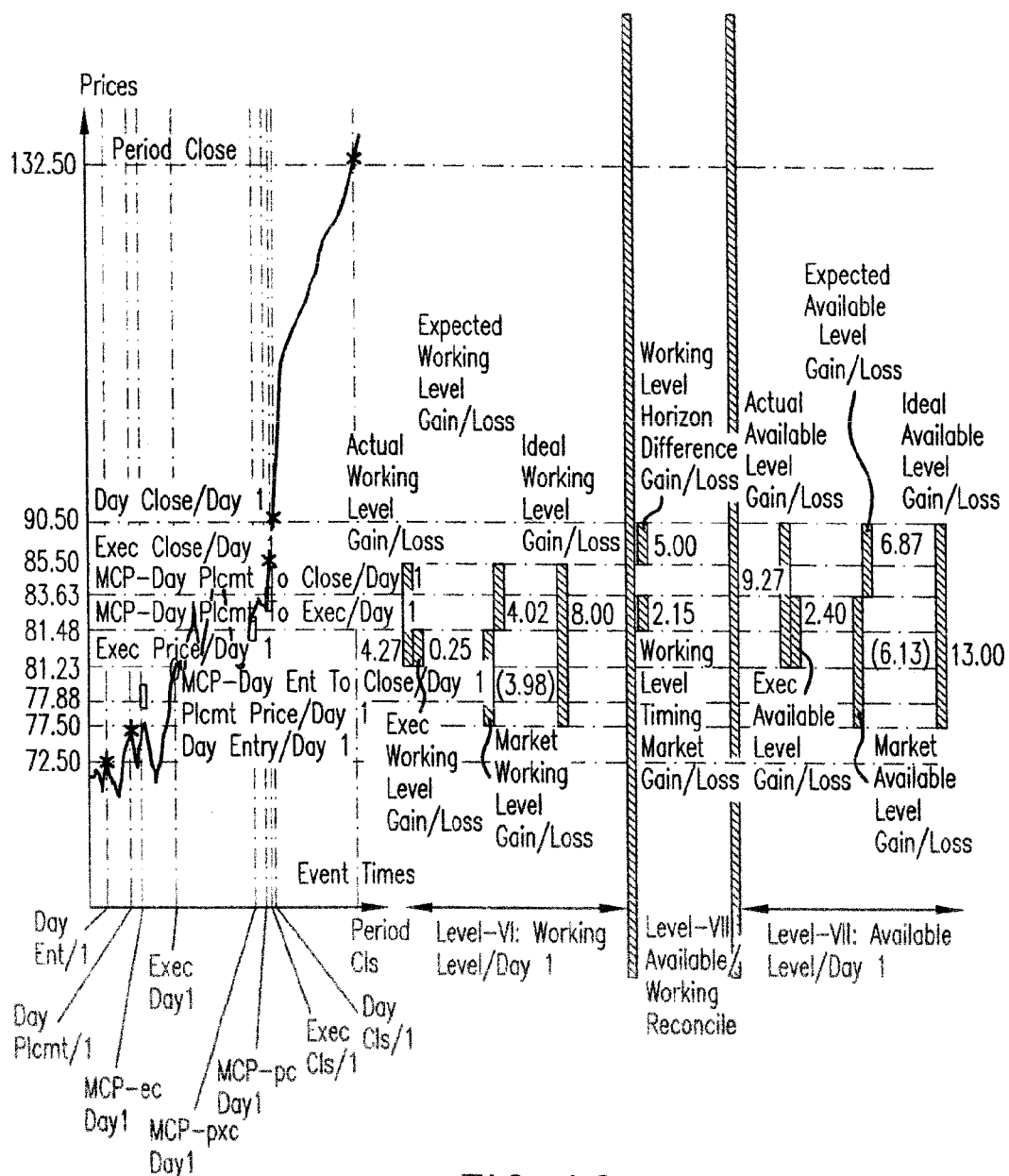
FIG. 18 illustrates a preferred available/working level cost analysis for an exemplary decision-open-entry-placement-execution completion-close time set (day 1).
Figure 19:
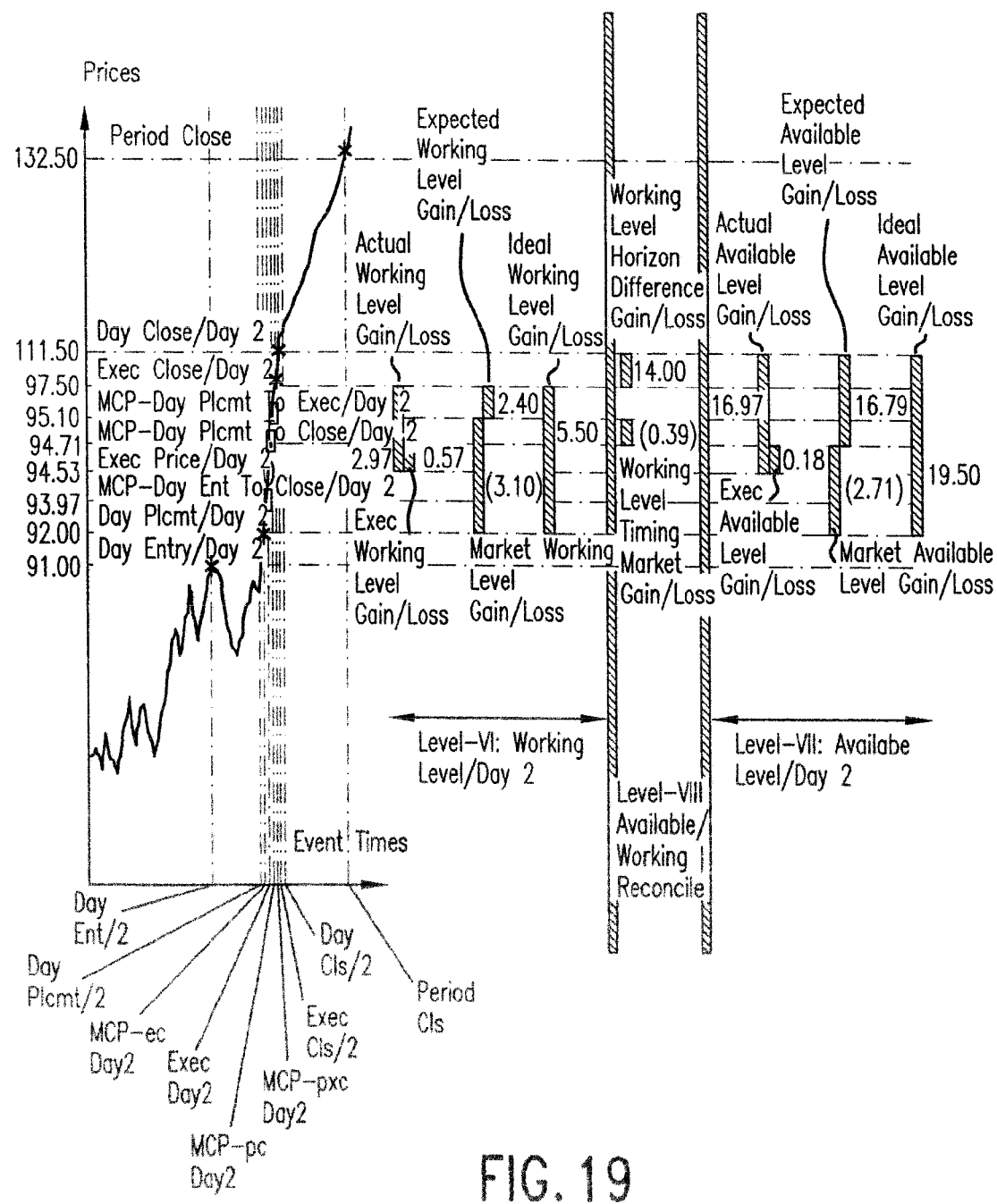
FIG. 19 illustrates a preferred available/working level cost analysis for an exemplary decision-open-entry-placement-execution completion-close time set (day 2).

Consider now the day level analysis with the DOEPXcC set (FIGS. 16 & 18 for Day-1 and FIGS. 17 & 19 for Day-2). On Day-1, the entry was at $72.50 (the Day_Entry) and the placement was at $77.50 (the Day_Placement). During the length of the day, the client executed at $81.23 (the Day_Exec). When all the fills were returned and the execution was complete (i.e., the day-execution-close event), the corresponding strike at that time was (the Day_Exec_Close) at $85.50. And the stock closed at $90.50 (Day_Close). The day-level market-clearing price from day-entry to day-close (DMCP_ec), was at $77.88. The day-level market-clearing price from day-placement to day-execution-close (DMCP_pxc), was at $81.48. The day-level market-clearing price from day-placement to day-close (DMCP_pc) was at $83.63. On Day-2, the entry was at $91.00 (the Day Entry) and the placement was at $92.00 (the Day_Placement). During the length of the day, the client executed at $94.53 (the Day_Exec). When all the fills were returned and the execution was complete (i.e., the day-execution-close event), the corresponding strike at that time was (the Day_Exec_Close) at $97.50. And the stock closed at $111.50 (Day_Close). The day-level market-clearing price from day-entry to day-close (DMCP_ec), was at $93.97. The day-level market-clearing price from day-placement to day-execution-close (DMCP_pxc), was at $95.10. The day-level market-clearing price from day-placement to day-close (DMCP_pc), was at $94.71. Given these day level price-points, in a preferred embodiment Levels VI, VII & IX (see FIG. 16 for Day-1 and FIG. 17 for Day-2) and Levels VI, VII, and VIII (see FIG. 18 for Day-1 and FIG. 19 for Day-2) of the cost/performance analysis are constructed as follows (note that Level VII is repeated in the figures in order to provide continuity between the panels).

Level VI: The Day Level Analysis. A preferred Level VI Analysis for the DOEPXcC-set involves five separate cost numbers as follows:

Ideal Day Level Gain/Loss: The difference between Day_Close ($90.50 for Day-1 and $111.50 for Day-2) and Day_Entry ($72.50 for Day-1 and $91.00 for Day-2), which amounts to $18.00 for Day-1 and $20.50 for Day-2, spans the full range of day level gain (or loss) that may be achieved in an ideal frictionless market. And the corresponding gain/loss factor may be obtained by dividing by the respective day length Day_Exec. Thus:

$$\text{Ideal Day Level Gain/Loss} = (\text{Day\_Close} - \text{Day\_Entry}) \tag{169}$$

$$\text{Ideal Day Level Gain/Loss Factor} = (\text{Day\_Close} - \text{Day\_Entry})/\text{Day\_Exec} \tag{170}$$

Expected Day Level Gain/Loss: The difference between Day_Close ($90.50 for Day-1 and $111.50 for Day-2) and the day-length market-clearing price from day-entry to day-close (DMCP_ec) ($77.88 for Day-1 and $93.97 for Day-2), which amounts to $12.62 for Day-1 and $17.53 for Day-2, spans the expected day level gain (or loss) that may be achieved in a frictional market. And the corresponding gain/loss factor may be obtained by dividing by the day level Day_Exec. Thus:

$$\text{Expected Day Level Gain/Loss} = (\text{Day\_Close} - \text{DMCP\_ec}) \tag{171}$$

$$\text{Expected Day Level Gain/Loss Factor} = (\text{Day\_Close} - \text{DMCP\_ec})/\text{Day\_Exec} \tag{172}$$

Actual Day Level Gain/Loss: The difference between Day_Close ($90.50 for Day-1 and $111.50 for Day-2) and the day-level execution price (Day_Exec) ($81.23 for Day-1 and $94.53 for Day-2), which amounts to $9.27 for Day-1 and $16.98 for Day-2, spans the actual day level gain (or loss) that was achieved by the client in a frictional market. And the corresponding gain/loss factor may be obtained by dividing by the day level Day_Exec. Thus:

$$\text{Actual Day Level Gain/Loss} = (\text{Day\_Close} - \text{Day\_Exec}) \tag{173}$$

$$\text{Actual Day Level Gain/Loss Factor} = (\text{Day\_Close} - \text{Day\_Exec})/\text{Day\_Exec} \tag{174}$$

Market Day Level Gain/Loss: The difference between Day_Entry ($72.50 for Day-1 and $91.00 for Day-2) and day-length market-clearing price from day-entry to day-close (DMCP_ec) ($77.88 for Day-1 and $93.97 for Day-2), which amounts to −$5.38 for Day-1 and −$2.97 for Day-2, is a measure of market impact and captures the average cost of trading during the length of the day order. The corresponding gain/loss factor may be obtained by dividing by the day level Day_Exec. Thus:

$$\text{Market Day Level Gain/Loss} = (\text{Day\_Entry} - \text{DMCP\_ec}) \tag{175}$$

$$\text{Market Day Level Gain/Loss Factor} = (\text{Day\_Entry} - \text{DMCP\_ec})/\text{Day\_Exec} \tag{176}$$

Execution Day Level Gain/Loss: The difference between day-length market-clearing price from day-entry to day-close (DMCP_ec) ($77.88 for Day-1 and $93.97 for Day-2) and the day-level execution price (Day_Exec) ($81.23 for Day-1 and $94.53 for Day-2), which amounts to −$3.35 for Day-1 and −$0.56 for Day-2, is a measure of the excess cost paid out by the client as measured against the market average. The corresponding gain/loss factor may be obtained by dividing by the day level Day_Exec. Thus:

$$\text{Execution Day Level Gain/Loss} = (\text{DMCP\_ec} - \text{Day\_Exec}) \tag{177}$$

$$\text{Execution Day Level Gain/Loss Factor} = (\text{DMCP\_ec} - \text{Day\_Exec})/\text{Day\_Exec} \tag{178}$$

Level VII: The Available Level Analysis. A preferred Level VII Analysis for the DOEPXcC-set involves five separate cost numbers as follows:

Ideal Available Level Gain/Loss: The difference between Day_Close ($90.50 for Day-1 and $111.50 for Day-2) and Day_Placement ($77.50 for Day-1 and $92.00 for Day-2), which amounts to $13.00 for Day-1 and $19.50 for Day-2, spans the full range of placement level gain (or loss) that may be achieved in an ideal frictionless market. And the corresponding gain/loss factor may be obtained by dividing by the respective day level Day_Exec. Thus:

$$\text{Ideal Available Level Gain/Loss} = (\text{Day\_Close} - \text{Day\_Placement}) \tag{179}$$

$$\text{Ideal Available Level Gain/Loss Factor} = (\text{Day\_Close} - \text{Day\_Placement})/\text{Day\_Exec} \tag{180}$$

Expected Available Level Gain/Loss: The difference between Day_Close ($90.50 for Day-1 and $111.50 for Day-2) and the day-length market-clearing price from day-placement to day-close (DMCP_pc) ($83.63 for Day-1 and $94.71 for Day-2), which amounts to $6.87 for Day-1 and $16.79 for Day-2, spans the expected placement level gain (or loss) that may be achieved in a frictional market. And the corresponding gain/loss factor may be obtained by dividing by the day level Day_Exec. Thus:

$$\text{Expected Available Level Gain/Loss} = (\text{Day\_Close} - \text{DMCP\_pc}) \tag{181}$$

$$\text{Expected Available Level Gain/Loss Factor} = (\text{Day\_Close} - \text{DMCP\_pc})/\text{Day\_Exec} \tag{182}$$

Actual Available Level Gain/Loss: The difference between Day_Close ($90.50 for Day-1 and $111.50 for Day-2) and the day-level execution price (Day_Exec) ($81.23 for Day-1 and $94.53 for Day-2), which amounts to $9.27 for Day-1 and $16.97 for Day-2, spans the actual placement level gain (or loss) that was achieved by the client in a frictional market. And the corresponding gain/loss factor may be obtained by dividing by the day level Day_Exec. Thus:

$$\text{Actual Available Level Gain/Loss} = (\text{Day\_Close} - \text{Day\_Exec}) \tag{183}$$

$$\text{Actual Available Level Gain/Loss Factor} = (\text{Day\_Close} - \text{Day\_Exec})/\text{Day\_Exec} \tag{184}$$

Market Available Level Gain/Loss: The difference between Day_Placement ($77.50 for Day-1 and $92.00 for Day-2) and day-length market-clearing price from day-placement to day-close (DMCP_pc) ($83.63 for Day-1 and $94.71 for Day-2), which amounts to −$6.13 for Day-1 and −$2.71 for Day-2, is a measure of market impact and captures the average cost of trading during the length of working the day order. The corresponding gain/loss factor may be obtained by dividing by the day level Day_Exec. Thus:

$$\text{Market Available Level Gain/Loss}=(\text{Day\_Placement}-\text{DMCP\_pc}) \quad (185)$$

$$\text{Market Available Level Gain/Loss Factor}=(\text{Day\_Placement}-\text{DMCP\_pc})/\text{Day\_Exec} \quad (186)$$

Execution Available Level Gain/Loss: The difference between day-level market-clearing price from day-placement to day-close (DMCP_pc) ($83.63 for Day-1 and $94.71 for Day-2) and the day-level execution price (Day_Exec) ($81.23 for Day-1 and $94.53 for Day-2), which amounts to $2.40 for Day-1 and $0.18 for Day-2, is a measure of the excess cost paid out by the client as measured against the market average. The corresponding gain/loss factor may be obtained by dividing by the day level Day_Exec. Thus:

$$\text{Execution Available Level Gain/Loss}=(\text{DMCP\_pc}-\text{Day\_Exec}) \quad (187)$$

$$\text{Execution Available Level Gain/Loss Factor}=(\text{DMCP\_pc}-\text{Day\_Exec})/\text{Day\_Exec} \quad (188)$$

Level IX: The Day/Available Reconciliation Level Analysis. A preferred Level IX Analysis for the DOEPXcC-set involves two reconciliation cost numbers as follows:

Available Level Timing Market Gain/Loss: The difference between day-level market-clearing price from day-entry to day-close (DMCP_ec) ($77.88 for Day-1 and $93.97 for Day-2) and day-level market-clearing price from day-placement to day-close (DMCP_pc) ($83.63 for Day-1 and $94.71 for Day-2), which amounts to −$5.75 for Day-1 and −$0.74 for Day-2, accounts for the market impact of delaying the hand-over of the order to the desk between market open and entry. And the corresponding gain/loss factor may be obtained by dividing by the day level Day_Exec. Thus:

$$\text{Available Level Timing Market Gain/Loss}=(\text{DMCP\_ec}-\text{DMCP\_pc}) \quad (189)$$

$$\text{Available Level Timing Market Gain/Loss Factor}=(\text{DMCP\_ec}-\text{DMCP\_pc})/\text{Day\_Exec} \quad (190)$$

Available Level Timing Gain/Loss: The difference between Day_Entry ($72.50 for Day-1 and $91.00 for Day-2) and Day_Placement ($77.50 for Day-1 and $92.00 for Day-2), which amounts to −$5.00 for Day-1 and −$1.00 for Day-2, accounts for the timing factor, i.e., the gain (or loss) that occurred while waiting to enter the market. Note that over and above the timing gain/loss, the market impact of the timing issue is captured in equations 189 & 190. And the corresponding gain/loss factor may be obtained by dividing by the order length Day_Exec. Thus:

$$\text{Available Level Timing Gain/Loss}=(\text{Day\_Entry}-\text{Day\_Placement}) \quad (191)$$

$$\text{Available Level Timing Market Gain/Loss Factor}=(\text{Day\_Entry}-\text{Day\_Placement})/\text{Day\_Exec} \quad (192)$$

Level VI: The Working Level Analysis. A preferred Level VI Analysis for the DOEPXcC-set involves five separate cost numbers as follows:

Ideal Working Level Gain/Loss: The difference between Day_Exec_Close ($85.50 for Day-1 and $97.50 for Day-2) and Day_Placement ($77.50 for Day-1 and $92.00 for Day-2), which amounts to $8.00 for Day-1 and $5.50 for Day-2, spans the full range of working level gain (or loss) that may be achieved in an ideal frictionless market. And the corresponding gain/loss factor may be obtained by dividing by the respective day level Day_Exec. Thus:

$$\text{Ideal Working Level Gain/Loss}=(\text{Day\_Exec\_Close}-\text{Day\_Placement}) \quad (193)$$

$$\text{Ideal Working Level Gain/Loss Factor}=(\text{Day\_Exec\_Close}-\text{Day\_Placement})/\text{Day\_Exec} \quad (194)$$

Expected Working Level Gain/Loss: The difference between Day_Exec_Close ($85.50 for Day-1 and $97.50 for Day-2) and the day-length market-clearing price from day-placement to execution-close (DMCP_pxc) ($81.48 for Day-1 and $95.10 for Day-2), which amounts to $4.02 for Day-1 and $2.40 for Day-2, spans the expected placement level gain (or loss) that may be achieved in a frictional market. And the corresponding gain/loss factor may be obtained by dividing by the day level Day_Exec. Thus:

$$\text{Expected Working Level Gain/Loss}=(\text{Day\_Exec\_Close}-\text{DMCP\_pxc}) \quad (195)$$

$$\text{Expected Working Level Gain/Loss Factor}=(\text{Day\_Exec\_Close}-\text{DMCP\_pxc})/\text{Day\_Exec} \quad (196)$$

Actual Working Level Gain/Loss: The difference between Day_Exec_Close ($85.50 for Day-1 and $97.50 for Day-2) and the day-level execution price (Day_Exec) ($81.23 for Day-1 and $94.53 for Day-2), which amounts to $4.27 for Day-1 and $2.97 for Day-2, spans the actual placement level gain (or loss) that was achieved by the client in a frictional market. And the corresponding gain/loss factor may be obtained by dividing by the day level Day_Exec. Thus:

$$\text{Actual Working Level Gain/Loss}=(\text{Day\_Exec\_Close}-\text{Day\_Exec}) \quad (197)$$

$$\text{Actual Working Level Gain/Loss Factor}=(\text{Day\_Exec\_Close}-\text{Day\_Exec})/\text{Day\_Exec} \quad (198)$$

Market Working Level Gain/Loss: The difference between Day_Placement ($77.50 for Day-1 and $92.00 for Day-2) and day-length market-clearing price from day-placement to day-exec-close (DMCP_pxc) ($81.48 for Day-1 and $95.10 for Day-2), which amounts to −$3.98 for Day-1 and −$3.10 for Day-2, is a measure of market impact and captures the average cost of trading during the length of working the day order. The corresponding gain/loss factor may be obtained by dividing by the day level Day_Exec. Thus:

$$\text{Market Working Level Gain/Loss}=(\text{Day\_Placement}-\text{DMCP\_pxc}) \quad (199)$$

$$\text{Market Working Level Gain/Loss Factor}=(\text{Day\_Placement}-\text{DMCP\_pxc})/\text{Day\_Exec} \quad (200)$$

Execution Working Level Gain/Loss: The difference between day-level market-clearing price from day-placement to day-exec-close (DMCP_pxc) ($81.48 for Day-1 and $95.10 for Day-2) and the day-level execution price (Day_Exec) ($81.23 for Day-1 and $94.53 for Day-2), which amounts to $0.25 for Day-1 and $0.57 for Day-2, is a measure of the excess cost paid out by the client as measured against the market average. The corresponding gain/loss factor may be obtained by dividing by the day level Day_Exec. Thus:

$$\text{Execution Working Level Gain/Loss}=(\text{DMCP\_pxc}-\text{Day\_Exec}) \quad (201)$$

$$\text{Execution Working Level Gain/Loss Factor}=(\text{DMCP\_pxc}-\text{Day\_Exec})/\text{Day\_Exec} \quad (202)$$

Level VIII: The Available/Working Reconciliation Level Analysis. A preferred Level VIE Analysis for the DOEPXcC-set involves two reconciliation cost numbers as follows:

Working Level Horizon Difference Gain/Loss: The difference between day-close (Day_Close) ($90.50 for Day-1 and $111.50 for Day-2) and Day_Exec_Close ($85.50 for Day-1 and $97.50 for Day-2), which amounts to $5.00 for Day-1 and $14.00 for Day-2, accounts for the market gain (or loss) that occurred between Day_Exec_Close and Day_Close. And the corresponding gain/loss factor may be obtained by dividing by the day-level Day_Exec. Thus:

Working Level Horizon Difference Gain/Loss=
  (Day_Close−Day_Exec_Close)         (203)

Working Level Horizon Difference Gain/Loss Factor=
  (Day_Close−Day_Exec_Close)/Day_Exec    (204)

Working Level Timing Market Gain/Loss: The difference between day-level market-clearing price from day-placement to day-close (DMCP_pc) ($83.63 for Day-1 and $94.71 for Day-2) and day-level market-clearing price from day-placement to day-exec-close (DMCP_pxc) ($81.48 for Day-1 and $95.10 for Day-2), which amounts to $2.15 for Day-1 and −$0.39 for Day-2, accounts for the market impact of completing the day-order at the day-exec-close instead of at the day-close. And the corresponding gain/loss factor may be obtained by dividing by the day level Day_Exec. Thus:

Working Level Timing Market Gain/Loss=
  (DMCP_pc−DMCP_pxc)             (205)

Working Level Timing Market Gain/Loss Factor=
  (DMCP_pc−DMCP_pxc)/Day_Exec        (206)

Figure 20:
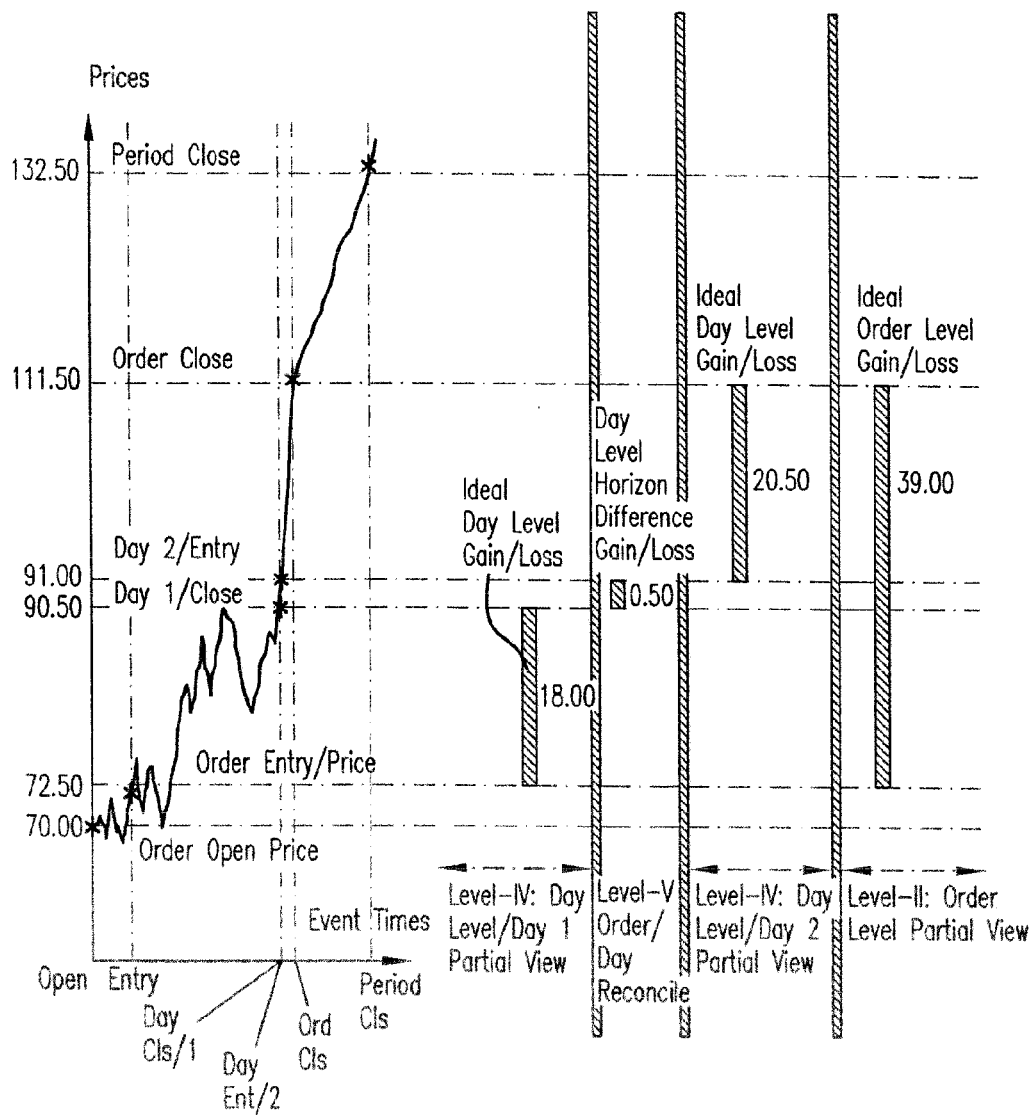
FIG. 20 illustrates a preferred order/day level cost analysis for an exemplary decision-open-entry-placement-execution completion-close time set.

Level V: The Order/Day Reconciliation Level Analysis. A preferred Level V Analysis (see FIG. 20) for the DOEPXcC-set involves a single reconciliation cost numbers as follows:

Day Level Horizon Difference Gain/Loss: The difference between Day_Open ($91.00) for Day 2 and Last_Day_Close ($90.50) for Day 1, which amounts to $0.50, accounts for the market gain (or loss) that occurs between the close and open on consecutive days. And the corresponding gain/loss factor may be obtained by dividing by the order length Order_Exec. Thus:

Day Level Horizon Difference Gain/Loss=
  (Day_Open−Last_Day_Close)         (207)

Day Level Horizon Difference Gain/Loss Factor=
  (Day_Open−Last_Day_Close)/Order_Exec    (208)

X. Portfolio Inventory Tracking

Within a given firm, if the accounting systems as well as the order-management systems (the systems that track information sets—see Section II) are adequately integrated, it is feasible to track the cash flows that accompany the trading and settlement activities. Such a system provides avenues to analyze the actual returns against the expected/ideal returns. In this section we show how to integrate the trade-cost measurement framework with the cash-flow analysis approach to obtain portfolio return figures that incorporate the cost of trading. FIGS. 21 through 25 depict a sample portfolio that trades in 16 stocks over a period of one year.

Figure 21:
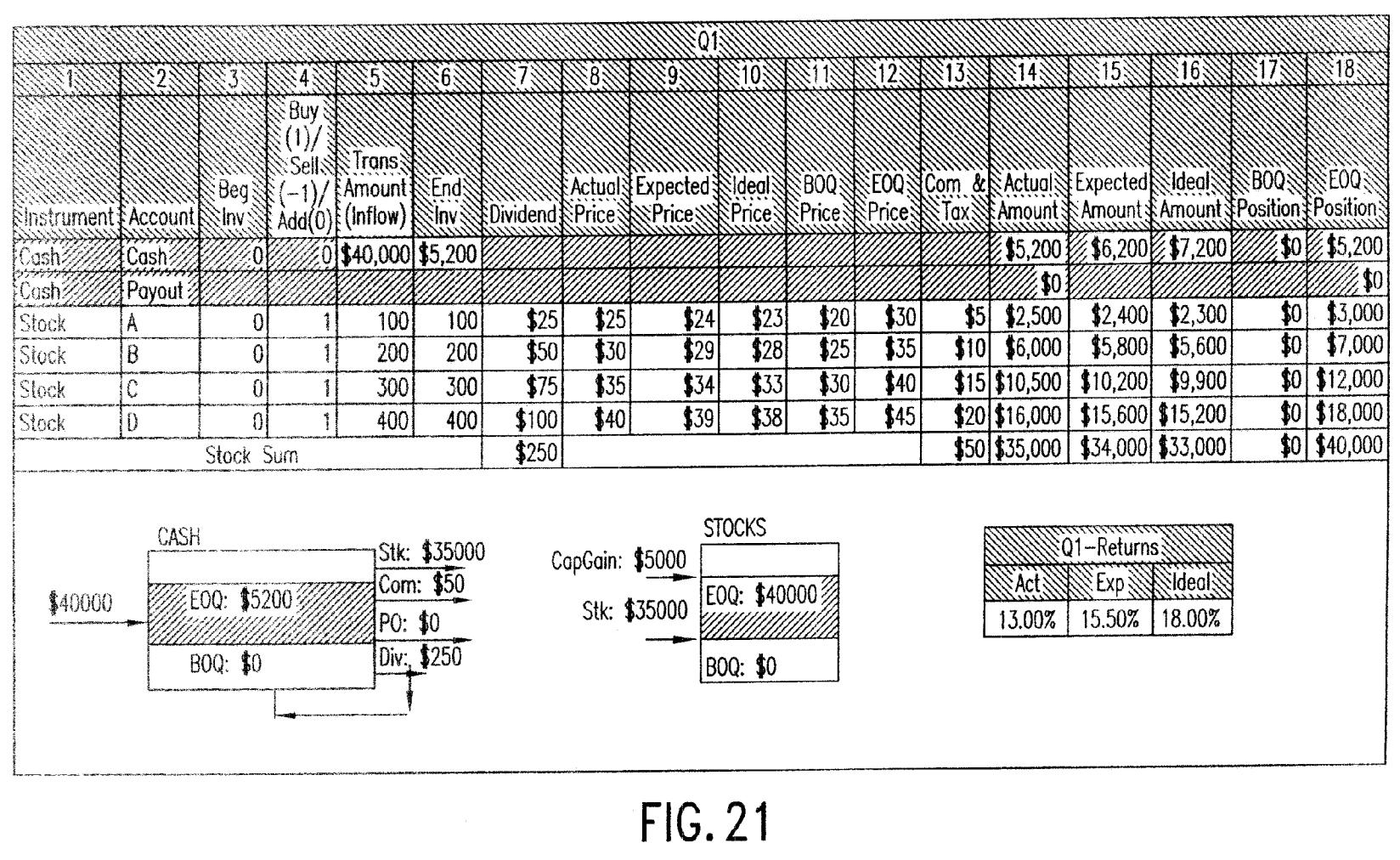

FIG. 21 shows the return analysis for Q1. Consider first the stock transactions. The portfolio manager started with an empty portfolio (as shown in column 3). He then bought four stocks (stocks A, B, C, & D) over the length of the quarter and paid a sum of $35,000 for the purchases (as shown at the bottom of column 14). Column 4 contains an index that keeps track of whether the stock transaction was a buy (+1) order or a sell (−1) order. Cash flows are recorded as: (0). The amounts of stocks purchased and the ending inventories are as shown in columns 5 & 6. The dividends that were paid out over the quarter are as shown in column 7. The actual price that was paid to purchase stock is as shown in column 8; while the expected (i.e., the market-clearing price) and the ideal (i.e., the price that was prevalent when the trade order was first revealed in the market) prices are as shown in columns 9 & 10. The respective stock prices available at the Beginning-Of-Quarter (BOQ) are as shown in column 11. And likewise, the prices available at the End-Of-Quarter (EOQ) are as shown in column 12. Any commissions/taxes that were paid for the various stock transactions are as shown in column 13. The actual, expected and ideal stock positions may be obtained as in columns 14, 15, & 16 by multiplying the respective prices (in columns 8, 9 & 10) with the transaction amount (in column 5) and the buy/sell (+1/−1) index (column 4). Also, the Beginning-Of-Quarter (BOQ) as well as the End-Of-Quarter (EOQ) positions may be obtained by multiplying the respective prices (in columns 11 & 12) with the respective inventory positions (beginning inventory in column 3 & ending inventory in column 6). The stock summaries are as shown at the bottom of the table in light green. Thus at the end of the quarter, the mark-to-market valuation of the stocks in the portfolio is at $40,000.

Now consider the cash transactions in the cash account for Q1. At the beginning of the quarter the cash inventory (column 3) is net zero. During the course of the quarter, an amount equal to $40,000 (column 4) is added into the inventory as new funds are deposited. At the end of the quarter, the cash resources are at $5,200 (column 6), which is also reflected in column 14 (entitled Actual Position). In contrast, the Expected (column 15) and Ideal (column 16) Positions contain the end-of-quarter cash inventories based on the Expected and Ideal Prices reported in columns 9 & 10.

The Payout account reports the actual amounts that were paid out (column 14) to the fund owners over the quarter. For Q1, the payout was zero. Given these accounts, we may now calculate the portfolio (actual, expected and ideal) returns for Q1 using the following three formulations:

Return(Actual) = [[Cash(Actual) + Stock(Period End) + Pay Out] − [   (209)
  Cash(Begin) + Cash(Inflow) + Stock(Period Begin)]] / [
  Cash(Begin) + Cash(Inflow) + Stock(Period Begin)]
  Thus
Return(Actual) = [[5,200 + 40,000 + 0] − [0 + 40,000 + 0]] / [
  0 + 40,000 + 0] = 13%

Return(Expected) = [[                             (210)
  Cash(Expected) + Stock(Period End) + Pay Out] − [
  Cash(Begin) + Cash(Inflow) + Stock(Period Begin)]] / [
  Cash(Begin) + Cash(Inflow) + Stock(Period Begin)]
  Thus
Return(Expected) = [[6,200 + 40,000 + 0] − [0 + 40,000 + 0]] / [
  0 + 40,000 + 0] = 15.5%

Return(Ideal) = [Cash(Ideal) + Stock(Period End) + Pay Out] − [   (211)
  Cash(Begin) + Cash(Inflow) + Stock(Period Begin)] / [
  Cash(Begin) + Cash(Inflow) + Stock(Period Begin)]
  Thus
Return(Ideal) = [[7,200 + 40,000 + 0] − [0 + 40,000 + 0]] / [
  0 + 40,000 + 0] = 18%

Figures 1, 23:
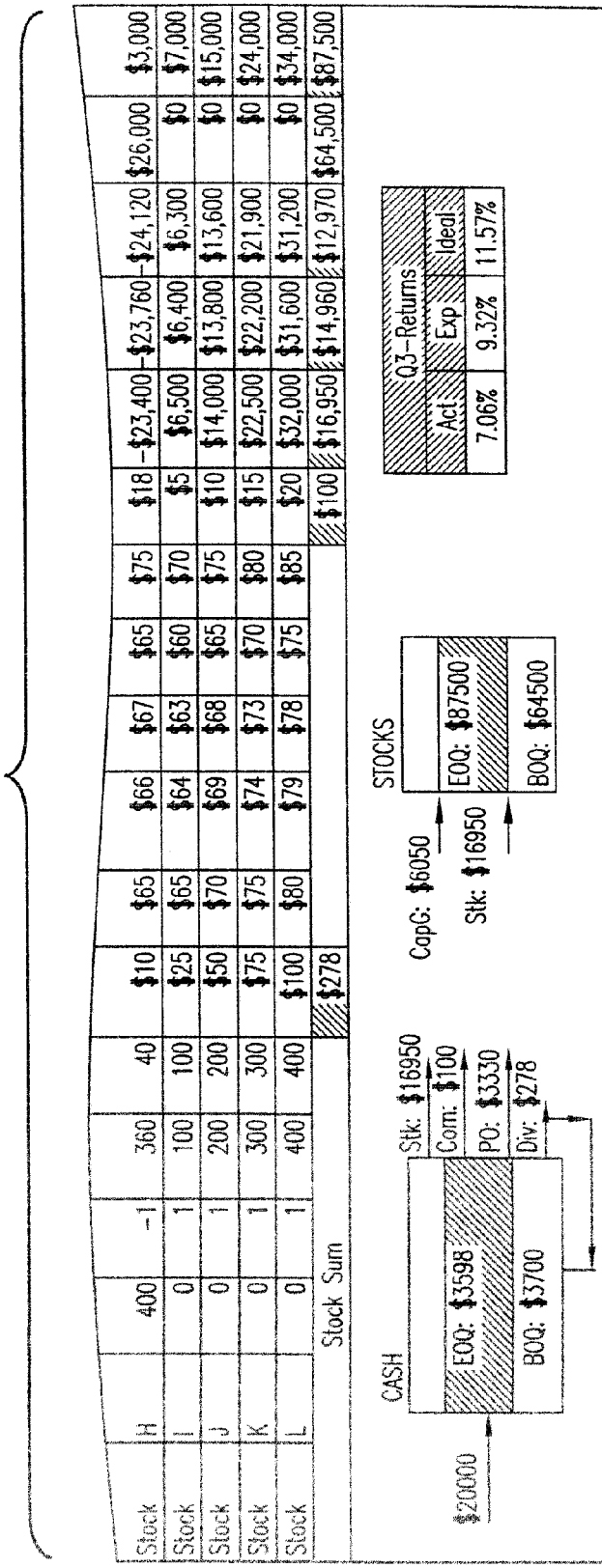
FIG. 23 illustrates an exemplary return analysis for quarter 3.
Figures 1, 24:
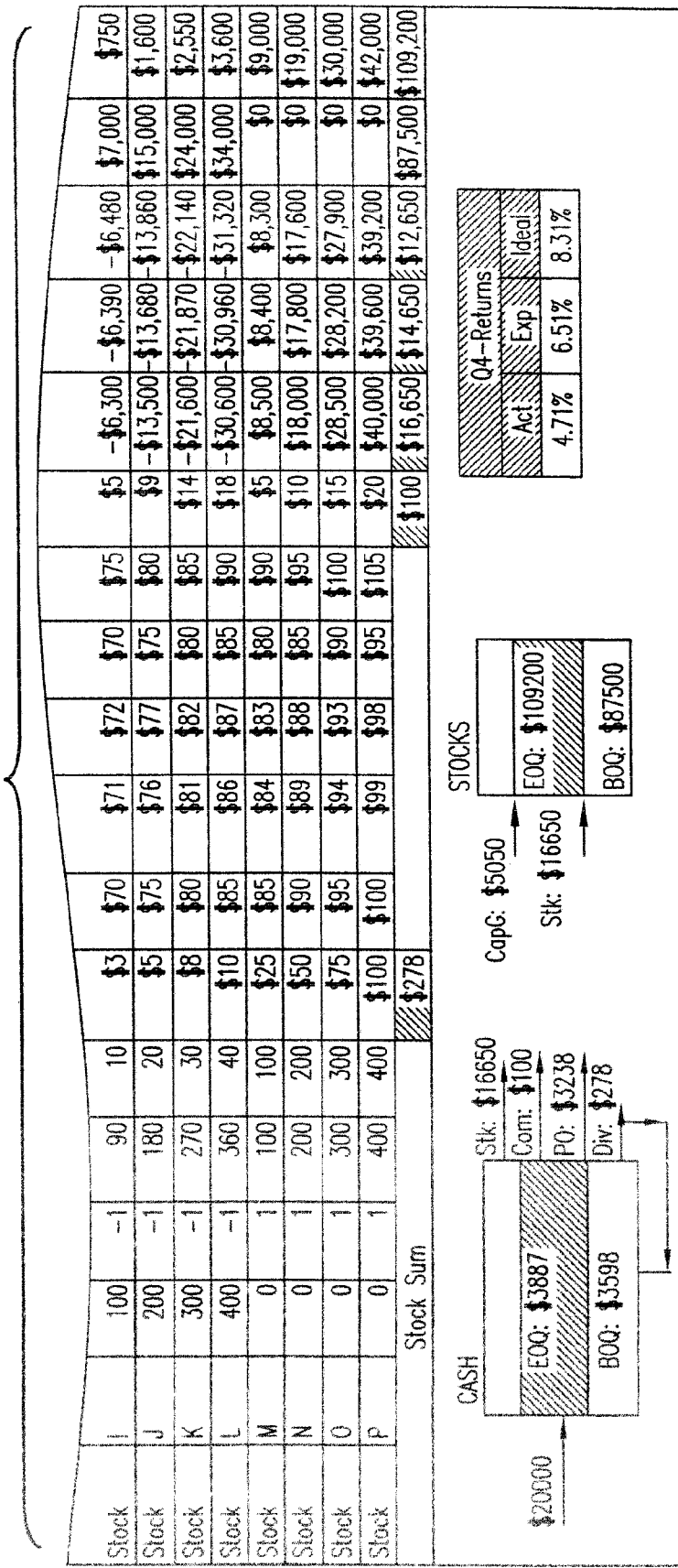
FIG. 24 illustrates an exemplary return analysis for quarter 4.

On similar lines, FIGS. 22, 23, and 24 contain return analyses for Q2, Q3, & Q4 respectively.

Figure 25:
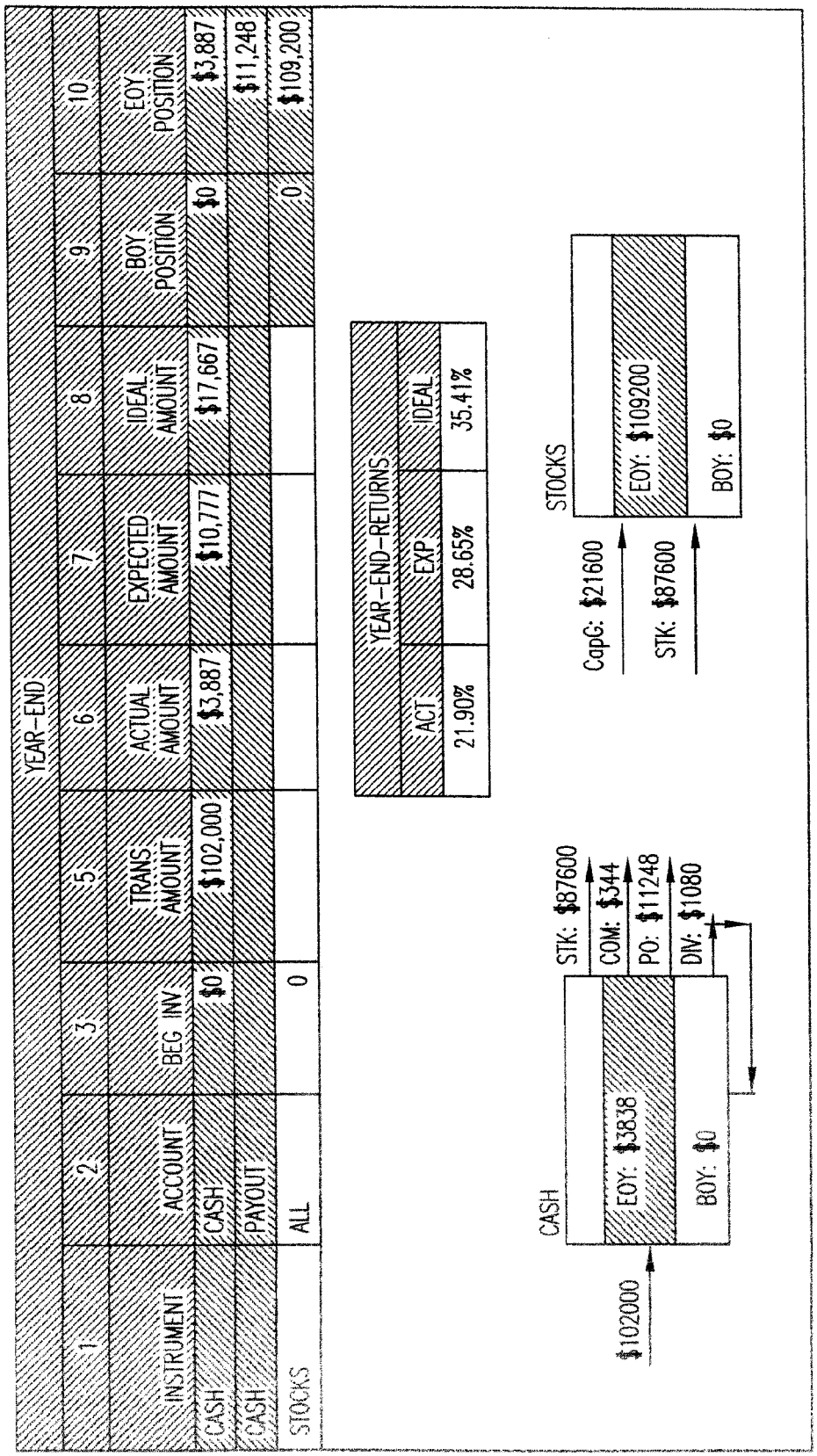
FIG. 25 illustrates an exemplary year-end portfolio return analysis.

If the granularity of the period of analysis is at a year-level instead of a quarter-level, then the year-end summaries as well as return analysis may be performed as depicted in FIG. 25.

Over the given one-year period, the portfolio took in an amount equal to $102,000 in cash. During this period it paid-out an amount equal to $11,248 to the fund owners. The portfolio paid $87,600 for the stocks it purchased which appreciated to an year-end position of $109,000 with a capital-gain of $21,600. At the end of the year, the actual amount of cash in the cash account was $3,887. For example, using Equation 209 we may calculate the actual return experienced by the portfolio as:

$$\text{Return(Actual)} = [[\text{Cash(Actual)} + \text{Stock(Period End)} + \text{Pay Out}] -$$
$$[\text{Cash(Begin)} + \text{Cash(Inflow)} + \text{Stock(Period Begin)}]] / [\text{Cash(Begin)} +$$
$$\text{Cash(Inflow)} + \text{Stock(Period Begin)}] = [[3,887 + 109,200 +$$
$$11,248] - [0 + 102,000 + 0]][0 + 102,000 + 0] = 21.9\%$$

XI. A Computer System Implementing the Framework

We now describe a preferred computer system and software that implements the framework of measurements. The system preferably comprises four parts.

The first part obtains information from an order management system to produce a sequence of transactions to be measured.

The second part collects and organizes market information about all transactions in the market for the securities of interest, over the time period of interest. These first two parts are independent.

The third part calculates gain-loss amounts (preferably as described herein) for each of the transactions in the sequence from part 1, using the market information from part 2.

The fourth part selects and summarizes information from these augmented transactions to obtain measurement gain/loss amounts and factors required for a particular query or report.

We also describe an alternate implementation of the fourth part, using a multidimensional (OLAP) database.

Part 1. Order Analysis and Decomposition

A typical order processing system maintains records in the form of files or tables in a data management system. Such records include entries that correspond to each trading event that occurs during the duration of each order.

Figure 26:
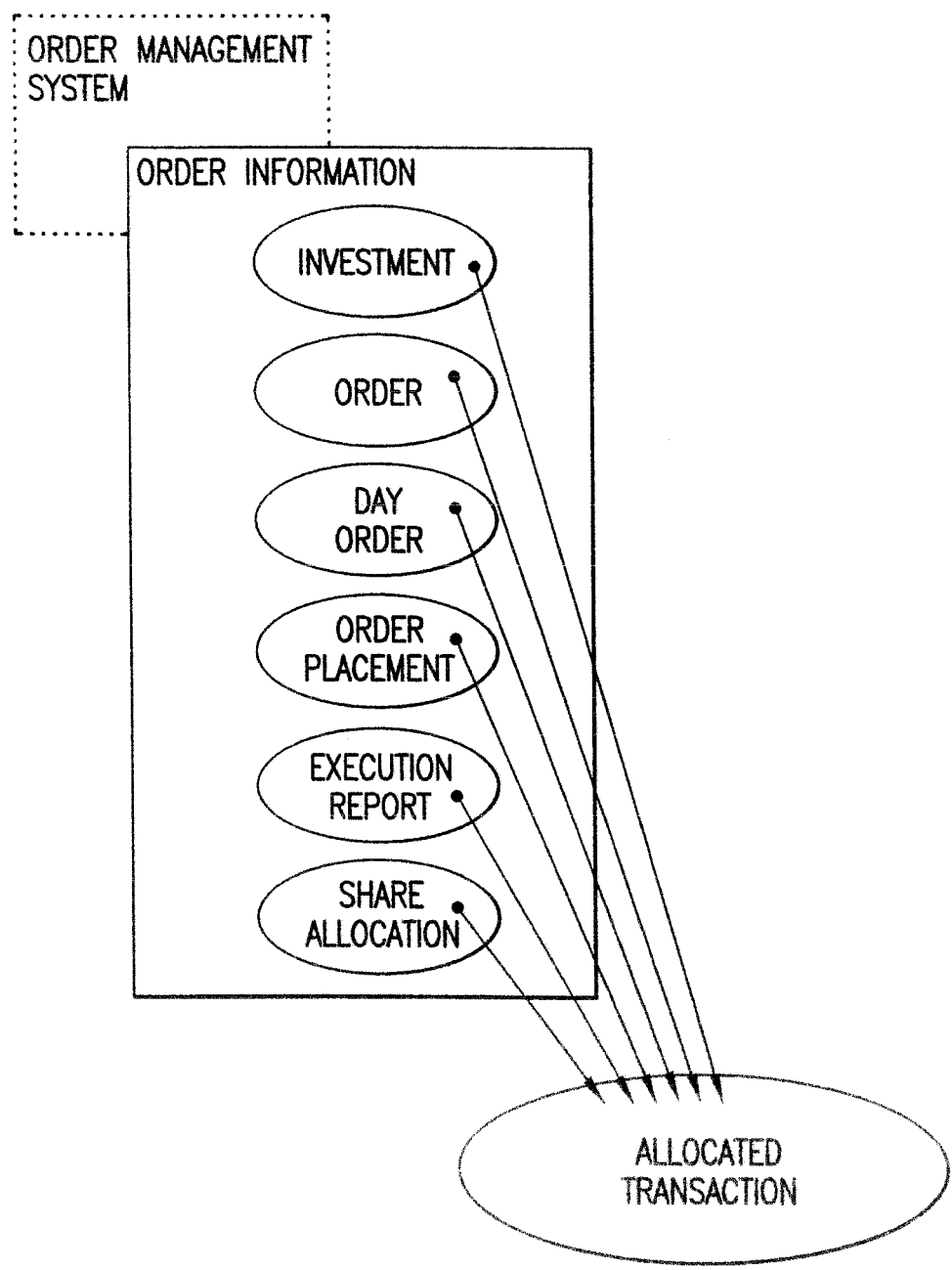
FIG. 26 illustrates a preferred order analysis and decomposition process.

The Order Analysis and Decomposition process (see FIG. 26) of a preferred embodiment analyzes order management system data to create a series of Allocated Transaction items. Each item represents some number of shares, that are part the same investment, ordered for the same account, by the same manager, traded on the same day, placed with the same broker, executed, and allocated to the same account.

For example, if an investment involves 3 accounts, traded over 2 days, using 2 brokers, this process may create 3×2× 2=12 Allocated Transaction items for that investment. The total share quantity of these 12 items will equal the total shares traded for the investment. Thus, each order is decomposed into pieces so that each piece will have a single value for each descriptive dimension, and a single value for each timestamp.

Each Allocated Transaction record preferably carries: the trade date, security identification, buy or sell indication; and a number of shares; manager, account, broker, and trader involved in the transaction. Optionally, also carried are order numbers or other identifiers from the order management system as may be useful for verifying the correct operation, and values for the timestamps, volumes, and average execution prices required by the measurement formulae. Each Allocated Transaction includes the decision and order-entry timestamps of the particular corresponding manager order entry event; the day-entry time of the corresponding day order; the placement time from the corresponding broker order; the latest execution time from execution reports recorded for that broker order, for the day, and for the full order term; the number of shares and average price-per-share for the corresponding day order; the number of shares and average price-per-share for the corresponding broker order; and the number of shares and average price-per-share for the whole order term.

Part 2. Market Data Management

Market Data Management provides the representative prices for market trading in the securities being measured. This market data may originate from an online market feed ("the ticker tape",) or from data files offered by markets and by third party market data vendors ("times and sales files.")

This data comprises a series of items, each describing one market transaction. Each item contains a timestamp, a symbol designating the instrument, the number of shares in the transaction, the price, and a condition code. The condition code indicates whether a trade is unusual in any of several ways. Relevant condition code values report that a particular trade was reported out of sequence (that is, with a later timestamp than the actual trade time,) or negotiated at a price that does not reflect trading in the general market, or a correction to a previously misreported item.

Figure 27:
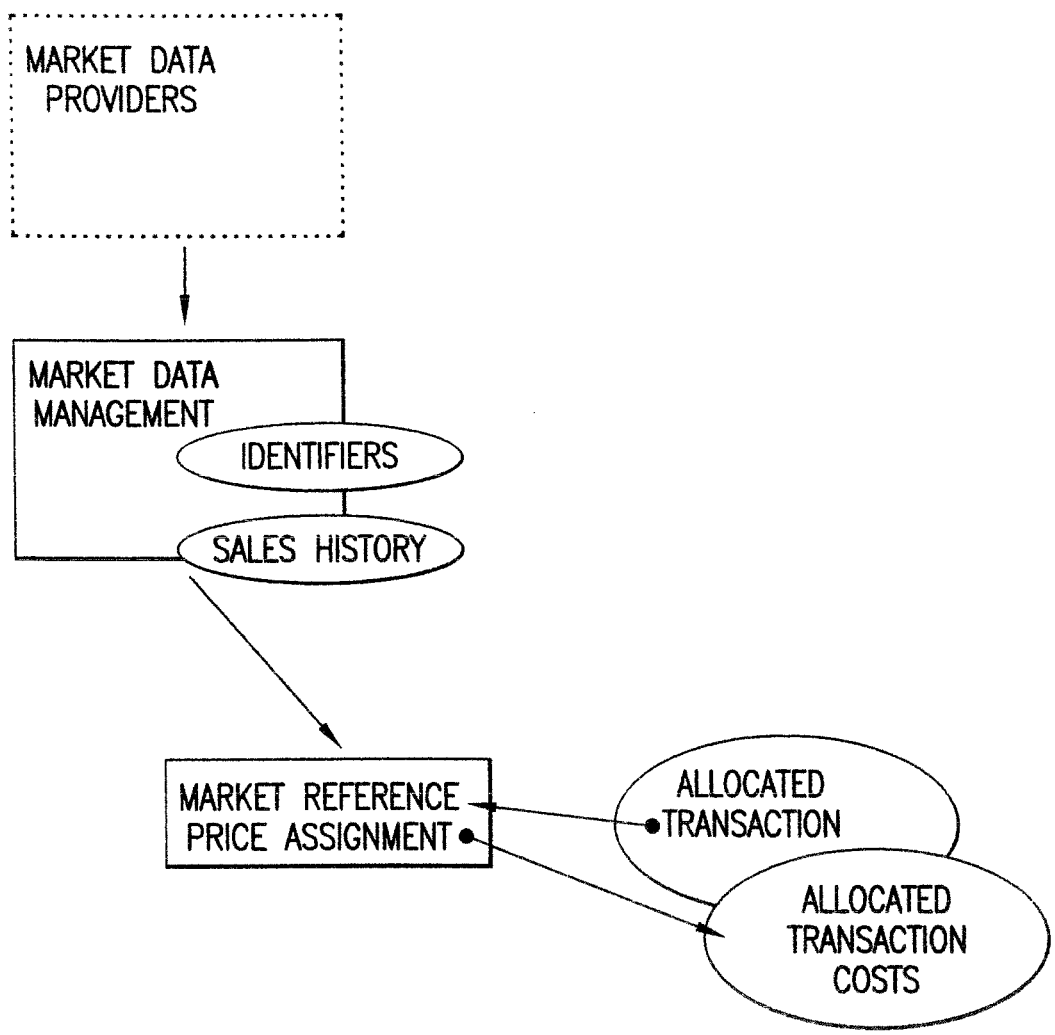
FIG. 27 illustrates a preferred market reference price assignment process.

A preferred Market Data Management process (see top of FIG. 27) organizes this information to provide price data for the measurement process. The process maintains, for each instrument, a record of each days published open and close price for the instrument. Given a symbol and a date, it can determine the market opening and closing prices for that date.

The process preferably maintains a synopsis of time and sales information. This information is organized in a manner suitable for three basic inquiries: First, given a symbol and a date and time within the investment period being measured, it provides a representative market price for public trades around that time. This inquiry form is used to obtain, for example, the market price at the time of order entry.

Second, given a symbol, a start date and time, and an end date and time, it provides the market-clearing-price (an average price per share,) for all shares of that security publicly traded during the designated time period. This inquiry form is used to obtain, for example, a market clearing price from order entry to final execution.

Third, given a symbol, a starting time, and some number of shares, it provides the market-clearing-price for the requested number of shares, assuming shares were purchased starting at the requested time, continuing until the number of shares traded in the market reaches the requested amount. This inquiry form is used, for example, to find the market-clearing-price for the "twenty percent" test, by requesting the market-clearing-price for 5 times the number of shares on the order.

To create this synopsis, the Market Data Management process accepts the market time-and-sales data, and removes transactions that have unwanted condition codes. This is, it ignores transactions that were not representative of the public market, and transactions known to have inaccurate timestamps. It also ignores transactions with prices that deviate greatly from others for the same security and proximate time; these generally represent reporting errors.

Market Data Management may summarize transactions to reduce the amount of data storage required. For example, all reports for the same stock traded during the same minute can be recorded as a single transaction, with a number of shares that is the total of the items, and a price that is the average price-per-share of those shares.

Market Data Management may provide a cache of results from previous inquiries, in the form of an in-memory data structure, database table, or other computer file. Market Reference Price Assignment can formulate several requests for the same price information. Using this cache, repeated requests can be answered quickly.

Part 3. Market Reference Price Assignment

The Market Reference Price Assignment process (see FIG. 27) augments the Allocated Transactions from Step 1 with per-share gain/loss information. It considers each Allocated Transaction item in turn.

For each Allocated Transaction, Market Reference Price Assignment queries the Market Data Management process to obtain open and close prices, intraday representative market prices, and market clearing prices as required by the previously described gain/loss formulae.

Using the market prices thus obtained, together with the per-share execution prices that appear in the Allocated Transaction item, Price Assignment computes per-share gain/loss amounts previously described by the formulae. Computing the corresponding amounts and factors will be done in a later stage.

The per-share gain/loss amounts become part of the Allocated Transaction item for subsequent processing. These are shown in the diagram as "Allocated Transaction Costs." The resulting items are stored in a relational database, multi-dimensional (OLAP) database, or file system.

Part 4. Direct Query or Reporting

Figure 28:
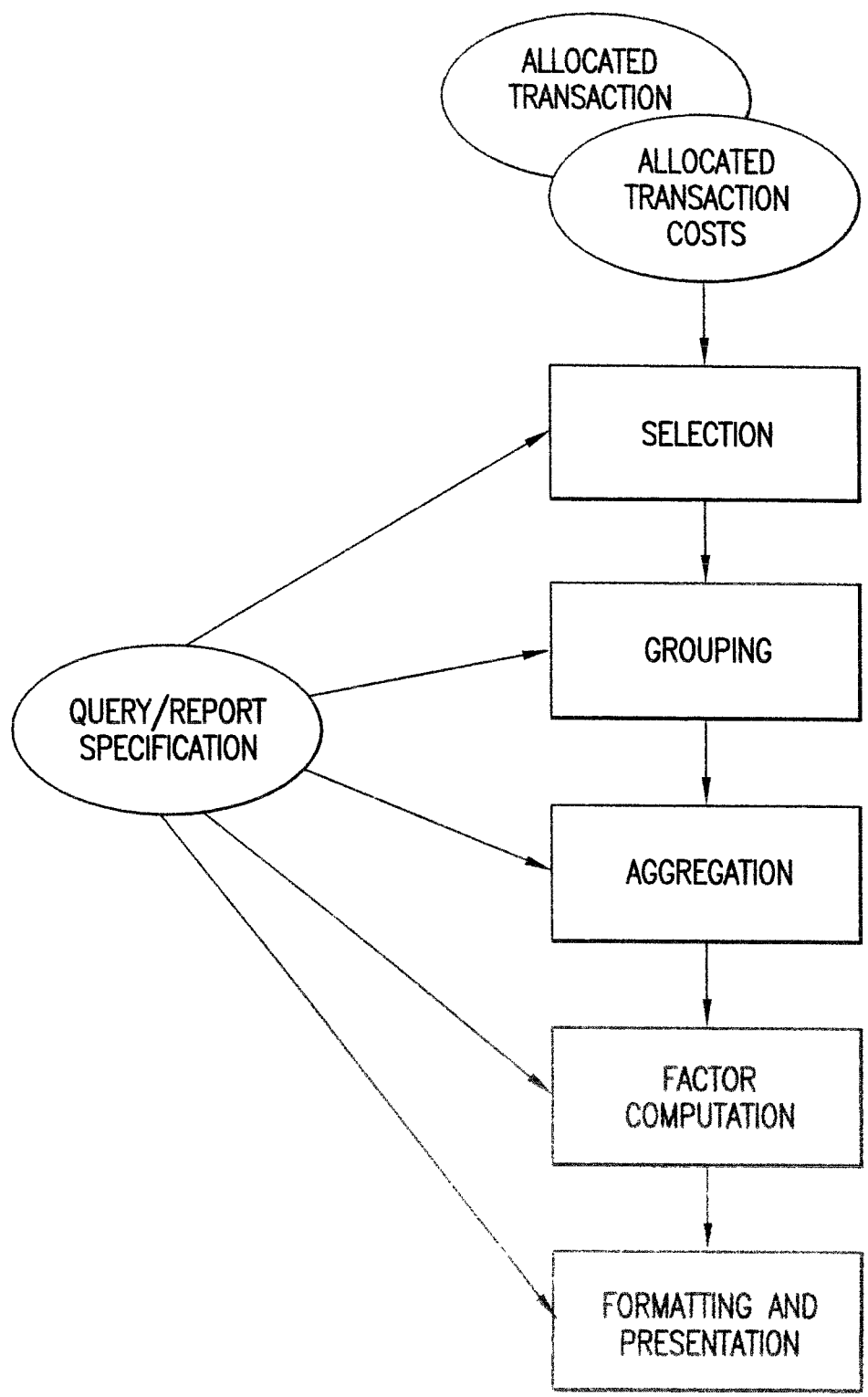
FIG. 28 illustrates a typical direct query or report in a relational database server.

The allocated transaction costs are computed and stored at the finest level of detail that the method describes. Analysis and interpretation of the data generally requires several more concise summaries of the information. The summarizing function is implemented using either a commercially available relational database server, or a multi-dimensional online analytics processing (OLAP) database server. FIG. 28 illustrates a typical report or query in a relational database server.

A query or report specification is data that describes the desired analysis. It will specify which of the measures previously described are to be displayed. It will specify whether to include transactions for all, or only a particular subset, of the orders, instruments, brokers, managers, accounts, and traders that are represented in the system.

It will specify whether to show detail or summary for each of the identifying elements of the Allocated Transactions. That is, one query may request factors per account per manager, and another request factors for each manager, with the managers' accounts summarized into a single measurement. It will also specify the desired sequence of the results.

A series of query or report specification may be created at one time to be used repeatedly, or may be created when needed. The latter mode of operation characterizes a user doing analysis with the result of one inquiry motivating the next.

The results for a query are obtained in several stages, with the result of each stage being provided as input data to the next.

The Selection stage chooses items from the analysis data, based on the query or report specification. Items for orders, instruments, brokers, etc. that are to be reported are retrieved and passed to the next stage. Other items are ignored.

The Grouping stage arranges the results of selection into groups such that, according to the query or report specification, each group corresponds to one detail line in the final display or report.

The Aggregation stage summarizes the items within each group, as follows: The average order execution price for each item is multiplied by the corresponding share amount, and the resulting numbers are totaled. The result is total order principal represented for the group.

Similarly, average day execution price is multiplied by shares and totaled to get total day principal amount. Similarly, each allocation item per-share gain/loss amount is multiplied by the item share amount, and totaled, to give a corresponding total gain/loss amount for the group. Allocated Transaction share amounts are totaled within each group to get the number of shares represented by the group.

The result of Aggregation is a series of items similar to Allocated Transaction items, except: first, no timestamps are present; second, the dimensions not specified for grouping are not present, (for example, if the specification requests managers and brokers, but not accounts, then broker and manager name will appear, but no account number will appear); and, third, day and order execution, and gain/loss figures represent total amounts, rather than per-share amounts.

The grouping and aggregation operations may be performed for the same data at several different levels for a particular report or query, to obtain subtotal and grand total aggregations for a display or report.

The Factor Computation stage applies the formulae previously described to the aggregated items.

To obtain per-share amounts, aggregate price and gain/loss figures in each aggregate item are added or subtracted as described by the formula, then divided by the aggregate item's share amount. To obtain factors, aggregate price and gain/loss figures in each aggregate item are added or subtracted as described by the formula, then divided by the aggregate item's day be order execution amount, as described in the formulae.

The result of Factor Computation is a series of row, each containing the broker, trader, manager, etc. identifiers from the grouping stage, and the principal traded amount, gain/loss amounts, shares traded, gain/loss per share amounts, and gain/loss factors.

The Presentation stage arranges the results on a printed report, or on a display screen. It may also provide the results in the form of a data file or database table for further manipulation. The particular system described here uses a commercially available report-generator software package to format paper reports, and an interactive spreadsheet program for on-screen presentation.

Part 4 (Alternate)Pre-Aggregated Query or Report

Figure 29:
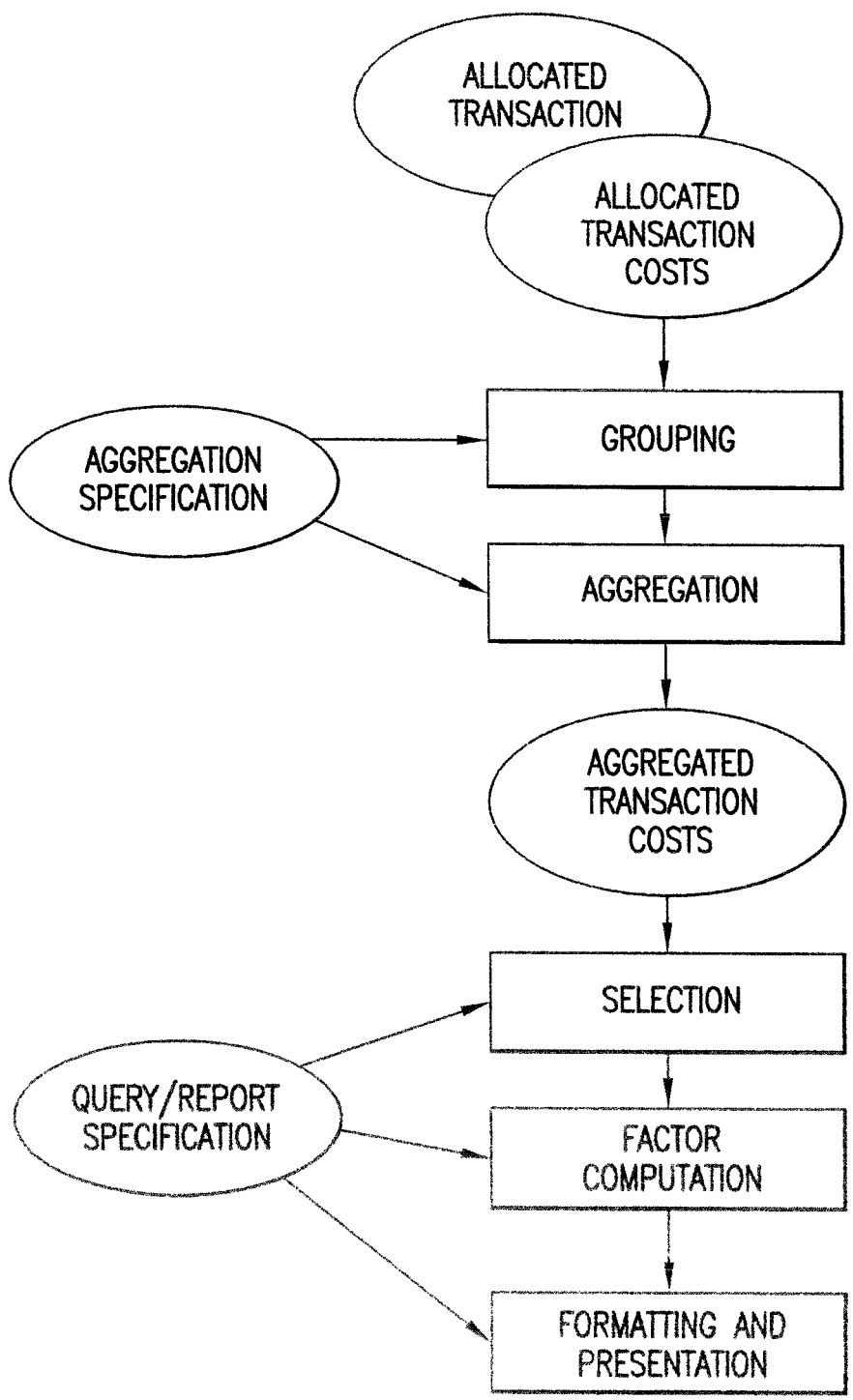
FIG. 29 depicts a query or report phase using an OLAP processor

FIG. 29 depicts the Query or Report phase in an alternate implementation, using a commercially available Online Analytics Processing (OLAP) processor. In the alternate implementation, the Order Analysis, Market Data Management, and the Order Analysis and Decomposition stages are as described above. However, the steps involved in queries and reports are rearranged in a way that can improve performance for interactive queries.

The fundamental distinction for this implementation is that grouping and aggregation steps are performed ahead of time, with the results stored within the OLAP system. An Aggregation Specification is configuration data that describes which combinations of grouping dimensions are to be pre-calculated. It is provided to guide the OLAP system to calculate those aggregations most likely to be used. The OLAP system can produce an Aggregation Specification when none is provided, based on input data statistics.

The OLAP system also stores the formulae needed to sum items in the Aggregation phase, and to provide per-share amounts and factors during the Factor Computation phase. This simplifies and speed online queries, since data retrieved from the OLAP server may be displayed directly, without any intermediate calculations.

The Query/Report Specification is similar to that in the Direct Query description, but here it directs the Selection phase to select rows from the pre-computed aggregates.

The Presentation stage in this implementation is a spreadsheet program. The spreadsheet program has a built-in interface to the OLAP service, through which query specifications may be formulated.

XII. Conclusions

Herein (in equations 1-211) we have described the kernel-set calculations that form the base of a preferred calculation engine for trade cost measurement. The kernel-set provides the lowest granularity of calculations for trade-cost measurement.

We have also described exemplary and preferred software for aggregating and summarizing calculations and results from the kernel-set described herein. The invention clearly encompasses other means for summarizing and aggregating the kernel set described herein, as well as obvious variations thereof, that are apparent to those skilled in the art.

XIII. References

Dennis E. Logue. *Handbook of Modern Finance*. Boston 1990. Warren, Gorham & Lamont, Inc.
Michael T. Reddy. *Securities Operations*. Englewood Cliffs, N.J. 1995. Prentice-Hall.
Robert A. Schwartz. *Reshaping The Equity Markets*. Homewood, Ill. 1993. Business One Irwin.
Haim Levy and Marshall Sarnat. *Portfolio And Investment Selection: Theory And Practice*. Englewood Cliffs, N.J. 1984. Prentice-Hall.
Erik Thomsen et al. *Microsoft OLAP Solutions*. New York 1999. John Wiley & Sons, Inc.

The invention claimed is:

1. A computer system for measuring and analyzing trade costs, comprising
   a computer programmed to
      capture trade data, including corresponding time stamp data, over a predetermined time period;
      choose items from the data;
      arrange results from the choosing into groups;
      summarize items within each group, including per-item gains/losses that result from time delays according to the time stamp data;
      apply summation formulae to the summarized items; and
      display the results; and
   a database or database server for storing the data.

2. A computer system for measuring and analyzing trade costs, comprising:
   a computer programmed to
      capture trade data, including corresponding time stamp data, over a predetermined time period, and
      an online analytical processing (OLAP) system for storing the data;
   the computer being further programmed to
      arrange results from the OLAP system into groups, and store the results in the OLAP system;
      store an aggregation specification of configuration data that describes combinations of group dimensions to be pre-calculated;
   the OLAP system being configured to
      pre-calculate aggregations defined by the aggregation specification, including per-item gains/losses that result from time delays according to the time stamp data;
   the computer being further programmed to
      choose items from the pre-calculated aggregations based on the query or report specification;
      apply summation formulae to the chosen aggregations; and
      display the results.

3. A system according to claim 2, wherein the computer is further programmed to produce an aggregation specification based on input data statistics.

4. A system according to claim 1, wherein the computer is further programmed to determine average order execution prices for each item, multiply the result by a share amount and total the resulting number.

5. A system according to claim 2, wherein the computer is further programmed to determine average order execution prices for each item, multiply the result by a share amount and total the resulting number.

6. A system according to claim 3, wherein the computer is further programmed to determine average order execution prices for each item, multiply the result by a share amount and total the resulting number.

7. A system according to claim 1, wherein the computer is further programmed to choose items from the data based on a stored query or report specification.

8. A system according to claim 2, wherein the computer is further programmed to choose items from the data based on a stored query or report specification.

9. A system according to claim 3, wherein the computer is further programmed to choose items from the data based on a stored query or report specification.

10. A system according to claim 1, wherein the computer is further programmed to be responsive to the query or report specification for arranging results from the choosing into groups in accordance with the query or report specification, such that each group corresponds to one detail line in a final display or report.

11. A system according to claim 2, wherein the computer is further programmed to be responsive to the query or report specification for arranging results from the choosing into groups in accordance with the query or report specification, such that each group corresponds to one detail line in a final display or report.

12. A system according to claim 1, wherein the computer is further programmed to apply summation formulae to selected aggregations to provide a series of rows, each containing an identifier from the results arranged into groups and a principal traded amount for that identifier and related results.

13. A system according to claim 2, wherein the computer is further programmed to apply summation formulae to selected aggregations to provide a series of rows, each containing an identifier from the results arranged into groups and a principal traded amount for that identifier and related results.

* * * * *